(12) United States Patent
Kim et al.

(10) Patent No.: US 12,524,121 B2
(45) Date of Patent: Jan. 13, 2026

(54) ELECTRONIC DEVICE

(71) Applicant: SAMSUNG DISPLAY CO., LTD., Yongin-si (KR)

(72) Inventors: Gayoung Kim, Yongin-si (KR); Sanghyun Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/783,918

(22) Filed: Jul. 25, 2024

(65) Prior Publication Data

US 2025/0147630 A1 May 8, 2025

(30) Foreign Application Priority Data

Nov. 6, 2023 (KR) .................. 10-2023-0151759

(51) Int. Cl.
*G06F 3/041* (2006.01)
*G06F 3/044* (2006.01)

(52) U.S. Cl.
CPC ........ *G06F 3/0446* (2019.05); *G06F 3/04162* (2019.05); *G06F 3/04164* (2019.05)

(58) Field of Classification Search
None
See application file for complete search history.

(56) References Cited

U.S. PATENT DOCUMENTS

| 11,301,080 | B2 | 4/2022 | Beuker et al. | |
| 11,449,182 | B2* | 9/2022 | Gogte | G06F 3/0412 |
| 11,726,625 | B2 | 8/2023 | Kim et al. | |
| 2014/0062948 | A1 | 3/2014 | Lee et al. | |
| 2018/0224984 | A1* | 8/2018 | Kim | G06F 3/0412 |
| 2021/0405819 | A1* | 12/2021 | Seo | G06F 3/0443 |
| 2022/0147212 | A1* | 5/2022 | Kim | G06F 3/04162 |
| 2022/0171499 | A1* | 6/2022 | Han | G06F 3/0412 |

FOREIGN PATENT DOCUMENTS

| KR | 10-2022-0047614 A | 4/2022 |
| KR | 2595681 B1 | 10/2023 |

* cited by examiner

*Primary Examiner* — Krishna P Neupane
(74) *Attorney, Agent, or Firm* — F. CHAU & ASSOCIATES, LLC

(57) ABSTRACT

An electronic device including: a display layer; and a sensor layer disposed on the display layer and including a sensing area and a peripheral area that is adjacent to the sensing area, wherein the sensor layer includes: first electrodes extending in a first direction and arranged in a second direction crossing the first direction; second electrodes extending in the second direction and arranged in the first direction; a third electrode extending in the first direction and electrically insulated from the first electrodes; a fourth electrode extending in the second direction and electrically insulated from the second electrodes; first trace lines electrically connected to the first electrodes, respectively, wherein the plurality of first trace lines overlap the peripheral area; and a sub trace line electrically connected to a portion of the first trace lines and overlapping the sensing area.

33 Claims, 33 Drawing Sheets

ELECTRONIC DEVICE

CROSS-REFERENCE TO RELATED APPLICATION

This U.S. non-provisional patent application claims priority under 35 U.S.C. § 119 to Korean Patent Application No. 10-2023-0151759, filed on Nov. 6, 2023, the disclosure of which is incorporated by reference herein in its entirety.

Technical Field

The present disclosure relates to an electronic device that can detect input by a pen.

Discussion of Related Art

Multimedia electronic devices, such as televisions, mobile phones, tablet computers, laptop computers, navigators, and game consoles, include a display device for visual output. These devices often include a sensor layer, enabling touch-based input for intuitive and convenient control in addition to traditional input methods, such as buttons, keyboards, and mice. The sensor layer detects touch or pressure from users. There is a growing demand for pen input, which offers precise touch input for users accustomed to using writing instruments or specific application programs, such as sketching or drawing applications.

SUMMARY

The present disclosure provides an electronic device that can detect pen input and features a reduced peripheral area.

An embodiment of the inventive concept provides, an electronic device including: a display layer configured to display an image; and a sensor layer disposed on the display layer and including a sensing area and a peripheral area that is adjacent to the sensing area, wherein the sensor layer includes: a plurality of first electrodes extending in a first direction and arranged in a second direction crossing the first direction; a plurality of second electrodes extending in the second direction and arranged in the first direction; a third electrode extending in the first direction and electrically insulated from the first electrodes; a fourth electrode extending in the second direction and electrically insulated from the second electrodes; a plurality of first trace lines electrically connected to the first electrodes, respectively, wherein the plurality of first trace lines overlap the peripheral area; and a sub trace line electrically connected to a portion of the first trace lines and overlapping the sensing area.

The first trace lines and the sub trace line are disposed on layers different from each other.

Each of the first electrodes and the second electrodes and each of the third electrode and the fourth electrode are disposed on layers different from each other.

The sensor layer further includes: a first insulating layer covering the third electrode and the fourth electrode; and a second insulating layer disposed on the first insulating layer, wherein the second insulating layer covers the first electrodes and the second electrodes.

The sensor layer further includes a base layer disposed below the first insulating layer, each of the first trace lines is disposed on the first insulating layer, and the sub trace line is disposed on the base layer.

The sub trace line overlaps the first electrodes.

The sensor layer further includes: a base layer disposed below the first insulating layer; and a third insulating layer disposed between the base layer and the first insulating layer, wherein each of the first trace lines is disposed on the first insulating layer, and the sub trace line is disposed on the third insulating layer.

The sub trace line overlaps at least one of the first electrodes, the second electrodes, the third electrode, and the fourth electrode.

The sensor layer further includes a plurality of dummy patterns overlapping the first electrodes and the second electrodes.

The sub trace line is disposed between the dummy patterns on a plane.

The third electrode includes a plurality of first auxiliary electrodes extending in the first direction and arranged in the second direction, and the fourth electrode includes a plurality of second auxiliary electrodes extending in the second direction and arranged in the first direction, wherein a first coupling capacitor is provided between one first electrode of the first electrodes and one first auxiliary electrode of the first auxiliary electrodes, and a second coupling capacitor is provided between one second electrode of the second electrodes and one second auxiliary electrode of the second auxiliary electrodes.

The sub trace line is disposed between the first auxiliary electrodes and the second auxiliary electrodes on a plane.

Each of the second auxiliary electrodes includes a $(2-1)^{th}$ auxiliary electrode and a $(2-2)^{th}$ auxiliary electrode, which are spaced apart from each other in the second direction, and the sub trace line is disposed between the $(2-1)^{th}$ auxiliary electrode and the $(2-2)^{th}$ auxiliary electrode on a plane.

Each of the first electrodes includes: a first main electrode electrically connected to the sub trace line; and first sub electrodes electrically insulated from the sub trace line.

The sub trace line overlaps at least one first sub electrode of the first sub electrodes.

At least one first sub electrode of the first sub electrodes is disposed between the first main electrode and the one first sub electrode overlapped by the sub trace line.

Each of the sub trace line and the first main electrode is provided in plural, and the first main electrodes are disposed at an uppermost end of the first electrodes in the second direction.

The first trace lines include: a plurality of (1-1)th trace lines connected to a first end of each of the first electrodes; and a plurality of (1-2)th trace lines connected to a second end of each of the first electrodes, which is spaced apart from the first end in the first direction.

The first electrodes include: (1-1)th electrodes connected to the (1-1)th trace lines; and (1-2)th electrodes connected to the (1-2)th trace lines.

The sub trace line includes: a first sub trace line electrically connected to a portion of the (1-1)th trace lines; and a second sub trace line electrically connected to a portion of the (1-2)th trace lines.

The first sub trace line and the second sub trace line are spaced apart from each other in the first direction.

The electronic device further includes: a plurality of second trace lines electrically connected to the second electrodes; a third trace line electrically connected to the third electrode; and a fourth trace line electrically connected to the fourth electrode.

The first trace lines and the third trace line are spaced apart from each other with
the first electrodes and the third electrode therebetween, and the second trace lines and the fourth trace line are spaced apart from each other with the second electrodes and the fourth electrode therebetween. The third trace line overlaps the sub trace line.

A contact hole through which the first trace lines and the sub trace line are connected to each other is provided in the sensor layer.

The contact hole overlaps the peripheral area.

The electronic device further includes a sensor driver configured to drive the sensor layer and operate in a first mode in which a touch input is sensed and a second mode in which a pen input is sensed.

An embodiment of the inventive concept provides an electronic device including: a sensor layer including a plurality of first electrodes, a plurality of second electrodes, a plurality of first auxiliary electrodes, a plurality of second auxiliary electrodes, and a plurality of trace lines; and a sensor driver configured to drive the sensor layer and operate in a first mode in which a touch input is sensed and a second mode in which a pen input is sensed, wherein a first coupling capacitor is provided between one first electrode of the plurality of first electrodes and one first auxiliary electrode of the first auxiliary electrodes, and a second coupling capacitor is provided between one second electrode of the plurality of second electrodes and one second auxiliary electrode of the second auxiliary electrodes, wherein the trace lines include: a plurality of first trace lines electrically connected to the first electrodes, respectively; and a sub trace line overlapping a portion of the plurality of first electrodes and configured to electrically connect a portion of the first trace lines to the sensor driver.

The first trace lines and the sub trace line are disposed on layers different from each other.

The sensor layer further includes: a first insulating layer covering the first auxiliary electrodes and the second auxiliary electrodes; and a second insulating layer disposed on the first insulating layer and covering the first electrodes and the second electrodes.

The sensor layer further includes a base layer disposed below the first insulating layer, each of the first trace lines is disposed on the first insulating layer, and the sub trace line is disposed on the base layer.

The sensor layer includes a sensing area and a peripheral area adjacent to the sensing area, and the first electrodes, the second electrodes, the first auxiliary electrodes, and the second auxiliary electrodes overlap the sensing area, and the first trace lines overlap the peripheral area.

A first portion of the sub trace line overlaps the sensing area, and a second portion of the sub trace line overlaps the peripheral area.

A contact hole through which the first trace lines and the sub trace line are connected to each other is provided in the sensor layer, and the contact hole overlaps the peripheral area.

An embodiment of the inventive concept provides an electronic device that includes: a display layer configured to display an image; a sensor layer disposed on the display layer and including a sensing area and a peripheral area adjacent to the sensing area; and a sensor driver configured to apply a signal to the sensor layer, wherein the sensor layer includes: a plurality of first electrodes extending in a first direction and arranged in a second direction crossing the first direction; a plurality of second electrodes extending in the second direction and arranged in the first direction; and a first trace line connected to at least one first electrode of the first electrodes to transmit the signal to the first electrode, wherein the first trace line includes: a first portion connected to the first electrode, overlapping the peripheral area, and extending in the second direction; and a second portion connected to the sensor driver, overlapping the sensing area, and extending in the second direction.

The sensor layer further includes a pad part connected to the sensor driver, the first portion is disposed between the first electrode and the second portion, and the second portion is disposed between the first portion and the pad part.

DETAILED DESCRIPTION OF THE EMBODIMENTS

Figure 1A:
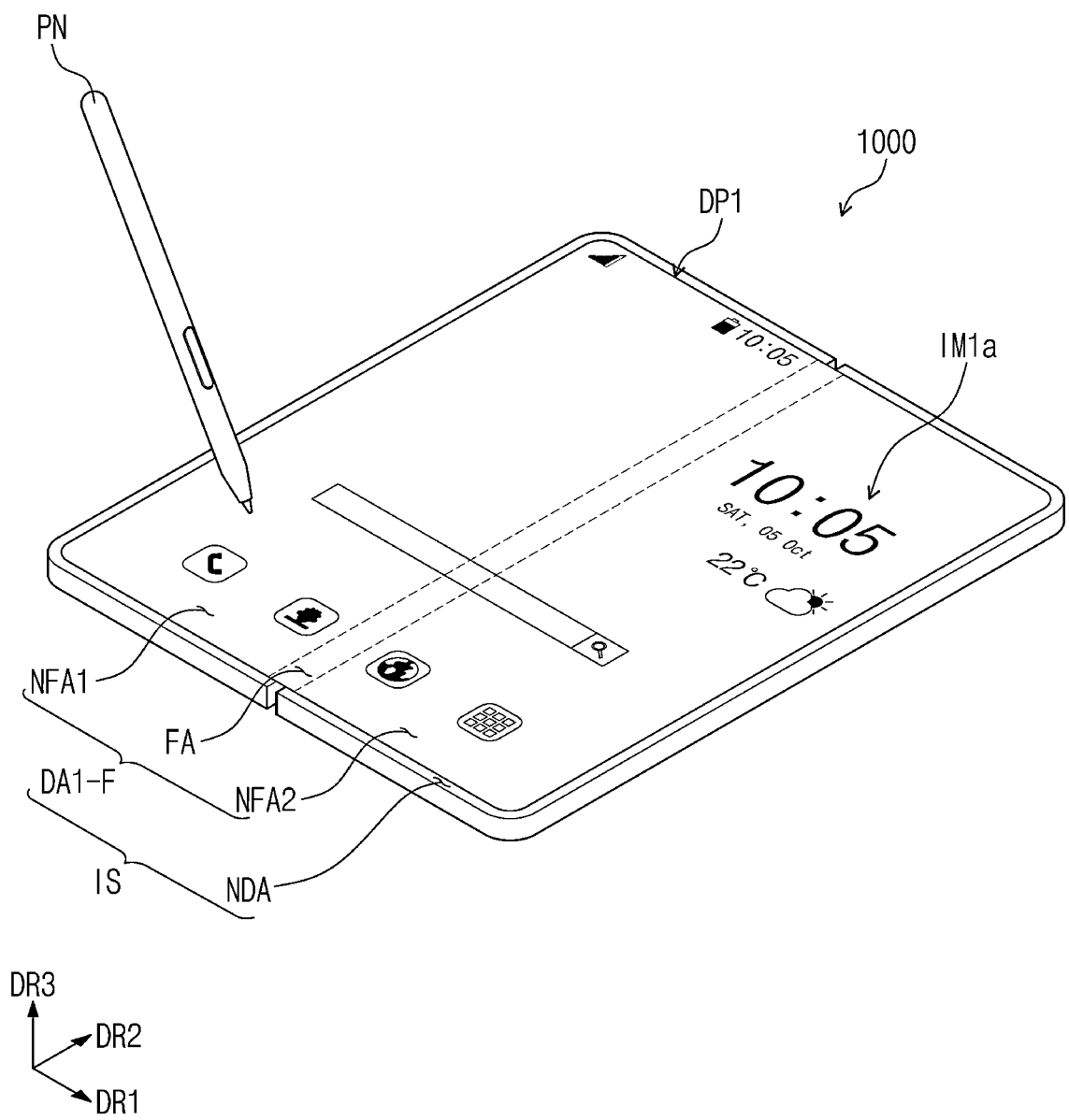
FIG. 1A is a perspective view of an electronic device according to an embodiment of the inventive concept.

The inventive concept may be implemented in various modified embodiments, as illustrated in the drawings and detailed in the descriptions herein. However, this does not restrict the inventive concept to these specific embodiments. It should be understood that the inventive concept covers all modifications, equivalents, and replacements that fall within the scope and spirit of the inventive concept.

In this specification, it will also be understood that when one component (or region, layer, portion) is referred to as being 'on', 'connected to', or 'coupled to' another component, it can be directly disposed/connected/coupled on/to the one component, or an intervening third component may also be present.

Like reference numerals may refer to like elements throughout this specification. In addition, in the figures, the thickness, ratio, and dimensions of components may be exaggerated for clarity of illustration.

The term "and/or" includes any and all combinations of one or more of the associated listed items.

It will be understood that although the terms such as 'first' and 'second' are used herein to describe various elements, these elements should not be limited by these terms. These terms are used to distinguish one component from other components. For example, a first element referred to as a first element in an embodiment can be referred to as a second element in another embodiment. The terms of a singular form may include plural forms unless referred to the contrary.

In addition, "under", "below", "above', "upper", and the like are used to describe the relative position of components illustrated in the drawings. The terms may are used as relative concepts and are described in relation to directions depicted in the drawings.

Unless otherwise defined, all terms (including technical and scientific terms) used herein have the same meaning as commonly understood by a person of ordinary skill in the art to which the inventive concept belongs. In addition, terms such as those in commonly used dictionaries are to be interpreted as having meanings consistent with their meaning in the context of the relevant art.

The meaning of "include" or "comprise" specifies a property, a fixed number, a step, an operation, an element, a component or a combination thereof, but does not exclude other properties, fixed numbers, steps, operations, elements, components or combinations thereof.

Hereinafter, embodiments of the inventive concept will be described with reference to the accompanying drawings.

Figure 1B:
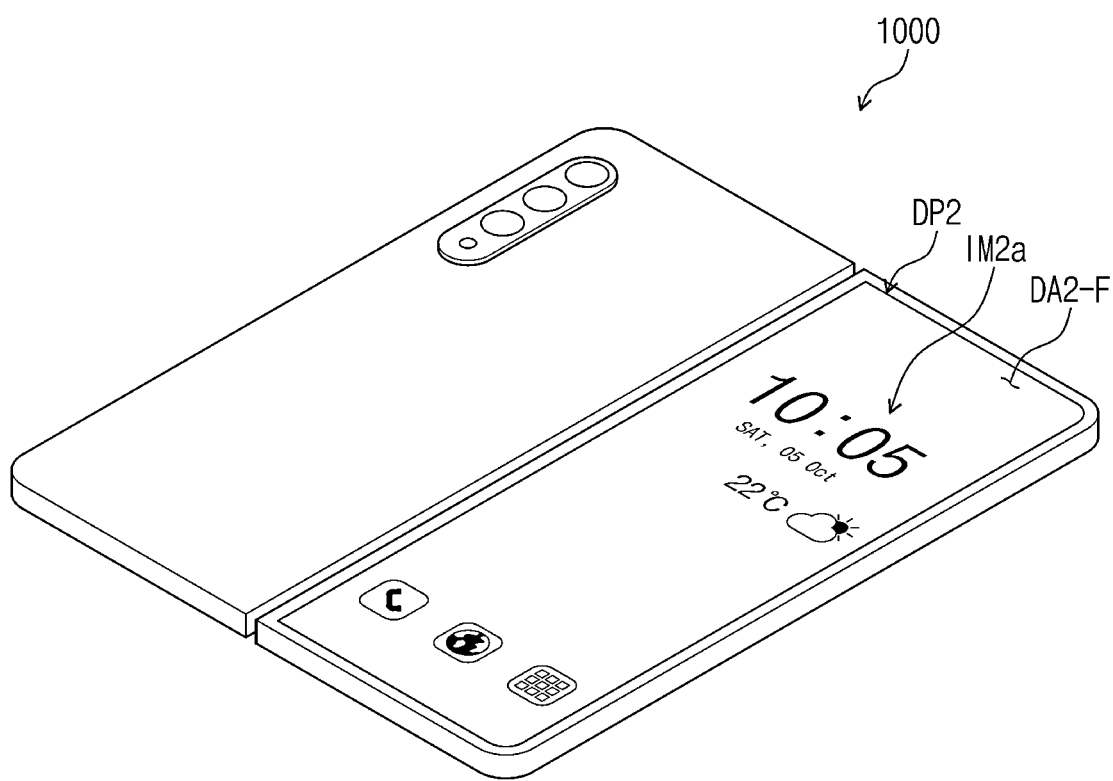
FIG. 1B is a rear perspective view of the electronic device according to an embodiment of the inventive concept.
Figure 1B:
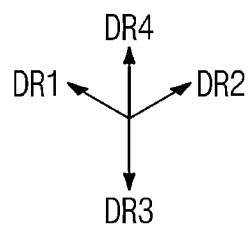

FIG. 1A is a perspective view of an electronic device according to an embodiment of the inventive concept. FIG. 1B is a rear perspective view of the electronic device according to an embodiment of the inventive concept.

Referring to FIGS. 1A and 1B, an electronic device 1000 may be a device that is activated according to an electrical signal. For example, the electronic device 1000 may display an image and sense inputs applied from the outside. In other words, the electronic device 1000 can display an image and detect external inputs. The external input may be a user's input. The user's input may include various types of external inputs such as a portion of a user's body, a pen PN, light, heat, or a pressure.

The electronic device 1000 may include a first display panel DP1 and a second display panel DP2. The first display panel DP1 and the second display panel DP2 may be separate panels that are separated from each other. The first display panel DP1 may be a main display panel, and the second display panel DP2 may be an auxiliary display panel or an external display panel.

A display surface IS of the first display panel DP1 may be divided into a first display part DA1-F and a non-display area NDA. The first display part DA1-F may be an area on which an image IM is displayed. A user views an image IM1a through the first display part DA1-F. The non-display area NDA may be arranged around the first display part DA1-F.

The second display panel DP2 may include a second display part DA2-F. A surface area of the second display panel DP2 may be less than that of the first display panel DP1. The surface area of the first display part DA1-F may be greater than that of the second display part DA2-F to match the sizes of the first display panel DP1 and the second display panel DP2. In a state in which the electronic device 1000 is unfolded, the first display part DA1-F may have a plane substantially parallel to a first direction DR1 and a second direction DR2. A thickness direction of the electronic device 1000 may be parallel to a third direction DR3 crossing the first direction DR1 and the second direction DR2. Thus, a front surface (or top surface) and a rear surface (or bottom surface) of each of members constituting the electronic device 1000 may be defined based on the third direction DR3.

The first display panel DP1 or the first display part DA1-F may include a folding area FA that is folded and unfolded and a plurality of non-folding areas NFA1 and NFA2 that are spaced apart from each other with the folding area FA therebetween. The second display panel DP2 may overlap one of the plurality of non-folding areas NFA1 and NFA2. For example, the second display panel DP2 may overlap the first non-folding area NFA1.

The display direction of the first image IM1a displayed on a portion of the first display panel DP1, for example, the first non-folding area NFA1, and a display direction of a second image IM2a displayed on the second display panel DP2 may be opposite to each other. For example, the first image IM1a may be displayed in the third direction DR3, and the second image IM2a may be displayed in a fourth direction DR4, which is opposite to the third direction DR3.

In an embodiment of the inventive concept, the folding area FA may be bent relative to a folding axis extending in a direction parallel to a long side of the electronic device 1000, for example, in a direction parallel to the second direction DR2. When the electronic device 1000 is folded, the folding area FA may have a predetermined curvature and curvature radius. For example, when the electronic device 1000 is folded, the folding area FA may have a specified curvature and radius of curvature. The first non-folding area NFA1 and the second non-folding area NFA2 may face each other, and the electronic device 1000 may be inner-folded (folded inward) so that the first display part DA1-F is not exposed to the outside.

In an embodiment of the inventive concept, the electronic device 1000 may be outer-folded (folded outward) so that the first display part DA1-F is exposed to the outside. In an embodiment of the inventive concept, the electronic device 1000 may be capable of being in-folded and out-folded in the unfolded state, but is not limited thereto.

In FIG. 1A, an example in which one folding area FA is provided in the electronic device 1000 is illustrated, but is not limited thereto. For example, the electronic device 1000 may include a plurality of folding axes and a plurality of folding areas corresponding thereto, and the electronic device 1000 is in-folded or out-folded in the unfolded state on each of the plurality of folding areas.

According to an embodiment of the inventive concept, at least one of the first display panel DP1 or the second display panel DP2 may sense an input by the pen PN even if it does not include a digitizer. Thus, since the digitizer for sensing the pen PN is omitted, an increase in thickness, weight, and flexibility of the electronic device 1000 due to the digitizer may not occur. Thus, not only the first display panel DP1 but also the second display panel DP2 may be designed to sense the pen PN.

Figure 2:
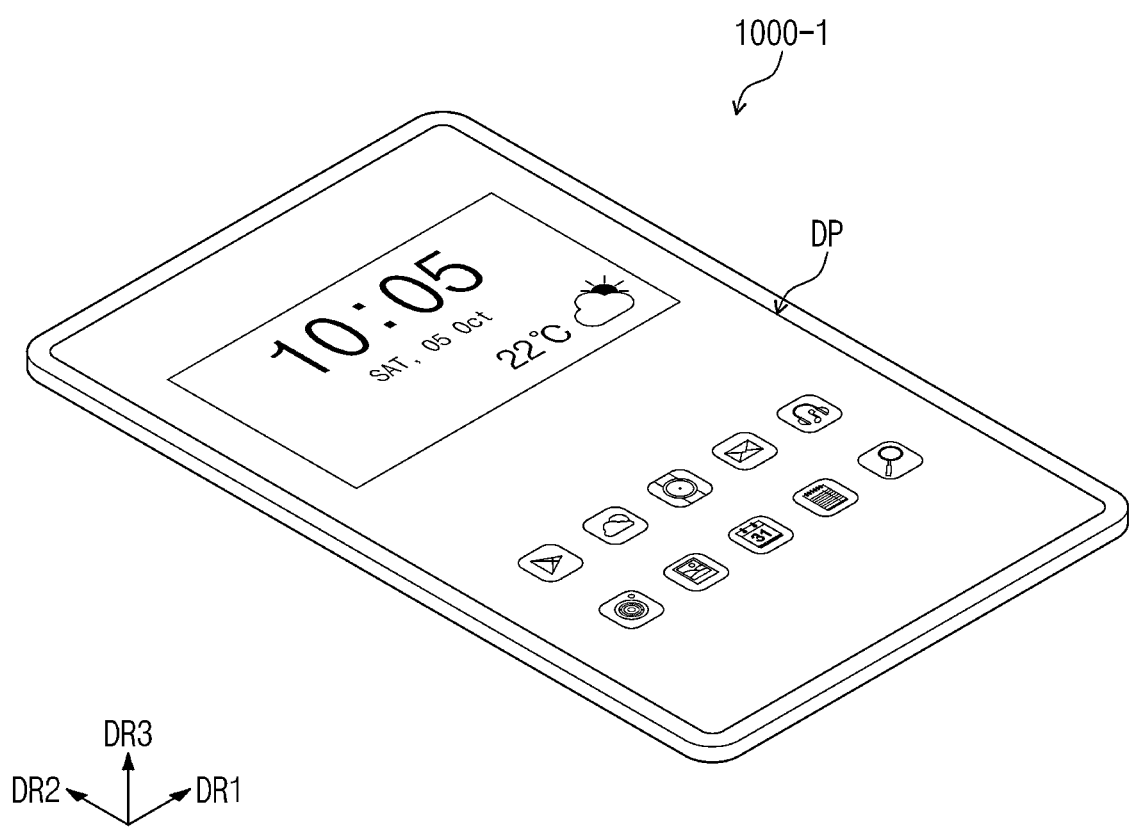
FIG. 2 is a perspective view of an electronic device according to an embodiment of the inventive concept.
Figure 3:
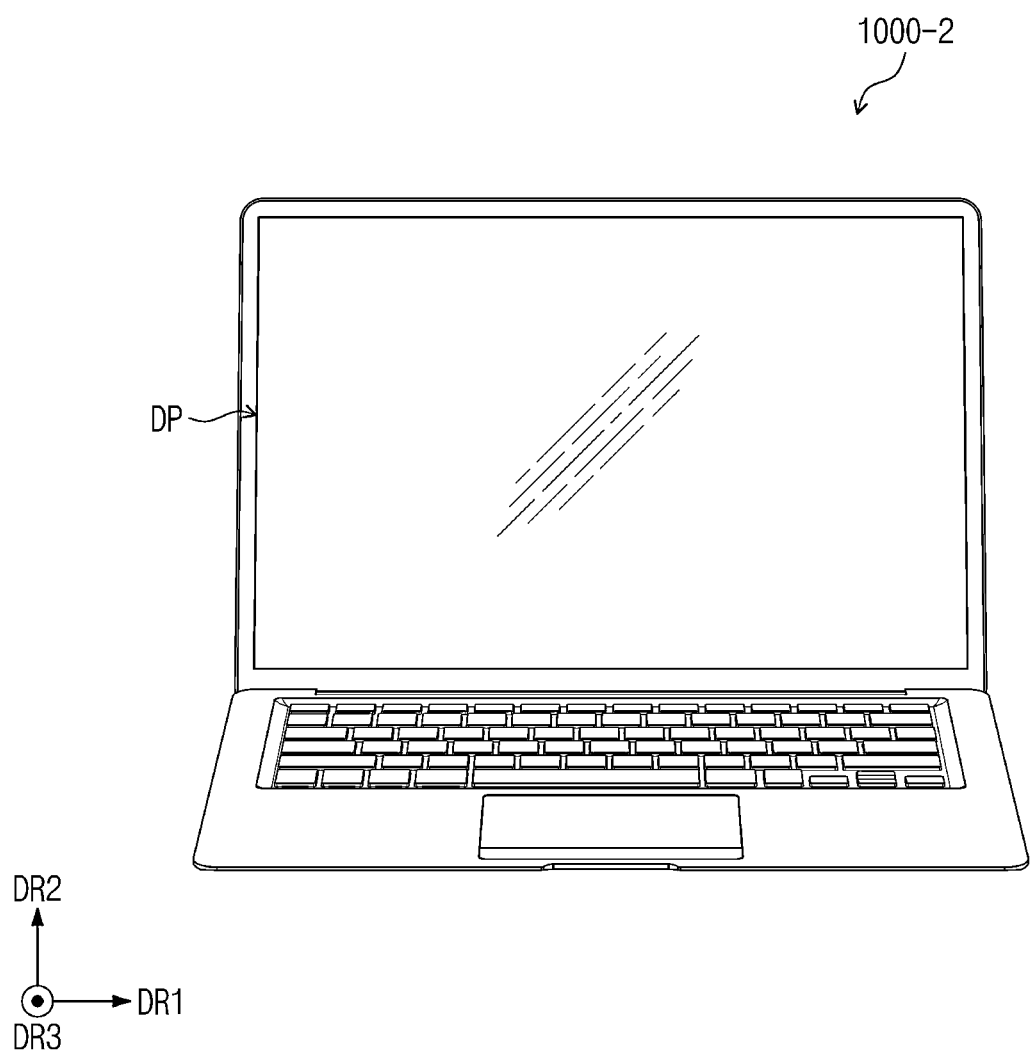
FIG. 3 is a perspective view of an electronic device according to an embodiment of the inventive concept.

FIG. 2 is a perspective view of an electronic device according to an embodiment of the inventive concept. FIG. 3 is a perspective view of an electronic device according to an embodiment of the inventive concept.

FIG. 2 illustrates an example in which an electronic device 1000-1 is a mobile phone, and the electronic device 1000-1 may include a display panel DP. FIG. 3 illustrates an example in which an electronic device 1000-2 is a laptop computer, and the electronic device 1000-2 may include a display panel DP.

In an embodiment of the inventive concept, the display panel DP may sense inputs applied from the outside. The external input may be a user's input. The user's input may include various types of external inputs such as a portion of a user's body, a pen PN (see FIG. 1A), light, heat, or a pressure.

According to an embodiment of the inventive concept, the display panel DP may sense an input by the pen PN even if it does not include the digitizer. Thus, since the digitizer for sensing the pen PN is omitted, an increase in thickness, weight, and flexibility of the electronic device 1000-1 or 1000-2 due to the digitizer may not occur.

In FIG. 1A, a foldable-type electronic device 1000 may be illustrated as an example, and in FIG. 2, a bar-type electronic device 1000-1 may be illustrated as an example. However, the present disclosure to be described below is not limited thereto. For example, the descriptions provided below may be applied to various electronic devices, such as a rollable-type electronic device, a slidable-type electronic device, and a stretchable-type electronic device.

Figure 4:
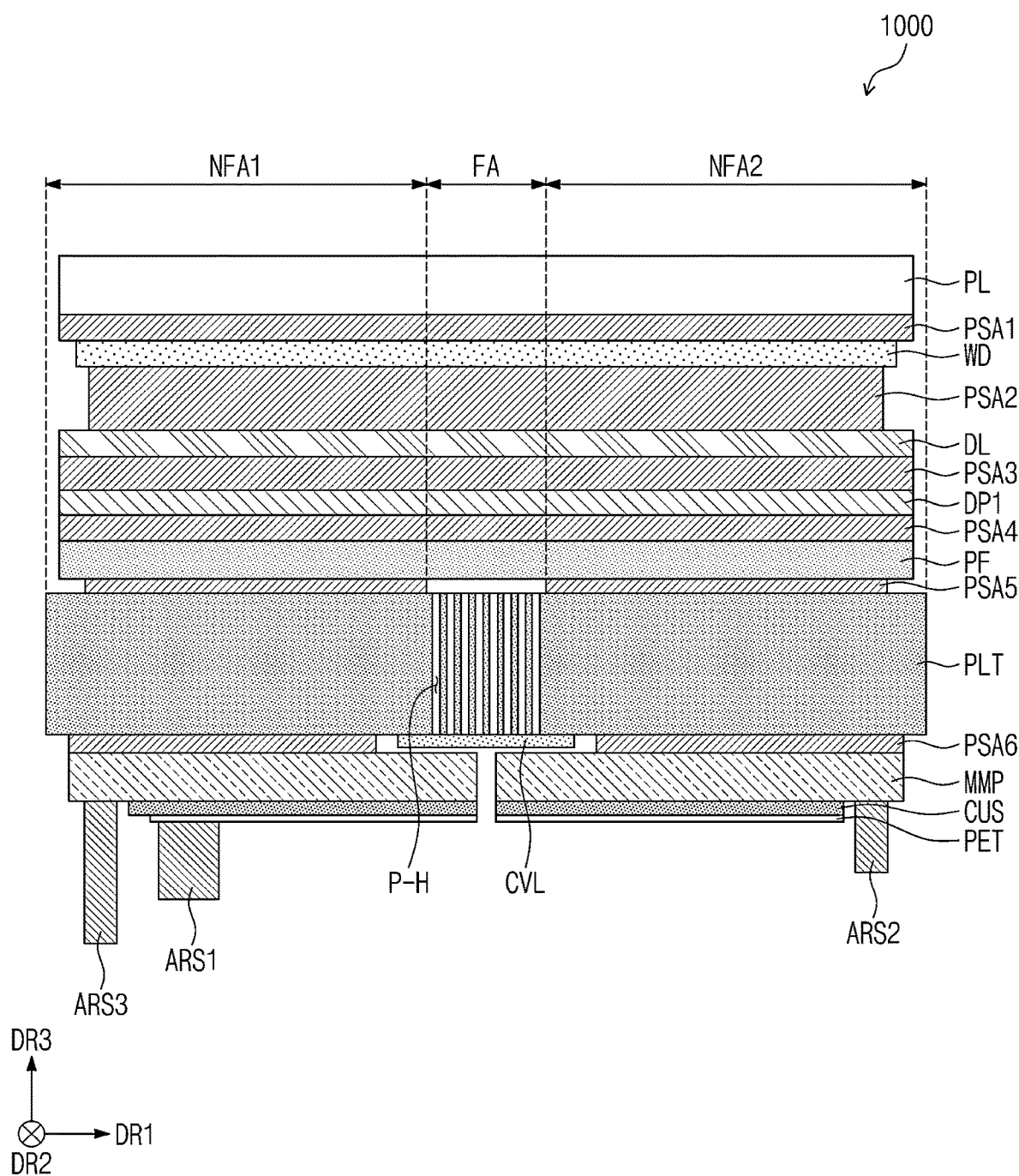
FIG. 4 is a cross-sectional view of an electronic device according to an embodiment of the inventive concept.

FIG. 4 is a cross-sectional view of the electronic device 1000 according to an embodiment of the inventive concept.

The cross-sectional view illustrated in FIG. 4 may be a cross-sectional view that illustrates a portion of the electronic device 1000 including the first display panel DP1 of the electronic device 1000 illustrated in FIG. 1A.

Referring to FIG. 4, the electronic device 1000 may include a first display panel DP1, upper functional layers, and lower functional layers. The upper functional layers may include components disposed above the first display panel DP1, and the lower functional layers may include components disposed below the first display panel DP1.

The first display panel DP1 may be configured to generate an image and sense an external input. For example, the first display panel DP1 may include a display layer 100 (see FIG. 6) and a sensor layer 200 (see FIG. 6).

The upper functional layers may include a protective layer PL, a window WD, an impact absorption layer DL, and first to third adhesive layers PSA1, PSA2, and PSA3. The components included in the upper functional layers are not limited to the components described above. At least a portion of the above-described components may be omitted, and other components may be added.

The protective layer PL may protect components disposed below the protective layer PL. The protective layer PL may have a thickness of about 60 micrometers to about 70 micrometers, for example, about 65 micrometers, but the thickness of the protective layer PL is not limited thereto.

A hard coating layer, an anti-fingerprint layer, and the like may be additionally provided on the protective layer PL to improve properties such as chemical resistance and abrasion resistance. For example, the hard coating layer may be a functional layer for improving use characteristics of the electronic device 1000 and may be applied on the protective layer PL. For example, anti-fingerprint properties, anti-pollution properties, and anti-scratch properties may be improved by the hard coating layer. A thickness of the hard coating layer may be about 5 micrometers, but is not particularly limited thereto.

The window WD may be disposed below the protective layer PL. A first adhesive layer PSA1 may be disposed between the window WD and the protective layer PL. The first adhesive layer PSA1 may be in direct contact with the window WD and the protective layer PL. The first adhesive layer PSA1 may have a thickness of about 30 micrometers to about 40 micrometers, for example, about, 35 micrometers, and the thickness of the first adhesive layer PSA1 is not limited thereto. In an embodiment of the inventive concept, a bezel pattern may be disposed between the first adhesive layer PSA1 and the protective layer PL.

The window WD may include an optically transparent insulating material. For example, the window WD may include a glass substrate or a synthetic resin film. The window WD may have a single-layered structure or a multilayered structure. For example, the window WD may include a plurality plastic films bonded to each other by using an adhesive or include a glass substrate and a plastic film, which are bonded to each other by using an adhesive. When the window WD is the glass substrate, the window WD may have a thickness of about 80 micrometers or less and may have, for example, a thickness of about 30 micrometers, but the thickness of the window WD is not limited thereto.

The impact absorption layer DL may be disposed below the window WD. The second adhesive layer PSA2 may be disposed between the window WD and the impact absorption layer DL. The second adhesive layer PSA2 may be in direct contact with the window WD and the impact absorption layer DL. The second adhesive layer PSA2 may have a thickness of about 70 micrometers to about 80 micrometers, for example, about 75 micrometers, and the thickness of the second adhesive layer PSA2 is not limited thereto.

The impact absorption layer DL may protect the first display panel DP1 by absorbing an impact applied to the first display panel DP1. The impact absorption layer DL may be a stretched film. For example, the impact absorption layer DL may include a flexible plastic material. The flexible plastic material may be a synthetic resin film. For example, the impact absorption layer DL may include a flexible plastic material such as polyimide or polyethylene terephthalate. The impact absorption layer DL may have a thickness of about 18 micrometers to about 28 micrometers, for example, about 23 micrometers, but the thickness of the impact absorption layer DL is not limited thereto. In an embodiment of the inventive concept, the impact absorption layer DL may be omitted.

The third adhesive layer PSA3 may be disposed between the impact absorption layer DL and the first display panel DP1. The third adhesive layer PSA3 may be in direct contact with the impact absorption layer DL and the first display panel DP1. The third adhesive layer PSA3 may have a thickness of about 45 micrometers to about 55 micrometers, for example, about 50 micrometers, and the thickness of the third adhesive layer PSA3 is not limited thereto.

The lower functional layers may include a protective film PF, a plate PLT, a cover layer CVL, a shielding layer MMP, a lower sheet CUS, an insulating film PET, and step compensation members ARS1, ARS2, and ARS3, and fourth to sixth adhesive layers PSA4, PSA5, and PSA6. The components included in the lower functional layers are not limited to the components described above. At least a portion of the above-described components may be omitted, and other components may be added.

The protective film PF may be coupled to a rear surface of the first display panel DP1 through the fourth adhesive layer PSA4. For example, the fourth adhesive layer PSA4 may be in direct contact with the protective film PF and the display panel DP1. The fourth adhesive layer PSA4 may have a thickness of about 20 micrometers to about 30 micrometers, for example, about 25 micrometers, and the thickness of the fourth adhesive layer PSA4 is not limited thereto.

The protective film PF may prevent scratches from occurring on the rear surface of the first display panel DP1 during the process of manufacturing the first display panel DP1.

The protective film PF may be a colored polyimide film. For example, the protective film PF may be an opaque yellow film, but is not limited thereto. The protective layer PL may have a thickness of about 45 micrometers to about 55 micrometers, for example, about 50 micrometers, but the thickness of the protective layer PL is not limited thereto.

The plate PLT may be disposed below the protective film PF. A fifth adhesive layer PSA5 may be disposed between the plate PLT and the protective film PF. The fifth adhesive layer PSA5 may adhere the plate PLT to the protective film PF. The fifth adhesive layer PSA5 may have a thickness of about 11 micrometers to about 21 micrometers, for example, about 16 micrometers, and the thickness of the fifth adhesive layer PSA5 is not limited thereto.

The plate PLT may include carbon fiber reinforced plastic (CFRP), a metal, or an metal alloy. The plate PLT may support components disposed thereon. Openings P-H may be formed or provided in a portion of the plate PLT. For example, the plate PLT may include the openings P-H, each of which has a shape passing from a top surface to a bottom surface of the plate PLT. The openings P-H may be in an area overlapping the folding area FA. When viewed on the plane, for example, in the third direction DR3 or in the thickness direction of the plate PLT, the openings P-H may overlap the folding area FA. A portion of the plate PLT may be more easily deformed due to the openings P-H. The plate PLT may have a thickness of about 160 micrometers to about 180 micrometers, for example, about 170 micrometers, but the thickness of the plate PLT is not limited thereto.

The cover layer CVL may be attached to the plate PLT. The cover layer CVL may cover the openings P-H of the plate PLT. Thus, the cover layer CVL may prevent foreign substances from being introduced into the openings P-H. The cover layer CVL may include thermoplastic polyurethane, but is not particularly limited thereto. The cover layer CVL may have a thickness of about 11 micrometers to about 21 micrometers, for example, about 16 micrometers, but the thickness of the cover layer CVL is not limited thereto.

The shielding layer MMP may be disposed below the plate PLT and the cover layer CVL. A sixth adhesive layer PSA6 may be disposed between the shielding layer MMP and the plate PLT. The sixth adhesive layer PSA6 may adhere the shielding layer MMP to the plate PLT. The sixth adhesive layer PSA6 may have a thickness of about 15 micrometers to about 25 micrometers, for example, about 20 micrometers, and the thickness of the sixth adhesive layer PSA6 is not limited thereto.

The shielding layer MMP may include magnetic metal powder. The shielding layer MMP may be a ferrite sheet, a magnetic metal powder layer, a magnetic layer, a magnetic circuit layer, or a magnetic path layer. The shielding layer MMP may shield magnetic fields that pass through the first display panel DP1. For example, the shielding layer MMP may guide a direction of the transmitted magnetic fields in a different direction. Thus, the magnetic fields that reach the shielding layer MMP may be shielded without leaking to the outside, for example, to a lower side of the shielding layer MMP. The shielding layer MMP may have a thickness of about 53 micrometers to about 63 micrometers, for example, about 58 micrometers, but the thickness of the shielding layer MMP is not limited thereto.

The lower sheet CUS may be disposed below the shielding layer MMP. The lower sheet CUS may reflect the magnetic fields toward the shielding layer MMP. The lower sheet CUS may include a metal or a metal alloy. For example, the lower sheet CUS may include aluminum, copper, or a copper alloy. The lower sheet CUS may have a thickness of about 15 micrometers to about 25 micrometers, for example, about 20 micrometers, but the thickness of the lower sheet CUS is not limited thereto.

The insulating film PET may be disposed under the lower sheet CUS. The insulating film PET may include polyethylene terephthalate, but is not particularly limited thereto. The insulating film PET may prevent the introduction of static electricity. For example, the insulating film PET may prevent electrical interference between members disposed on the insulating film PET and those disposed below it. A thickness of the insulating film PET may be about 3 micrometers to about 9 micrometers, for example, about 6 micrometers, but the thickness of the insulating film PET is not limited thereto.

The step compensation members ARS1, ARS2, and ARS3 may include a first step compensation member ARS1 attached to the insulating film PET, a second step compensation member ARS2 attached to the shielding layer MMP, and a third step compensation member ARS3 attached to the shielding layer MMP. A thickness of each of the first to third step compensation members ARS1, ARS2, and ARS3 may be set variously depending on a product structure or component arrangement relationship. For example, the thickness of the first step compensation member ARS1 may be about 90 micrometers, the thickness of the second step compensation member ARS2 may be about 87 micrometers, and the thickness of the third step compensation member ARS3 may be about 87 micrometers, but are not particularly limited thereto.

In addition, in an embodiment of the inventive concept, each of the sixth adhesive layer PSA6, the shielding layer MMP, the lower sheet CUS, and the insulating film PET may have a structure that is separated to form an empty space in an area overlapping the folding area FA. For example, each of the sixth adhesive layer PSA6, the shielding layer MMP, the lower sheet CUS, and the insulating film PET may be divided into two components spaced apart from each other with a predetermined gap therebetween at the area overlapping the folding area FA. The gap may be about 0.6 mm to about 1.7 mm, but is not particularly limited thereto.

Figure 5A:
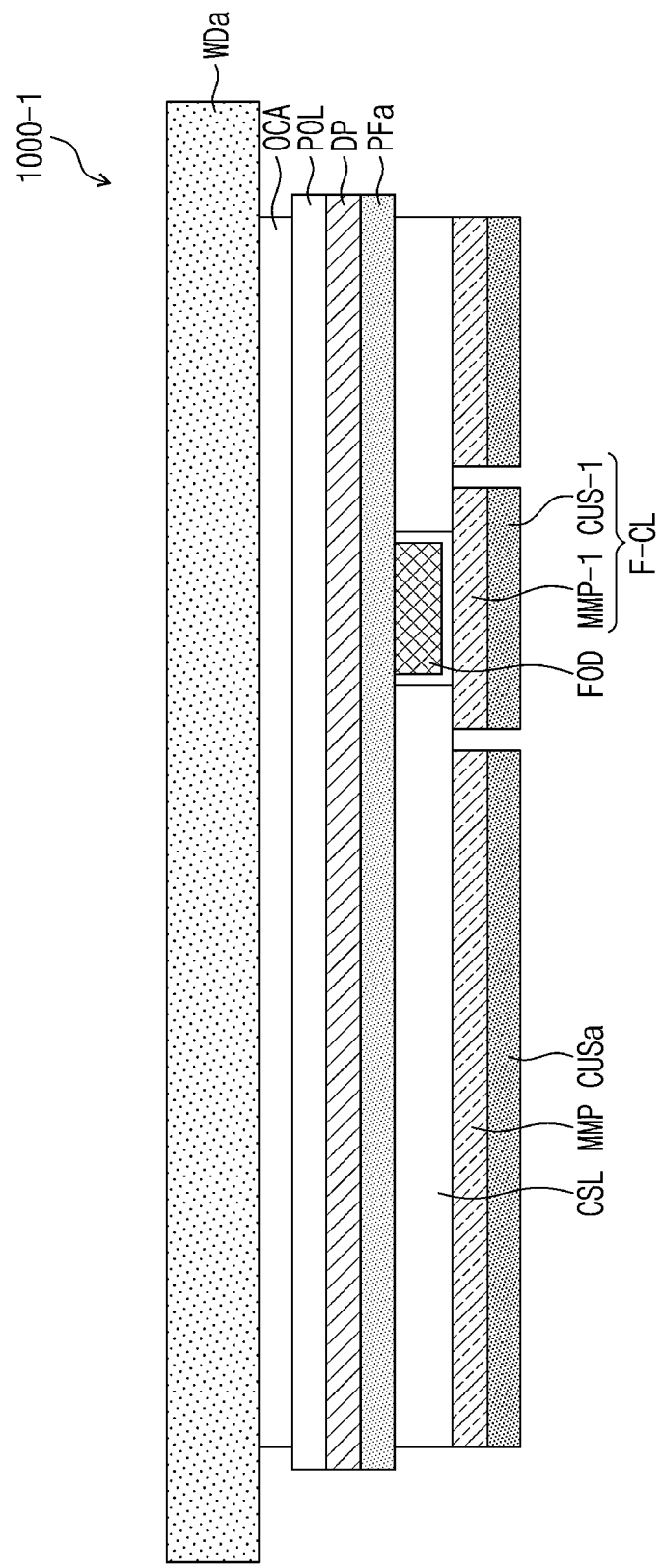
FIG. 5A is a cross-sectional view of an electronic device according to an embodiment of the inventive concept.

FIG. 5A is a cross-sectional view of an electronic device according to an embodiment of the inventive concept.

Referring to FIG. 5A, an electronic device 1000-1 may include a display panel DP, upper functional layers, and lower functional layers. The upper functional layers may include a window WDa, an adhesive layer OCA, and an anti-reflection layer POL, and the lower functional layers may include a protective film PFa, a first lower layer CSL, a shielding layer MMP, and a second lower layer CUSa, a fingerprint sensor FOD, and a cover layer F-CL. Components included in each of the upper functional layers and lower functional layers are not limited to the components described above. At least a portion of the above-described components may be omitted, and other components may be added.

The window WDa may include an optically transparent insulating material. For example, the window WDa may include a glass substrate or a synthetic resin film and may have a multi-layer structure or a single-layer structure. For example, the window WDa may be a glass substrate, and in this case, a thickness of the window WDa may be about 0.43 mm to about 0.53 mm, for example, about 0.48 mm, but the thickness of the window WDa is not limited to this.

The anti-reflection layer POL may be disposed below the window WDa. An adhesive layer OCA may be disposed between the anti-reflection layer POL and the window WDa. A thickness of the adhesive layer OCA may be about 0.10 mm to about 0.20 mm, for example, about 0.15 mm, but the thickness of the adhesive layer OCA is not limited thereto.

The anti-reflection layer POL may reduce reflectance of external light incident from the outside of the electronic device 1000-1. The anti-reflection layer POL may include a stretchable synthetic resin film. For example, the anti-reflection layer POL may be for by dyeing an iodine compound to a polyvinyl alcohol film (PVA film). However, this is merely an example, and the material forming the anti-reflection layer POL is not limited thereto. The anti-reflection member POL may have a thickness of about 50 micrometers to about 60 micrometers, for example, about 55 micrometers, and the thickness of the anti-reflection member POL is not limited thereto.

In an embodiment of the inventive concept, the anti-reflection layer POL may be omitted. Alternatively, the anti-reflection layer POL may be built into the display panel DP. In this case, the anti-reflection layer POL may include a partition wall layer that blocks light and a plurality of color filters or may include an optical layer that prevents reflection and a partition wall layer that blocks light.

The protective film PFa may be coupled to a rear surface of the display panel DP. The protective film PFa may have a thickness of about 83 micrometers to about 93 micrometers, for example, about 88 micrometers, but the thickness of the protective film PFa is not limited thereto.

The first lower layer CSL may be disposed under the protective film PFa. The first lower layer CSL may have a multi-layer structure. For example, the first lower layer CSL may include an embossed sheet and a cushion layer. The embossed sheet may absorb light passing through the display panel DP. In addition, the embossed sheet may include an embossed pattern to prevent bubbles from being generated when the first lower layer CSL is attached to the protective film PFa. The cushion layer may protect the display panel DP against an impact transmitted from the bottom of the display panel DP. The impact resistance characteristics of the electronic device 1000 may be improved by the cushion layer.

An opening may be formed in the first lower layer CSL, and the fingerprint sensor FOD may be disposed in the opening. In this case, the first lower layer CSL may include first and second portions that area separated from each other by the opening. The fingerprint sensor FOD may be attached to the protective film PFa. In an embodiment of the inventive concept, the fingerprint sensor FOD may be omitted.

The shielding layer MMP may be disposed below the first lower layer CSL. The shielding layer MMP may shield the magnetic fields that pass through the display panel DP. Thus, the magnetic fields that reach the shielding layer MMP may be shielded without leaking to the outside, for example, to a lower side of the shielding layer MMP. The shielding layer MMP may have a thickness of about 20 micrometers to about 30 micrometers, for example, about 25 micrometers, but the thickness of the shielding layer MMP is not limited thereto.

The second lower layer CUSa may be disposed below the shielding layer MMP. The second lower layer CUSa may include a metal or a metal alloy. For example, the second lower layer CUSa may include aluminum, copper, or a copper alloy. The second lower layer CUSa may have a thickness of about 7 micrometers to about 17 micrometers, for example, about 12 micrometers, and the thickness of the second lower layer CUSa is not limited thereto.

An opening corresponding to an area on which the fingerprint sensor FOD is disposed may be formed in the shielding layer MMP and the second lower layer CUSa. The cover layer F-CL may be disposed in the opening in the shielding layer MMP and the second lower layer CUSa and may cover the opening in the first lower layer CSL. In other words, the cover layer F-CL may be attached to the first lower layer CSL and may cover the fingerprint sensor FOD. In an embodiment, the cover layer F-CL may include a first cover layer MMP-1 including the same material as the shielding layer MMP and a second cover layer CUS-1 including the same material as the second lower layer CUSa. The first cover layer MMP-1 is disposed on the second cover layer CUS-1 and is located closer to the opening in the first lower layer CSL.

Figure 5B:
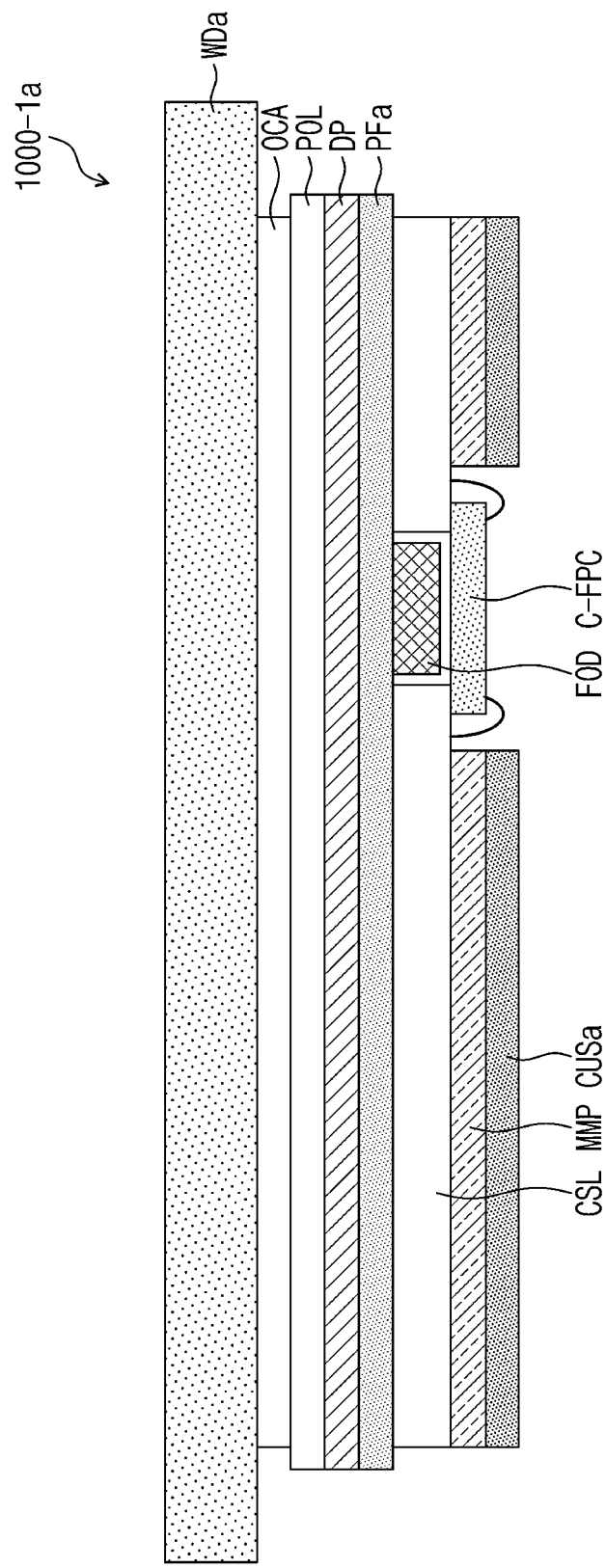
FIG. 5B is a cross-sectional view of an electronic device according to an embodiment of the inventive concept.

FIG. 5B is a cross-sectional view of an electronic device according to an embodiment of the inventive concept. In description of FIG. 5B, similar reference numerals may be given to the components that are similar to the components of FIG. 5A, and thus, their detailed descriptions will be omitted.

Referring to FIG. 5B, the electronic device 1000-1a may not include a cover layer F-CL (see FIG. 5A). The fingerprint sensor FOD may be covered by a sensing circuit board C-FPC that controls an operation of the fingerprint sensor FOD.

An opening corresponding to an area on which the fingerprint sensor FOD is disposed may be provided in the shielding layer MMP and the second lower layer CUSa. The sensing circuit board C-FPC may be disposed in the opening provided in the shielding layer MMP and the second lower layer CUSa and may cover the opening provided in the first lower layer CSL. For example, the sensing circuit board C-FPC may overlap the fingerprint sensor FOD and may be coupled to the first lower layer CSL.

Figure 6:
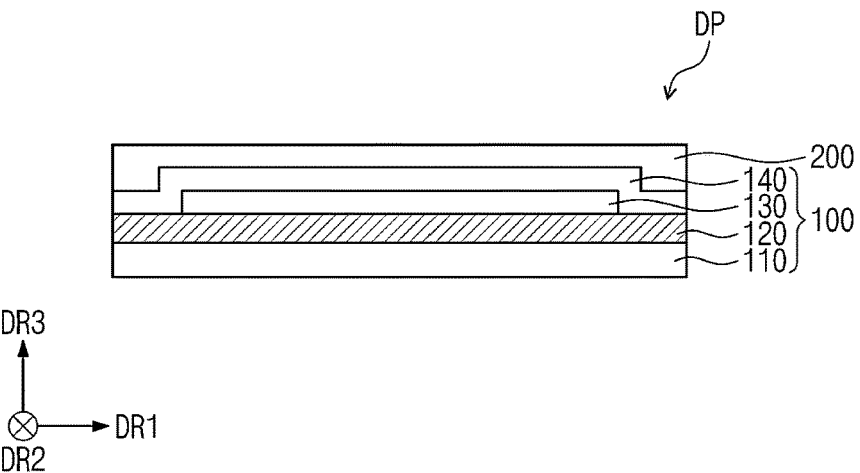
FIG. 6 is a schematic cross-sectional view of a display panel according to an embodiment of the inventive concept.

FIG. 6 is a schematic cross-sectional view of a display panel according to an embodiment of the inventive concept.

Referring to FIG. 6, the display panel DP may include a display layer 100 and a sensor layer 200.

The display layer 100 may be configured to generate an image. The display layer 100 may be an emission-type display layer. For example, the display layer 100 may be an organic light emitting display layer, an inorganic light emitting display layer, an organic-organic light emitting display layer, a quantum dot display layer, a micro light emitting diode (LED) display layer, or a nano LED display layer. The display layer 100 may include a base layer 110, a circuit layer 120, a light emitting element layer 130, and an encapsulation layer 140.

The base layer 110 may be a member that provides a base surface on which a circuit layer 120 is disposed. The base layer 110 may has a single layered structure or a multilayered structure. The base layer 110 may be a glass substrate, a metal substrate, a silicon substrate, or a polymer substrate, but is not particularly limited thereto.

The circuit layer 120 may be disposed on the base layer 110. The circuit layer 120 may be in direct contact with the base layer 110. The circuit layer 120 may include an insulating layer, a semiconductor pattern, a conductive pattern, and a signal line. The insulating layer, the semiconductor layer, and the conductive layer may be formed on the base layer 110 in a manner such as coating or vapor deposition, and then, the insulating layer, the semiconductor layer, and the conductive layer may be selectively patterned through a plurality of photolithography processes.

The light emitting element layer 130 may be disposed on the circuit layer 120. The light emitting element layer 130 may be in direct contact with the circuit layer 120. The light emitting element layer 130 may include a light emitting element. For example, the light emitting element layer 130 may include an organic light emitting material, an inorganic light emitting material, an organic-inorganic light emitting material, a quantum dot, a quantum rod, a micro LED, or a nano LED.

The encapsulation layer 140 may be disposed on the light emitting element layer 130. The encapsulation layer 140 may also be disposed on the circuit layer 120. The encapsulation layer 140 may protect the light emitting element layer 130 against foreign substances such as moisture, oxygen, and dust particles.

The sensor layer 200 may be disposed on the display layer 100. For example, the sensor layer 200 may be disposed on the encapsulation layer 140. The sensor layer 200 may sense an external input applied from the outside. The sensor layer 200 may be an integrated sensor formed continuously during the process of manufacturing the display layer 100, or the sensor layer 200 may be an external sensor attached to the display layer 100. The sensor layer 200 may be referred to as a sensor, an input sensor layer, an input sensing panel, or an electronic device for sensing input coordinates.

According to an embodiment of the inventive concept, the sensor layer 200 may sense inputs from both a passive input source, such as a user's body, and an input device that generates magnetic fields at a specific resonant frequency. The input device may be a pen, an input pen, a magnetic pen, a stylus pen, or an electromagnetic resonance pen.

Figure 7:
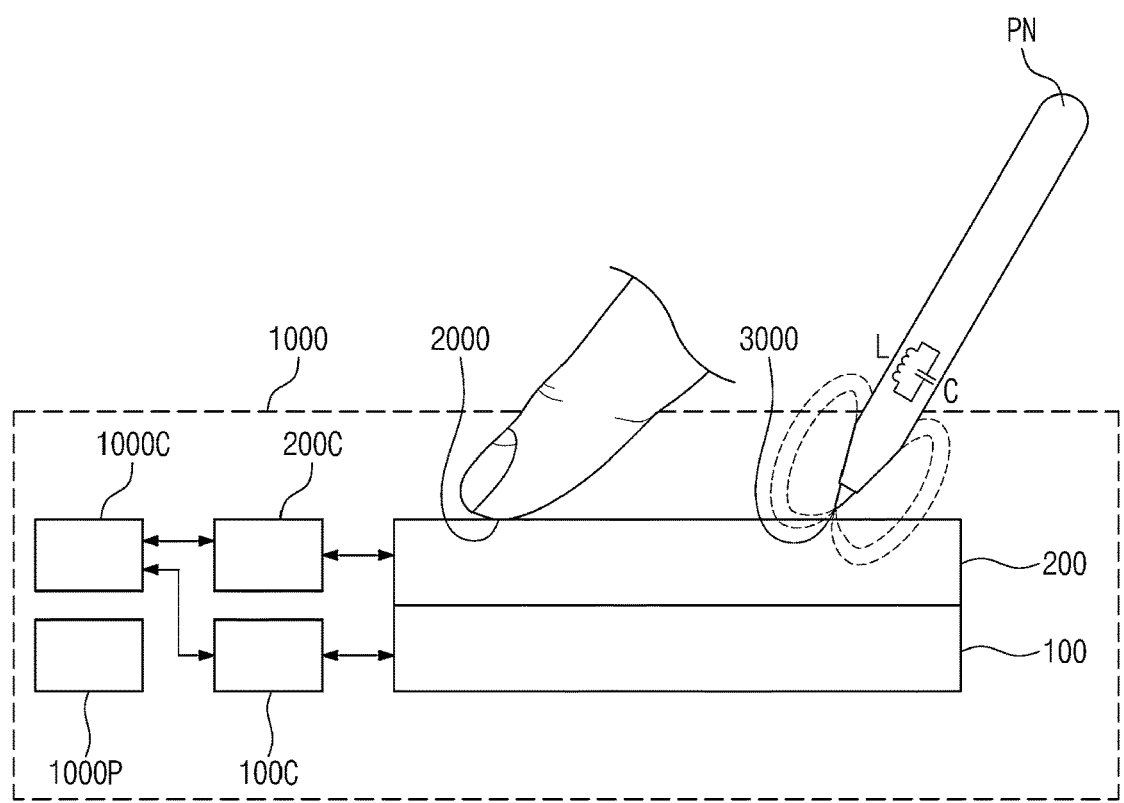
FIG. 7 is a view for explaining an operation of the electronic device according to an embodiment of the inventive concept.

FIG. 7 is a view for explaining an operation of the electronic device according to an embodiment of the inventive concept.

Referring to FIG. 7, the electronic device 1000 includes a display layer 100, a sensor layer 200, a display driver 100C, a sensor driver 200C, a main driver 1000C, and a power circuit 1000P.

The sensor layer 200 may sense a first input 2000 or a second input 3000 applied from the outside. Each of the first input 2000 and the second input 3000 may be an input unit capable of providing a change in capacitance of the sensor layer 200 or an input unit capable of causing induced current in the sensor layer 200. For example, the first input 2000 may be a passive input unit such as the user's body. The second input 3000 may be an input using the pen PN or a radio frequency integrated circuit (RFIC) tag. For example, the pen PN may be a passive type pen or an active type pen.

In an embodiment of the inventive concept, the pen PN may be a device that generates magnetic fields having a predetermined resonant frequency. The pen PN may be configured to transmit an output signal based on electromagnetic resonance. The pen PN may be an input device, an input pen, a magnetic pen, a stylus pen, or an electromagnetic resonance pen.

The pen PN may include an RLC resonance circuit, and the RLC resonance circuit may include an inductor L and a capacitor C. In an embodiment of the inventive concept, the RLC resonance circuit may be a variable resonance circuit that varies in resonance frequency. In this case, the inductor L may be a variable inductor, and/or the capacitor C may be a variable capacitor, but are not particularly limited thereto.

The inductor L may generate current by the magnetic fields generated in the sensor layer 200. However, an embodiment of the inventive concept is not particularly limited thereto. For example, when the pen PN operates as an active type, the pen PN may generate current even if it does not receive magnetic fields from the outside. The generated current may be transferred to the capacitor C. The capacitor C may charge the current input from the inductor L and discharge the charged current to the inductor L. Thereafter, the inductor L may emit magnetic fields at the resonant frequency. The induced current may flow in the sensor layer 200 due to the magnetic fields emitted by the pen PN, and the induced current may be transmitted to the sensor driver 200C as a received signal (or a sensing signal, a signal, and the like).

The main driver 1000C may control an overall operation of the electronic device 1000. For example, the main driver 1000C may control operations of the display driver 100C and the sensor driver 200C. The main driver 1000C may include at least one microprocessor and may further include a graphic controller. The main driver 1000C may be an application processor, a central processing unit, or a main processor.

The display driver 100C may control the display layer 100. The display driver 100C may receive image data and a control signal from the main driver 1000C. The control signal may include various signals. For example, the control signal may include an input vertical synchronization signal, an input horizontal synchronization signal, a main clock, and a data enable signal.

The sensor driver 200C may control the sensor layer 200. The sensor driver 200C may receive the control signal from the main driver 1000C. The control signal may include a clock signal of the sensor driver 200C. In addition, the control signal may further include a mode decision signal that determines a driving mode of the sensor driver 200C and the sensor layer 200.

The sensor driver 200C may be implemented as an integrated circuit (IC) and electrically connected to the sensor layer 200. For example, the sensor driver 200C may be mounted directly on a predetermined area of the display panel or mounted on a separate printed circuit board using a chip on film (COF) method and electrically connected to the sensor layer 200.

The sensor driver 200C and the sensor layer 200 may selectively operate in the first mode or the second mode. For example, the first mode may be a mode for sensing a touch input, for example, the first input 2000. The second mode may be a mode for sensing a pen PN input, for example, the second input 3000. The first mode may be a touch sensing mode, and the second mode may be a pen sensing mode.

Switching between the first mode and the second mode can be achieved in various ways. For example, the sensor driver 200C and the sensor layer 200 operate in a time-division manner in the first and second modes, allowing them to sense the first input 2000 and the second input 3000. Alternatively, switching between the first mode and the second mode may occur based on the user's selection or specific actions. Activating or deactivating a specific application may also trigger the switch from one mode to the other. Alternatively, when the first input 2000 is sensed while the sensor driver 200C and the sensor layer 200 are operating alternately in the first mode and the second mode, the sensor driver 200C and the sensor layer 200 may be maintained in the first mode, and when the second input 3000 is sensed, the sensor driver 200C and the sensor layer 200 may be maintained in the second mode.

The sensor driver 200C may calculate input coordinate information based on the signal received from the sensor layer 200 and provide a coordinate signal with the coordinate information to the main driver 1000C. The main driver 1000C may execute an operation corresponding to a user input based on the coordinate signal. For example, the main driver 1000C may operate the display driver 100C to display a new application image on the display layer 100.

The power circuit 1000P may include a power management integrated circuit (PMIC). The power circuit 1000P may generate a plurality of driving voltages for driving the display layer 100, the sensor layer 200, the display driver 100C, and the sensor driver 200C. For example, the plurality of driving voltages may include a gate high voltage, a gate low voltage, a first driving voltage (e.g., ELVSS voltage), a second driving voltage (e.g., ELVDD voltage), an initialization voltage, etc., but is not particularly limited thereto.

Figure 8:
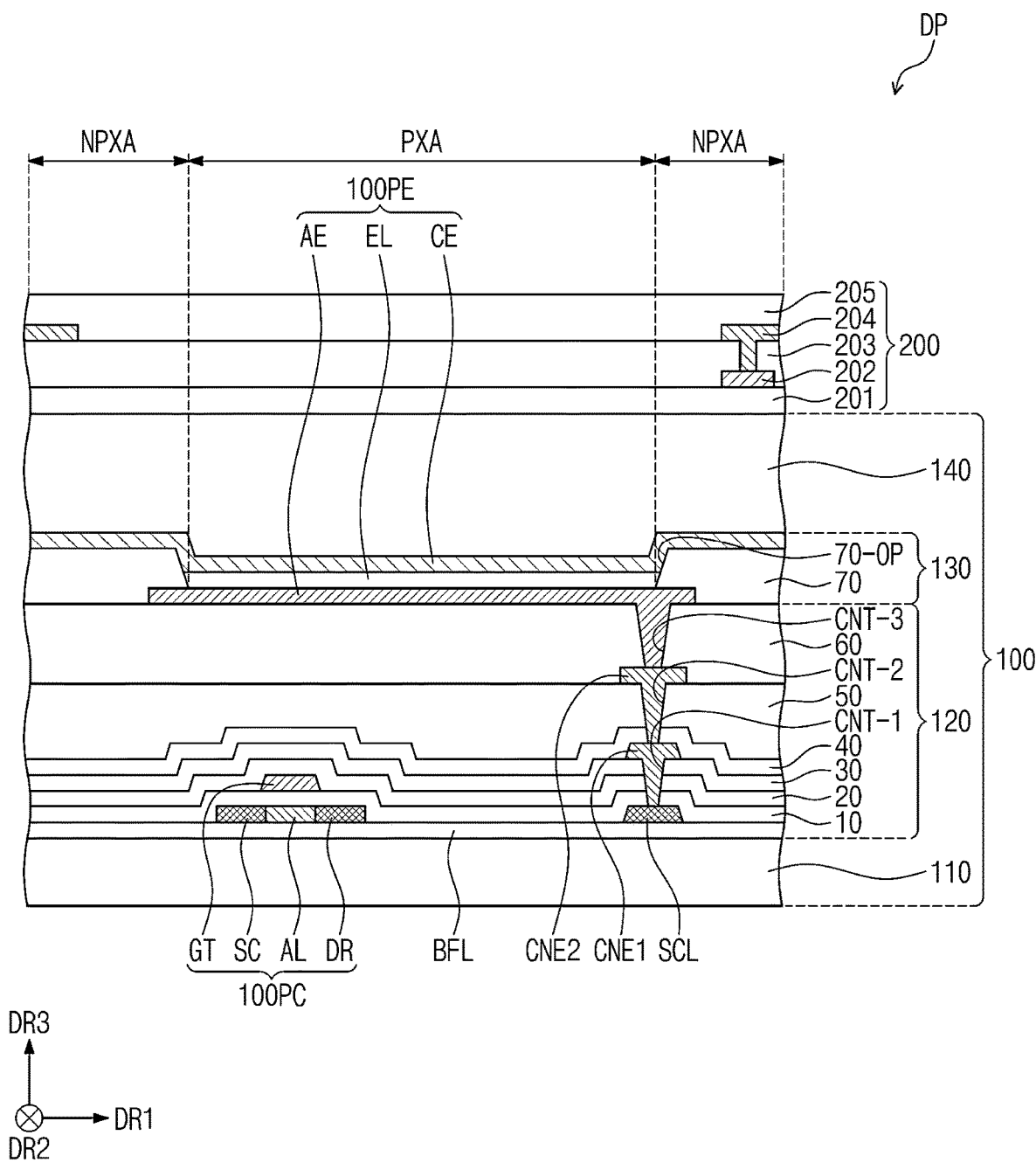
FIG. 8 is a cross-sectional view of the display panel according to an embodiment of the inventive concept.

FIG. 8 is a cross-sectional view of the display panel according to an embodiment of the inventive concept.

Referring to FIG. 8, at least one buffer layer BFL disposed on a top surface of the base layer 110. The buffer layer BFL may improve bonding force between the base layer 110 and a semiconductor pattern. The buffer layer BFL may be provided as a multilayer. Alternatively, the display layer 100 may further include a barrier layer. The buffer layer BFL may include at least one of silicon oxide, silicon nitride, or silicon oxynitride. For example, the buffer layer BFL may include a structure in which the silicon oxide layer and the silicon nitride layer are alternately laminated.

Semiconductor patterns SC, AL, DR, and SCL may be disposed on the buffer layer BFL. Each of the semiconductor patterns SC, AL, DR, and SCL may include polysilicon. However, each of the semiconductor patterns SC, AL, DR, and SCL is not limited thereto and may include amorphous silicon, low-temperature polycrystalline silicon, or an oxide semiconductor.

FIG. 8 shows some semiconductor patterns SC, AL, DR, and SCL; however, an additional semiconductor pattern may be disposed on the other area. The semiconductor patterns SC, AL, DR, and SCL may be arranged according to specific rules across pixels. The semiconductor patterns SC, AL, DR, and SCL may have different electrical properties depending on whether the semiconductor patterns SC, AL, DR, and SCL are doped. The semiconductor patterns SC, AL, DR, and SCL may include first regions SC, DR, and SCL having high conductivity and a second region AL having low conductivity. The first regions SC, DR, and SCL may be doped with an N-type dopant or a P-type dopant. A P-type transistor may include a doped region doped with the P-type dopant, and an N-type transistor may include a doped region doped with the N-type dopant. The second region AL may be a non-doped region or may be doped at a concentration less than that of the first region.

The conductivity of the first regions SC, DR, and SCL may be greater than that of the second region AL and may serve as an electrode or a signal line. The second region AL may correspond to an active region AL (or channel) of the transistor 100PC. In other words, a portion AL of the semiconductor pattern SC, AL, DR, and SCL may be the active region AL of transistor 100PC, other portions SC and DR of the semiconductor pattern SC, AL, DR, and SCL may be a source region SC of the transistor 100PC or a drain region DR, and another portion SCL of the semiconductor pattern SC, AL, DR, and SCL may be a connection electrode or a connection signal line SCL.

Each of the pixels may have an equivalent circuit including seven transistors, one capacitor, and a light emitting element, and an equivalent circuit diagram of the pixel may be modified in various forms. In FIG. 8, one transistor 100PC and light emitting element 100PE provided in a pixel are illustrated as an example.

The source region SC, the active region AL, and the drain region DR of the transistor 100PC may be formed from the semiconductor patterns SC, AL, DR, and SCL. The source region SC and the drain region DR may extend in opposite directions from the active region AL on a cross section. FIG. 8 illustrates a portion of the connection signal line SCL formed from the semiconductor patterns SC, AL, DR, and SCL. The connection signal line SCL may be connected to the drain region DR of the transistor 100PC on the plane.

A first insulating layer 10 may be disposed on the buffer layer BFL. The first insulating layer 10 may commonly overlap a plurality of pixels and may cover the semiconductor patterns SC, AL, DR, and SCL. The first insulating layer 10 may include an inorganic layer and/or an organic layer and have a single-layered or multilayered structure. The first insulating layer 10 may include at least one of aluminum oxide, titanium oxide, silicon oxide, silicon nitride, silicon oxynitride, zirconium oxide, or hafnium oxide. In this embodiment, the first insulating layer 10 may include a single-layered silicon oxide layer. The insulating layer of the circuit layer 120, which will be described later, as well as the first insulating layer 10 may be an inorganic layer and/or an organic layer and may have a single-layered or a multilayered structure. The inorganic layer may include at least one of the above-described materials, but is not limited thereto.

A gate GT of the transistor 100PC is disposed on the first insulating layer 10. The gate GT may be a portion of a metal pattern. The gate GT overlaps the active region AL. In the process of doping or reducing the semiconductor patterns SC, AL, DR, and SCL, the gate GT may function as a mask.

A second insulating layer 20 may be disposed on the first insulating layer 10 to cover the gate GT. The second insulating layer 20 may commonly overlap the pixels. The second insulating layer 20 may be an inorganic layer and/or an organic layer and have a single-layered or multilayered structure. The second insulating layer 20 may include at least one of silicon oxide, silicon nitride, or silicon oxynitride. In this embodiment, the second insulating layer 20 may have a multilayer structure including a silicon oxide layer and a silicon nitride layer.

A third insulating layer 30 may be disposed on the second insulating layer 20. The third insulating layer 30 may has a single layer or multilayer structure. For example, the third insulating layer 30 may have a multilayer structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 passing through the first to third insulating layers 10 to 30.

A fourth insulating layer 40 may be disposed on the third insulating layer 30. The fourth insulating layer 40 may be a single-layered silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 passing through the fourth insulating layer 40 and the fifth insulating layer 50.

A sixth insulating layer 60 may be disposed on the fifth insulating layer 50 to cover the second connection electrode CNE2. The sixth insulating layer 60 may be an organic layer.

A light emitting element layer 130 may be disposed on the circuit layer 120. The light emitting element layer 130 may include a light emitting element 100PE. For example, the light emitting element layer 130 may include an organic light emitting material, an inorganic light emitting material, an organic-inorganic light emitting material, a quantum dot, a quantum rod, a micro LED, or a nano LED. Hereinafter, the light emitting device 100PE is described as an example of an organic light emitting element, but is not particularly limited thereto.

The light emitting element 100PE may include a first electrode AE, an emission layer EL, and a second electrode CE.

The first electrode AE may be disposed on the sixth insulating layer 60. The first electrode AE may be connected to the second connection electrode CNE2 through a contact hole CNT-3 passing through the sixth insulating layer 60.

A pixel defining layer 70 may be disposed on the sixth insulating layer 60 to cover a portion of the first electrode AE. An opening 70-OP is defined in the pixel defining layer 70. The opening 70-OP of the pixel defining layer 70 exposes at least a portion of the first electrode AE.

The first display part DA1-F (see FIG. 1A) may include a emission area PXA and a non-emission area NPXA adjacent to the emission area PXA. A non-emission area NPXA may surround the emission area PXA. In this embodiment, an emission area PXA may correspond to a portion of an area of the first electrode AE, which is exposed by the opening 70-OP.

The emission layer EL may be disposed on the first electrode AE. The emission layer EL may be disposed on an area corresponding to the opening 70-OP. In other words, the emission layer EL may be separated from each of the pixels. When the emission layer EL is separated from each of the pixels, each of the emission layers EL may emit light having at least one of blue, red, or green color. However, the embodiment of the inventive concept is not limited thereto. For example, the emission layer EL may be commonly provided to be connected to the pixels. In this case, the emission layer EL may provide blue light or white light.

The second electrode CE may be disposed on the emission layer EL. The second electrode CE may have an integrated shape and may be commonly disposed on the plurality of pixels.

In an embodiment of the inventive concept, a hole control layer may be disposed between the first electrode AE and the emission layer EL. The hole control layer may be commonly disposed on the emission area PXA and the non-emission area NPXA. The hole control layer may include a hole transport layer and may further include a hole injection layer.

An electron control layer may be disposed between the emission layer EL and the second electrode CE. The electron control layer may include an electron transport layer and may further include an electron injection layer. The hole control layer and the electron control layer may be commonly provided in the pixels by using an open mask or inkjet process.

An encapsulation layer 140 may be disposed on the light emitting element layer 130. The encapsulation layer 140 may include an inorganic layer, an organic layers, and an inorganic layer, which are sequentially laminated, but layers constituting the encapsulation layer 140 are not limited thereto. The inorganic layers may protect the light emitting element layer 130 against moisture and oxygen, and the organic layer may protect the light emitting element layer 130 against foreign substances such as dust particles. The inorganic layers may include a silicon nitride layer, a silicon oxynitride layer, a silicon oxide layer, a titanium oxide layer, or an aluminum oxide layer. The organic layer may include an acrylic-based organic layer, but the embodiment of the inventive concept is not limited thereto.

The sensor layer 200 may include a sensor base layer (or base layer) 201, a first conductive layer 202, a sensor insulating layer (or first insulating layer) 203, a second conductive layer 204, and a cover insulating layer (or second insulating layer) 205.

The sensor base layer 201 may be an inorganic layer containing at least one of silicon nitride, silicon oxynitride, or silicon oxide. Alternatively, the sensor base layer 201 may be an organic layer including an epoxy resin, an acrylic resin, or an imide-based resin. The sensor base layer 201 may have a single-layered structure or a multilayered structure in which a plurality of layers are laminated in the third direction DR3.

Each of the first conductive layer 202 and the second conductive layer 204 may have a single-layered structure or a multilayered structure in which a plurality of layers are laminated in the third directional axis DR3. In addition, the first conductive layer 202 and the second conductive layer 204 are illustrated in FIG. 8, but are not limited thereto. For example, a third conductive layer and a fourth conductive layer spaced apart from each other in the third direction DR3 with the insulating layer therebetween may be further disposed. Particularly, at least one of the third conductive layer or the fourth conductive layer may be disposed under the display layer 100.

Each of the first conductive layer 202 and the second conductive layer 204, each of which has a single layer structure, may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), or indium zinc tin oxide (IZTO). In addition, the transparent conductive layer may include conductive polymers such as poly (3,4-ethylenedioxythiophene) (PEDOT), metal nanowires, graphene, and the like.

Each of the first conductive layer 202 and the second conductive layer 204, each of which has a multi-layered structure, may include a metal layer. The metal layers may have a three-layered structure of titanium/aluminum/titanium. The conductive layer having the multilayered structure may include at least one metal layer and at least one transparent conductive layer.

At least one of the sensor insulating layer 203 or the cover insulating layer 205 may include an inorganic layer. The inorganic layer may include at least one of oxide, titanium oxide, silicon oxide, silicon nitride, silicon oxynitride, zirconium oxide, or hafnium oxide.

At least one of the sensor insulating layer 203 or the cover insulating layer 205 may include an organic layer. The organic layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin.

Figure 9:
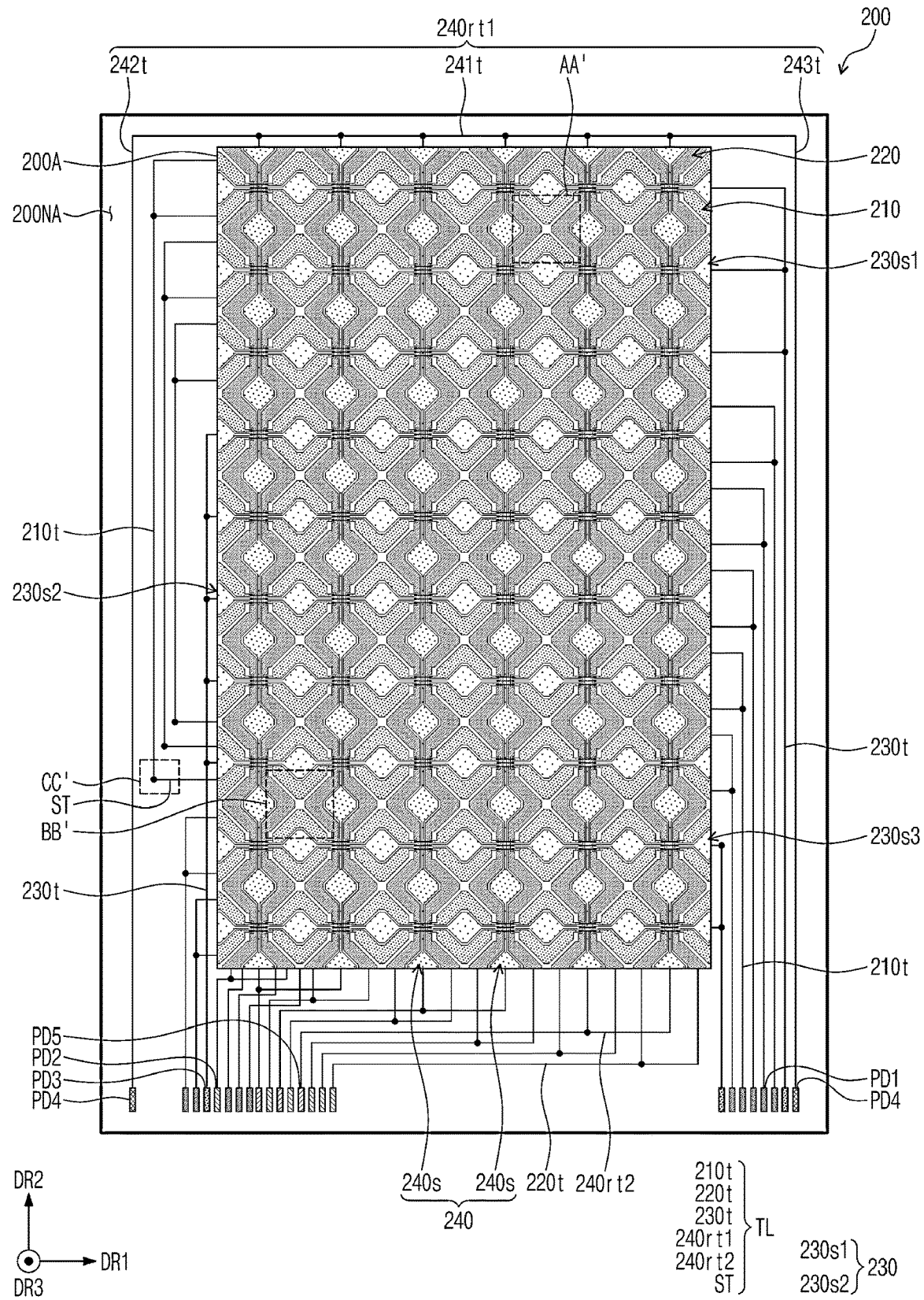
FIG. 9 is a plan view of a sensor layer according to an embodiment of the inventive concept.
Figure 10:
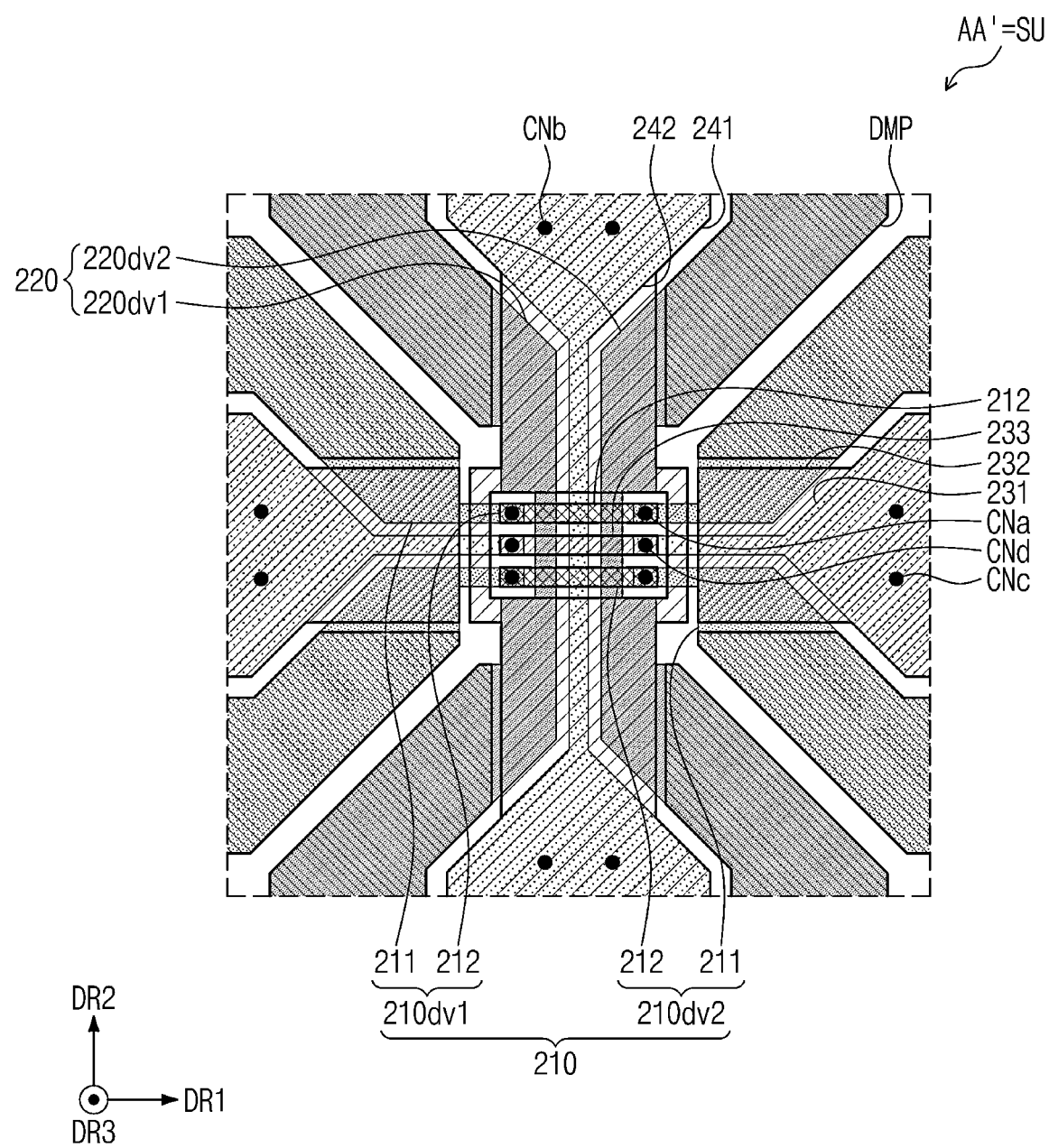
FIG. 10 is an enlarged view of an area AA' of FIG. 9.
Figure 11A:
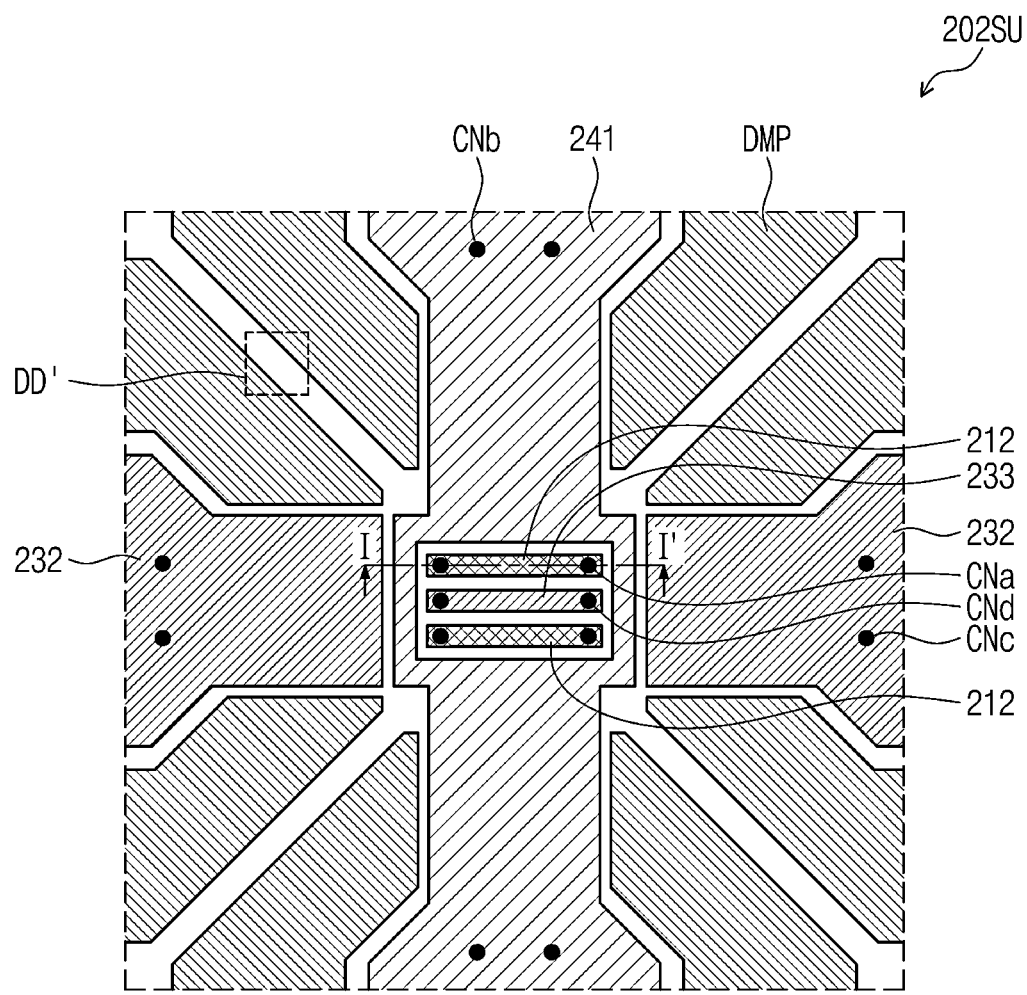
FIG. 11A is a plan view illustrating a first conductive layer of the sensing unit according to an embodiment of the inventive concept.
Figure 11B:
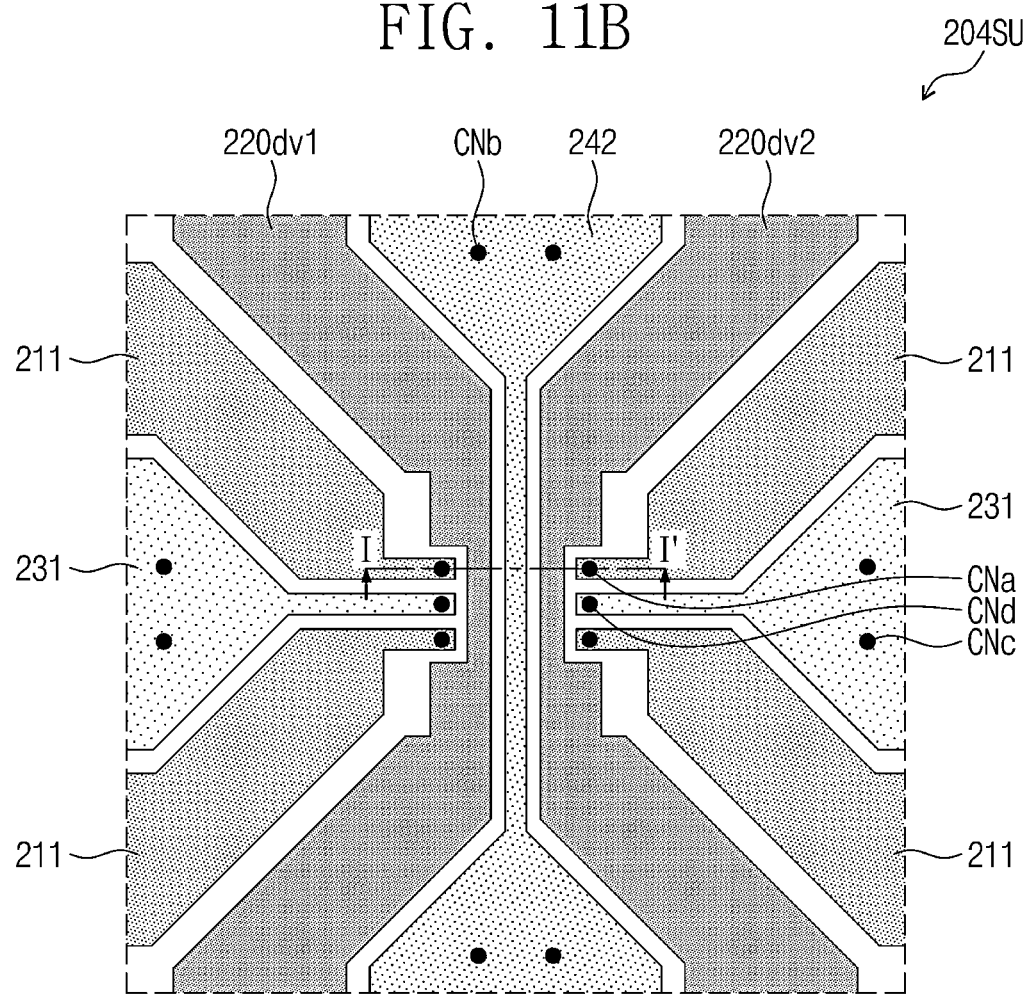
FIG. 11B is a plan view illustrating a second conductive layer of the sensing unit according to an embodiment of the inventive concept.
Figure 12:
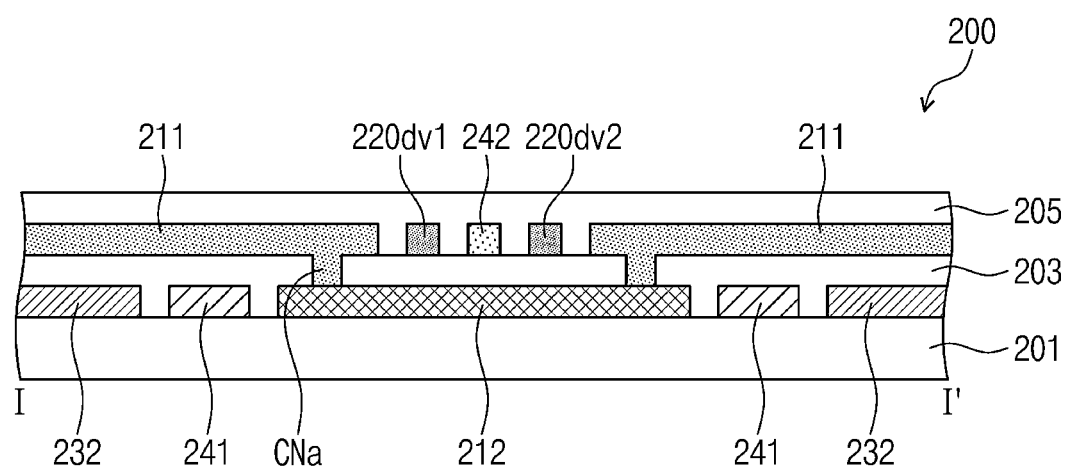
FIG. 12 is a cross-sectional view of a sensor layer, taken along line I-I' in each of FIGS. 11A and 11B according to an embodiment of the inventive concept.
Figure 13:
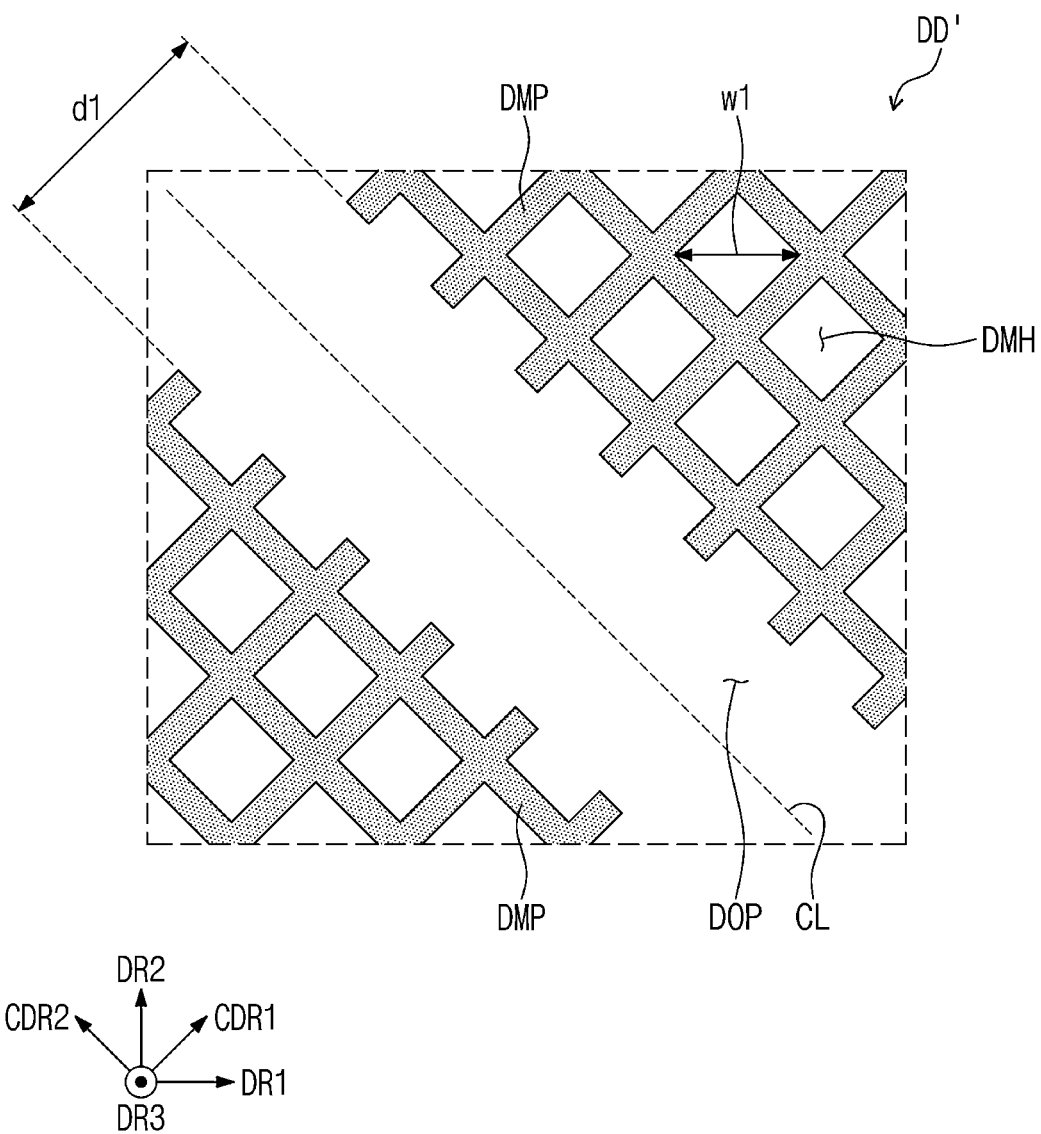
FIG. 13 is an enlarged view of an area DD' of FIG. 11A.

FIG. 9 is a plan view of a sensor layer according to an embodiment of the inventive concept. FIG. 10 is an enlarged view of an area AA' of FIG. 9. For example, FIG. 10 is an enlarged plan view of a sensing unit SU according to an embodiment of the inventive concept. FIG. 11A is a plan view illustrating a first conductive layer 202SU of the sensing unit SU according to an embodiment of the inventive concept. FIG. 11B is a plan view illustrating a second conductive layer 204SU of the sensing unit SU according to an embodiment of the inventive concept. FIG. 12 is a cross-sectional view of a sensor layer, taken along line I-I' in each of FIGS. 11A and 11B according to an embodiment of the inventive concept. FIG. 13 is an enlarged view of an area DD' of FIG. 11A.

Referring to FIG. 9, the sensor layer 200 may include a sensing area 200A that senses an external input and a peripheral area 200NA adjacent to the sensing area 200A.

The sensor layer 200 may include a plurality of first electrodes 210, a plurality of second electrodes 220, a plurality of third electrodes 230, and a plurality of fourth electrodes 240. The plurality of first electrodes 210, the plurality of second electrodes 220, the plurality of third electrodes 230, and the plurality of fourth electrodes 240 may be disposed on the sensing area 200A. The first electrodes 210 and the third electrodes 230 may be electrically insulated from each other, and the second electrodes 220 and the fourth electrodes 240 may be electrically insulated from each other.

The sensor layer 200 may include a plurality of trace lines TL connected to the first to fourth electrodes 210, 220, 230, and 240. The trace lines TL may include a plurality of first trace lines 210t connected to the first electrodes 210, a plurality of second trace lines 220t connected to the second electrodes 220, a plurality of third trace lines 230t connected to the third electrodes 230, a plurality of fourth and fifth trace lines 240rt1 and 240rt2 connected to the fourth electrodes 240, and a sub trace line ST connected to at least a portion of the first trace lines 210t. The first trace lines 210t, the second trace lines 220t, the third trace lines 230t, and the fourth trace lines 240t may be disposed on a peripheral area 200NA, a portion of the sub trace line ST may be disposed on the sensing area 200A, and a remaining portion of the sub trace line ST may be disposed on the peripheral area 200NA. The sub trace line ST may be provided in plural. Details about the sub trace line ST will be described later.

Each of the first electrodes 210 may cross the second electrodes 220 in the plane. The first sensing electrodes 210 may extend in the first direction DR1 and may be spaced apart from each other in the second direction DR2. The second sensing electrodes 220 may extend in the second direction DR2 and may be spaced apart from each other in the first direction DR1. The sensing unit SU (see FIG. 10) of the sensor layer 200 may be an area on which one first electrode 210 and one second electrode 220 cross each other.

In FIG. 9, 10 first electrodes 210 and 6 second electrodes 220 may be illustrated as an example, and 60 sensing units SU may be illustrated as an example. However, the first electrodes 210 and the number of second electrodes 220 are not limited thereto.

Referring to FIGS. 8 and 9, one or more electrodes of the plurality of first electrodes 210, the plurality of second electrodes 220, the plurality of third electrodes 230, and the plurality of fourth electrodes 240, which are described above, may be disposed below the base layer 110 of the display layer 100 illustrated in FIG. 8. A signal line connected to the electrodes disposed below the base layer 110 of the display layer 100 may also be disposed below the base layer 110 of the display layer 100. In an embodiment of the inventive concept, the plurality of first electrodes 210, the plurality of second electrodes 220, the plurality of third electrodes 230, and the plurality of fourth electrodes 240 may be provided as four conductive layers disposed on layers different from each other. For example, the plurality of first electrodes 210 may be formed from the first conductive layer disposed on the base layer 201 of the sensor layer 200, the plurality of second electrodes 220 may be formed from the second conductive layer disposed on the first conductive layer, the plurality of third electrodes 230 may be formed from the third conductive layer disposed on the second conductive layer, and the plurality of fourth electrodes 240 may be formed from the fourth conductive layer disposed on the third conductive layer.

Referring to FIGS. 9 and 10, each of the first electrodes 210 may include first division electrodes 210dv1 and 210dv2. The first electrodes 210 may extend along the first direction DR1 and may be spaced apart from each other in the second direction DR2. The first division electrodes 210dv1 and 210dv2 may have shapes that are symmetrical to each other with respect to a line extending in the first direction DR1.

Each of the second electrodes 220 may include second division electrodes 220dv1 and 220dv2. The second division electrodes 220dv1 and 220dv2 may extend along the second direction DR2 and may be spaced apart from each other in the first direction DR1. The second division electrodes 220dv1 and 220dv2 may have shapes that are symmetrical to each other with respect to a line extending in the second direction DR2.

Referring to FIGS. 10, 11A, 11B, and 12, each of the first division electrodes 210dv1 and 210dv2 may include a sensing pattern 211 and a bridge pattern 212. The sensing pattern 211 and the bridge pattern 212 may be disposed on different layers, and the sensing pattern 211 and the bridge pattern 212 may be electrically connected to each other through a first contact CNa. For example, the bridge pattern 212 may be included in the first conductive layer 202SU, and the sensing pattern 211 and the second division electrodes 220dv1 and 220dv2 may be included in the second conductive layer 204SU. The first conductive layer 202SU may be included in the first conductive layer 202 of FIG. 8, and the second conductive layer 204SU may be included in the second conductive layer 204 of FIG. 8.

The third electrodes 230 may be arranged along the second direction DR2, and the third electrodes 230 may extend along the first direction DR1. In an embodiment of the inventive concept, each of the third electrodes 230 may include first auxiliary electrodes 230s1, 230s2, and 230s3 connected in parallel. The first auxiliary electrodes 230s1, 230s2, and 230s3 may be referred to as a (1-1)th auxiliary electrode 230s1, a (1-2)th auxiliary electrode 230s2, and a (1-3)th auxiliary electrode 230s3.

The routing directions of the (1-1)th auxiliary electrode 230s1, the (1-2)th auxiliary electrode 230s2, and the (1-3)th auxiliary electrode 230s3 may be different from each other. In FIG. 9, three third electrodes 230 may be illustrated, and three (1-1)th auxiliary electrodes 230s1 respectively included in three third electrodes 230, five (1-2)th auxiliary electrodes 230s2, and two (1-3)th auxiliary electrodes 230s3 may be illustrated as an example.

In this specification, different routing directions may mean that connection positions between the electrodes and the trace lines are different from each other. In other words, varying routing directions imply that the connection points between the electrodes and the trace lines differ from one another. For example, the connection positions of the third trace lines 230t electrically connected to each of the (1-1)th auxiliary electrode 230s1, the (1-2)th auxiliary electrode 230s2, and the (1-3)th auxiliary electrode 230s3 may be different from each other. The connection positions of the third trace lines 230t electrically connected to each of the (1-1)th auxiliary electrode 230s1, the (1-2)th auxiliary electrode 230s2, and the (1-3)th auxiliary electrode 230s3 may be at left ends of the first auxiliary electrodes 230s1 or may be at right ends of the first auxiliary electrode 230s2.

In another embodiment of the inventive concept, the sensor layer 200 may include one third electrode 230. In this case, the third electrode 230 may include ten first auxiliary electrodes 230s1, 230s2, and 230s3 connected in parallel. The number of first auxiliary electrodes 230s1, 230s2, and 230s3 illustrated in FIG. 9, is not be limited to the example shown.

Each of the fourth electrodes 240 may extend in the second direction DR2, and the fourth electrodes 240 may be spaced apart from each other in the first direction DR1. In an embodiment of the inventive concept, the fourth electrodes 240 may include a plurality of second auxiliary electrodes 240s connected in parallel, respectively. The number of second auxiliary electrodes 240s included in each of the fourth electrodes 240 may vary. For example, as the number of second auxiliary electrodes 240s included in each of the fourth electrodes 240 increases, the resistance of each of the fourth electrodes 240 may decrease, enhancing power efficiency and improving sensing sensitivity. On the other hand, as the number of second auxiliary electrodes 240s included in each of the fourth electrodes 240 decreases, a loop coil pattern formed by the fourth electrodes 240 can be designed in a wider variety of configurations.

Although FIG. 9 illustrates an example in which one fourth electrode 240 includes two second auxiliary electrodes 240s, the present disclosure is not particularly limited thereto. The second auxiliary electrodes 240s may be arranged to one-to-one correspond to the second electrodes 220. Thus, one sensing unit SU may include a portion of one second auxiliary electrode 240s.

A coupling capacitor may be formed between one second electrode 220 and one second auxiliary electrode 240s. In this case, the induced current generated during pen sensing may be transmitted from the second auxiliary electrode 240s to the second electrode 220 via the coupling capacitor. In other words, the second auxiliary electrode 240s may supplement a signal transmitted from the second electrode 220 to the sensor driver 200C (see FIG. 7). Thus, the optimal effect may be achieved when a phase of the signal induced in the second auxiliary electrode 240s matches a phase of the signal induced in the second electrode 220. Thus, centers of the second electrodes 220 in the second direction DR2 and centers of the second auxiliary electrodes 240s in the second direction DR2 may overlap each other. In addition, a center of each of the second electrodes 220 in the first direction DR1 and a center of each of the second auxiliary electrodes 240s in the first direction DR1 may also overlap each other.

In an embodiment of the inventive concept, since one fourth electrode 240 includes two second auxiliary electrodes 240s, one fourth electrode 240 may correspond to (overlap) two second electrodes 220. Thus, the number of second electrodes 220 included in the sensor layer 200 may be greater than the number of fourth electrodes 240. For example, the number of second electrodes 220 may be the same as the product of the number of fourth electrodes 240 included in the sensor layer 200 and the number of second auxiliary electrodes 240s included in each of the fourth electrodes 240. In FIG. 9, the number of second electrodes 220 may be 6, the number of fourth electrodes 240 may be 3, and the number of second auxiliary electrodes 240s included in each of the fourth electrodes 240 may be 2.

In an embodiment of the inventive concept, when each of the third electrodes 230 includes first auxiliary electrodes 230s1, 230s2, and 230s3 connected in parallel, a surface area of one third electrode 230 may increase. In addition, resistance of each of the third electrodes 230 may decrease to improve sensing sensitivity to a second input 3000 (see FIG. 7).

A coupling capacitor may be formed between one first electrode 210 and one of the first auxiliary electrodes 230s1, 230s2, or 230s3. In this case, the induced current generated during pen sensing may be transmitted from the first auxiliary electrode 230s1, 230s2, or 230s3 to the first electrode 210 via the coupling capacitor. In other words, the first auxiliary electrode 230s1, 230s2, or 230s3 may supplement a signal transmitted from the first electrode 210 to the sensor driver 200C (see FIG. 7). Thus, the optimal effect may be achieved when a phase of the signal induced in the first auxiliary electrode 230s1, 230s2, or 230s3 matches a phase of the signal induced in the first electrode 210. Thus, a center of each of the first electrodes 210 in the first direction DR1 and a center of each of the first auxiliary electrodes 230s1, 230s2, or 230s3 in the first direction DR1 may overlap each other. In addition, centers of the first electrodes 210 in the second direction DR2 and centers of the first auxiliary electrodes 230s1, 230s2, or 230s3 in the second direction DR2 may also overlap each other.

Referring to FIGS. 9, 11A, and 11B, each of the first auxiliary electrodes 230s1, 230s2, and 230s3 included in the third electrode 230 may include a (3-1)th pattern 231, a (3-2)th pattern 232, and a (3-3)th pattern 233. The (3-2)th pattern 232 and the (3-3)th pattern 233 may be disposed on the same layer, and the (3-1)th pattern 231 may be disposed on a layer that is different from that on which the (3-2)th pattern 232 and the third pattern 233-3 are disposed. The (3-1)th pattern 231 and the (3-2)th pattern 232 may be electrically connected to each other through a third contact CNc, and the (3-1)th pattern 231 and the (3-3)th pattern 233 may be electrically connected through a fourth contact CNd. The (3-2)th pattern 232 and the (3-3)th pattern 233 may be included in the first conductive layer 202SU, and the (3-1)th pattern 231 may be included in the second conductive layer 204SU.

In an embodiment of the inventive concept, a portion of the (3-2)th pattern 232 may overlap the sensing pattern 211 of each of the first division electrodes 210dv1 and 210dv2. Thus, a coupling capacitor may be provided or formed between the first electrode 210 and the third electrode 230.

Referring to FIGS. 9, 11A, and 11B, each of the second auxiliary electrodes 240s included in the fourth electrode 240 may include a (4-1)th pattern 241 and a (4-2)th pattern 242. The (4-1)th pattern 241 and the (4-2)th pattern 242 may be disposed on different layers, and the (4-1)th pattern 241 and the (4-2)th pattern 242 may be electrically connected to each other through a second contact CNb. The (4-1)th pattern 241 may be included in the first conductive layer 202SU, and the (4-2)th pattern 242 may be included in the second conductive layer 204SU.

In an embodiment of the inventive concept, a portion of the (4-1)th pattern 241 may overlap a portion of each of the second division electrodes 220dv1 and 220dv2. Thus, a coupling capacitance may be provided or formed between the second electrode 220 and the fourth electrode 240.

In an embodiment of the inventive concept, the first conductive layer 202SU may further include dummy patterns DMP. Each of the dummy patterns DMP may be electrically floated or electrically grounded. In an embodiment of the inventive concept, the dummy patterns DMP may be omitted.

The sensor layer 200 may further include a plurality of first pads PD1, which one-to-one correspond to the first trace lines 210t disposed on the peripheral area 200NA and are electrically connected to each other, and a plurality of second pads PD2, which one-to-one correspond with the first trace lines 210t disposed on the peripheral area 200NA. A portion of the first pads PD1 may be directly connected to the sub trace line ST. For example, the first pads PD1 may be connected to the first trace lines 210t through the sub trace line ST. For example, the sensor driver 200C (see FIG. 7) may be connected to the first trace lines 210t through the sub trace line ST.

The first trace lines 210t may one-to-one correspond to and be electrically connected to the first electrodes 210. The two first division electrodes 210dv1 and 210dv1 included in one first electrode 210 may be connected to one of the first trace lines 210t. Each of the first trace lines 210t may include a plurality of branches to be connected to the two first division electrodes 210dv1 and 210dv1. In an embodiment of the inventive concept, the two first division electrodes 210dv1 and 210dv1 may be connected to each other within the sensing area 200A.

The second trace lines 220t may one-to-one correspond to and be electrically connected to each of the second electrodes 220. The two second division electrodes 220dv1 and 220dv1 included in one second electrode 220 may be connected to one of the second trace lines 220t. Each of the second trace lines 220t may include a plurality of branches to be connected to the two second division electrodes 220dv1 and 220dv2. In an embodiment of the inventive concept, the two second division electrodes 220dv1 and 220dv2 may be connected to each other within the sensing area 200A.

The sensor layer 200 may further include third pads PD3 that one-to-one correspond to and are connected to the third trace lines 230t disposed on the peripheral area 200NA, a plurality of fourth pads PD4 connected to one end (e.g., a first end) and the other end (e.g., a second end) of the fourth trace line 240rt1, and a fifth pad PD5 that one-to-one correspond to and is connected to the fifth trace lines 240rt2.

The third trace lines 230t may be spaced apart from each other with the sensing area 200A therebetween. The third trace line 230t may be electrically connected to at least one first auxiliary electrode of the first auxiliary electrodes 230s1, 230s2, and 230s3. For example, one end of each of the first auxiliary electrodes 230s1, 230s2, and 230s3 may be connected to the third trace line 230t.

The fourth trace line 240rt1 may be electrically connected to at least one second auxiliary electrode 240s of the second auxiliary electrodes 240s. In an embodiment of the inventive concept, the fourth trace line 240rt1 may be electrically connected to all of the second auxiliary electrodes 240s. For example, the fourth trace line 240rt1 may be electrically connected to all of the fourth electrodes 240. The fourth trace line 240rt1 may include a first line portion 241t extending in the first direction DR1 and electrically connected to the fourth electrodes 240, a second line portion 242t extending from a first end of the first line portion 241t in the second direction DR2, and a third line portion 243t extending from a second end of the first line portion 241t in the second direction. The first line portion 241t may extend along the top of the sensing area 200A.

In an embodiment of the inventive concept, the resistance of both the second line portion 242t and the third line portion 243t may be substantially equal to that of one fourth the resistance of a single electrode of the fourth electrodes 240. Thus, the second line portion 242t and the third line portion 243t serve as the fourth electrodes 240, and the fourth electrodes 240 are disposed on the peripheral area 200NA. For example, each of one of the second line portion 242t and the third line portion 243t and one of the fourth electrodes 240 may form a coil. Thus, a pen disposed on an area adjacent to the peripheral area 200NA may be sufficiently charged by a loop including the second line part 242t or the third line part 243t.

In an embodiment of the inventive concept, to adjust the resistance of the second line portion 242t and the resistance of the third line portion 243t, a width of each of the second line portion 242t and the third line portion 243t in the first direction DR1 may be adjusted. However, this is only an example, and the first to third line portions 241t, 242t, and 243t may have substantially the same width. The fourth pads PD4 may be connected to each of the second line portion 242t and the third line portion 243t.

The fifth trace lines 240rt2 may be connected to the fourth electrodes 240 to one-to-one correspond to each other. For example, the number of fifth trace lines 240rt2 may correspond to the number of fourth electrodes 240. In FIG. 9, three fifth trace lines 240rt2 are illustrated as an example.

In an embodiment of the inventive concept, the fifth trace lines 240rt2 and the fifth pad PD5 may be omitted, and a charging drive mode for charging the pen may be omitted. In this case, the sensor layer 200 may sense an input from an active type pen that is capable of emitting magnetic fields even if the magnetic fields are not provided from the sensor layer 200.

Referring to FIG. 13, the dummy patterns DMP may have a mesh structure. The dummy patterns DMP may include a plurality of mesh lines. Each of the plurality of mesh lines may have a straight line shape extending in a predetermined direction, and the plurality of mesh lines may be connected to each other. Openings in which the mesh lines are not disposed may be provided or formed in each of the dummy patterns DMP. Each of the first to fourth electrodes 210, 220, 230, and 240 illustrated in FIG. 9 may have a mesh structure.

In FIG. 13, the dummy patterns DMP may include mesh lines extending along a first crossing direction CDR1, which crosses the first direction DR1 and the second direction DR2, and mesh lines extending along a second crossing direction CDR2 that crosses the first crossing direction CDR1. However, the direction in which the mesh lines constituting the dummy patterns DMP extend is not particularly limited to that illustrated in FIG. 13. For example, the dummy patterns DMP may include only mesh lines extending in the first direction DR1 and the second direction DR2, or mesh lines extending in the first direction DR1, the second direction DR2, the first crossing direction CDR1, and the second crossing direction CDR2. In other words, the mesh structure of the dummy patterns DMP can be modified into different configurations.

The dummy patterns DMP may be spaced a predetermined distance from each other in the first crossing direction CDR1. A space in which the dummy patterns DMP are spaced apart from each other can be designated as a dummy opening DOP. A distance between the dummy patterns DMP in the first crossing direction CDR1 may be a first distance d1. In addition, a width of a dummy hole DMH formed by the dummy patterns DMP may be a first width w1. The dummy patterns DMP may be provided to prevent the first electrode 210 (see FIG. 10) and the second electrode 220 (see FIG. 10) from being visible from the outside. For example, the dummy patterns DMP may be disposed on an area that overlaps the first electrode 210 (see FIG. 10) and the second electrode 220 (see FIG. 10).

As illustrated in FIG. 13, the first distance d1 is shown to be greater than the first width w1, but the first distance d1 may be less than the first width w1. The dummy opening DOP may be a portion at which the electrodes are not disposed and may be visible from the outside. Thus, as the first distance d1 decreases, the portion of the dummy opening DOP, which is visible from the outside, may be reduced.

In FIG. 13, a cutting line CL is shown as a straight line along the second crossing direction CDR2, but the cutting line CL is not limited thereto and may be provided in a zigzag pattern along the second crossing direction CDR2. By incorporating zigzag shaped side surfaces for the dummy patterns DMP, it is possible to mitigate the occurrence of a phenomenon where the first electrode 210 (see FIG. 10) and the second electrode 220 (see FIG. 10) are visible from the outside due to reflection caused by external light.

Figure 14:
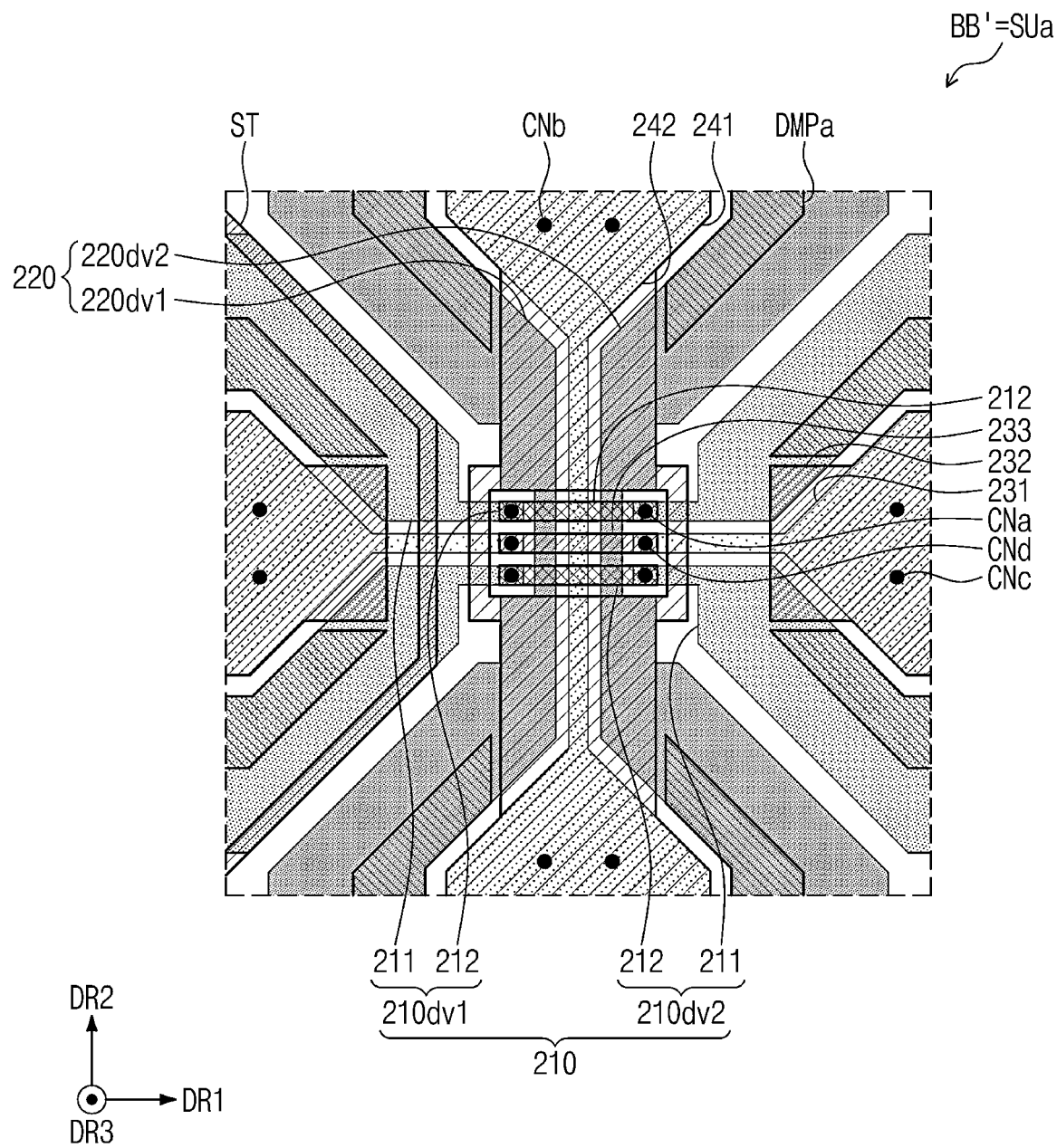
FIG. 14 is an enlarged view of an area BB' of FIG. 9.
Figure 15A:
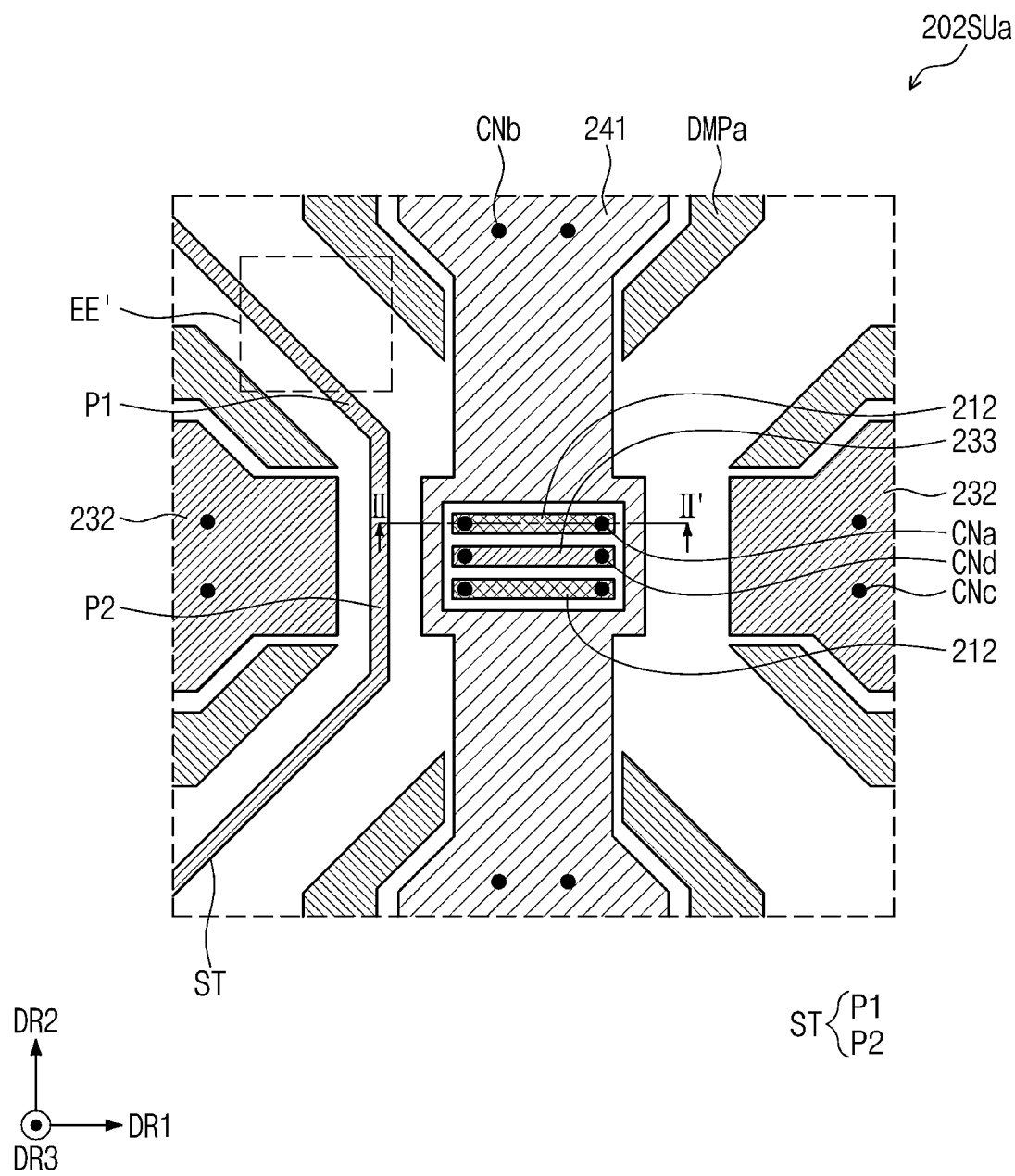
FIG. 15A is a plan view illustrating a first conductive layer of the sensing unit according to an embodiment of the inventive concept.
Figure 15B:
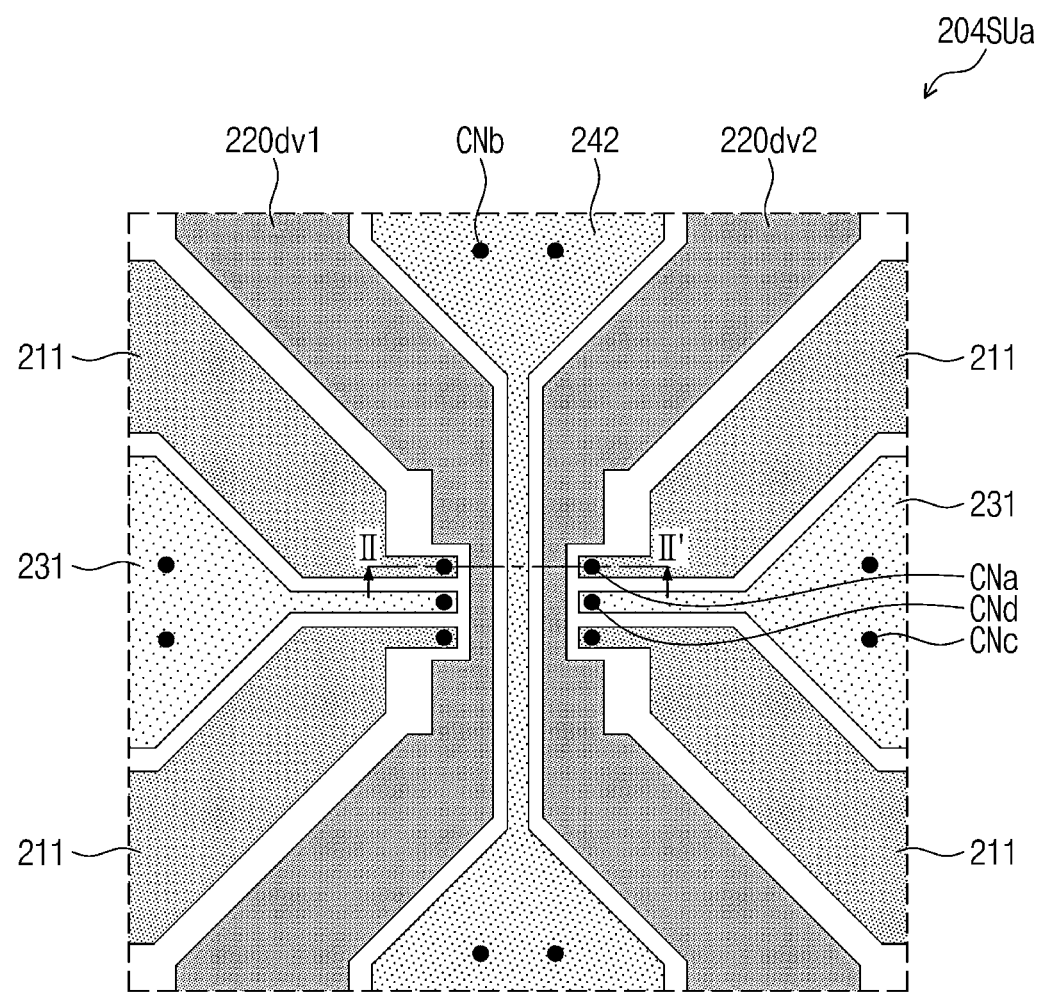
FIG. 15B is a plan view illustrating a second conductive layer of the sensing unit according to an embodiment of the inventive concept.
Figure 16A:
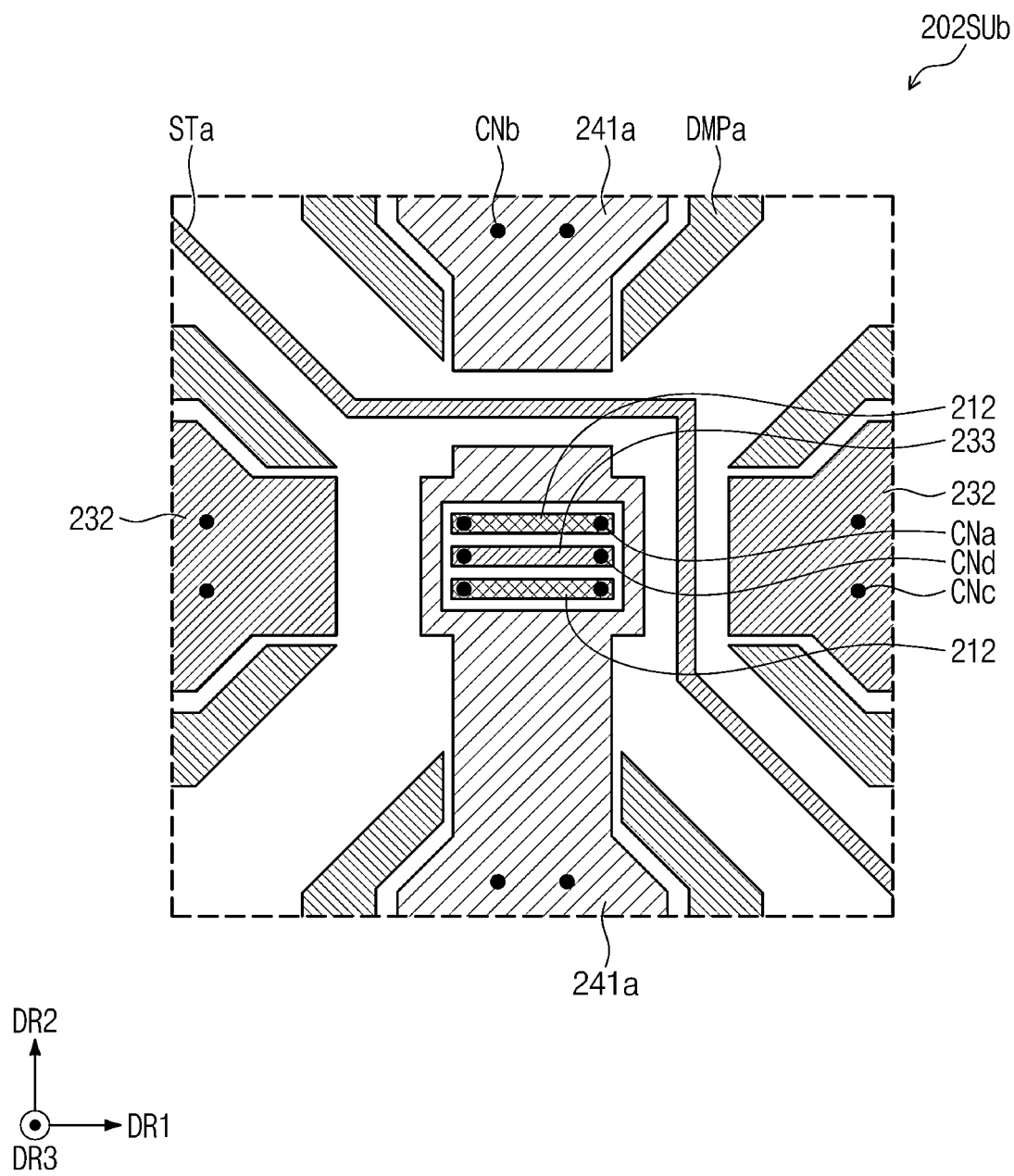
FIG. 16A is a plan view illustrating a first conductive layer according to another embodiment of the inventive concept.
Figure 16B:
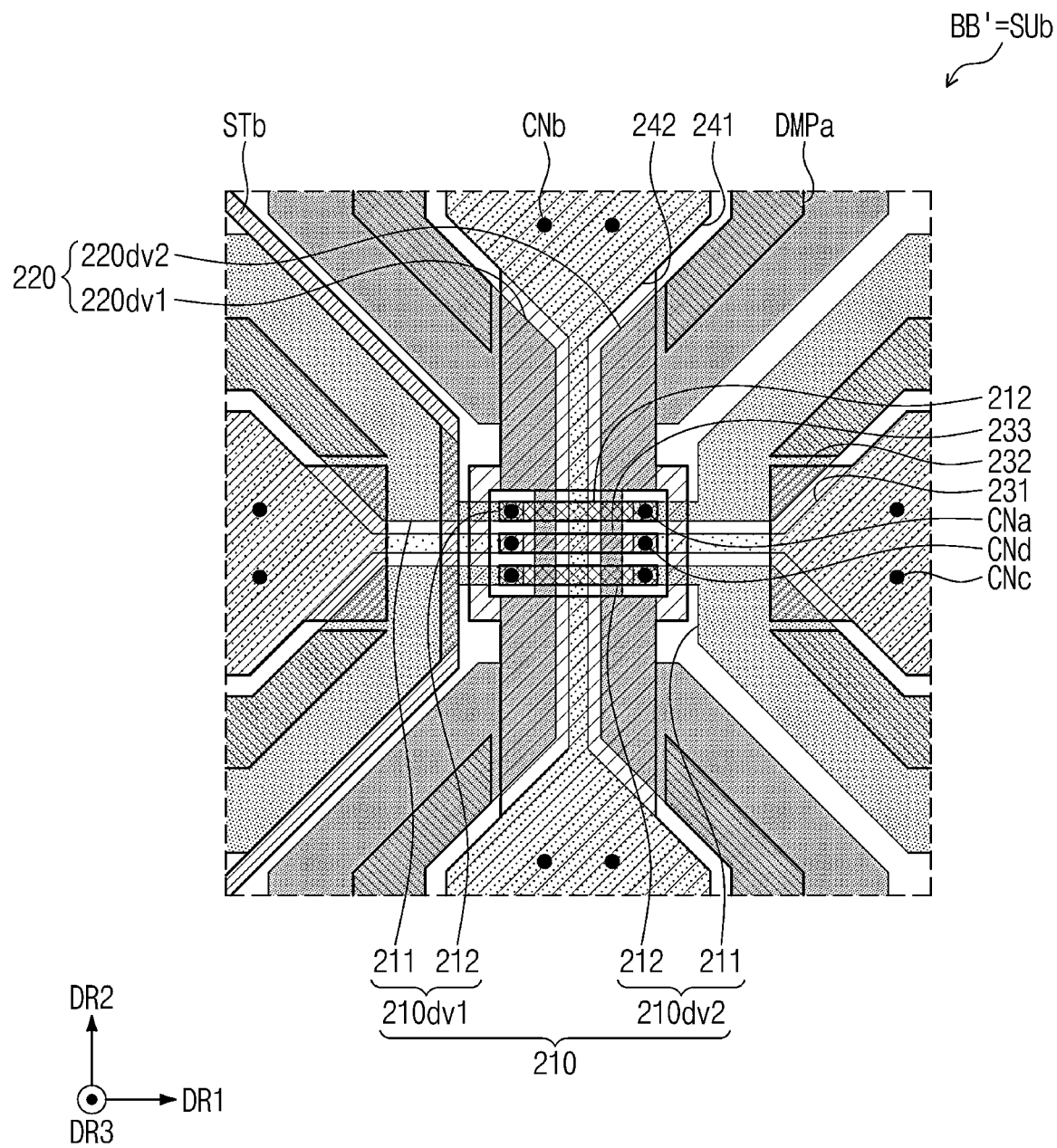
FIG. 16B is an enlarged plan view of one sensing unit according to another embodiment of the inventive concept.
Figure 17A:
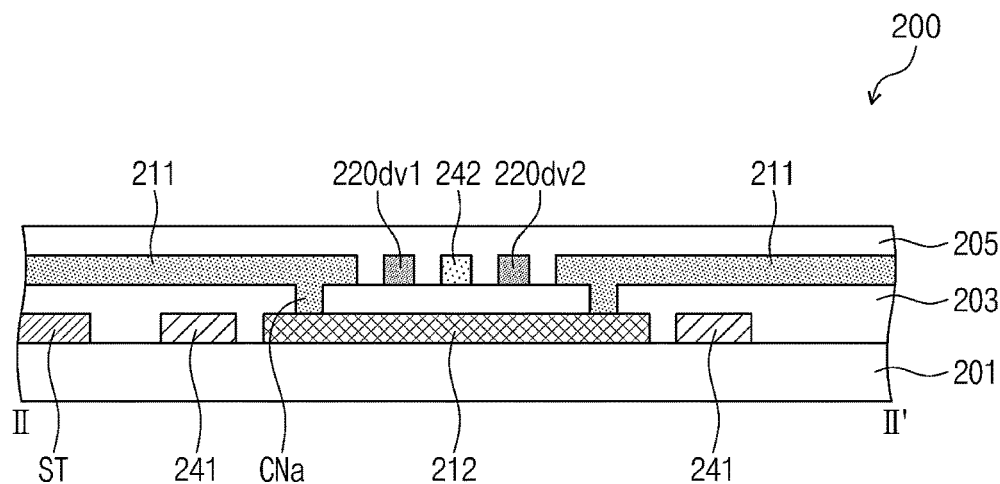
FIG. 17A is a cross-sectional view of a sensor layer, taken along line II-II' in each of FIGS. 15A and 15B according to an embodiment of the inventive concept.
Figure 17A:
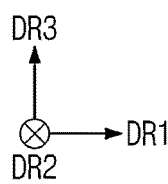
Figure 17B:
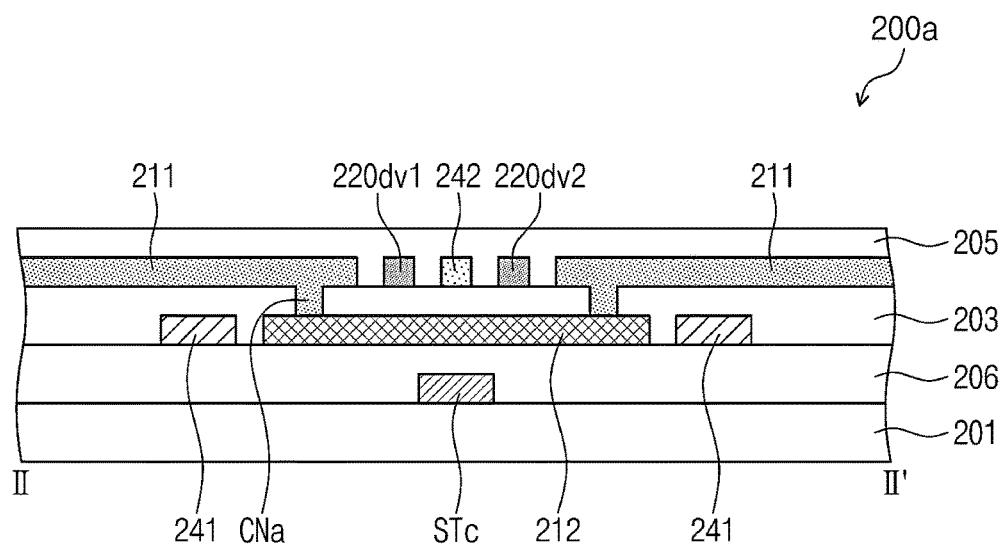
FIG. 17B is a cross-sectional view of a sensor layer, taken along line II-II' in each of FIGS. 15A and 15B according to another embodiment of the inventive concept.
Figure 17B:
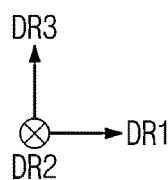
Figure 18A:
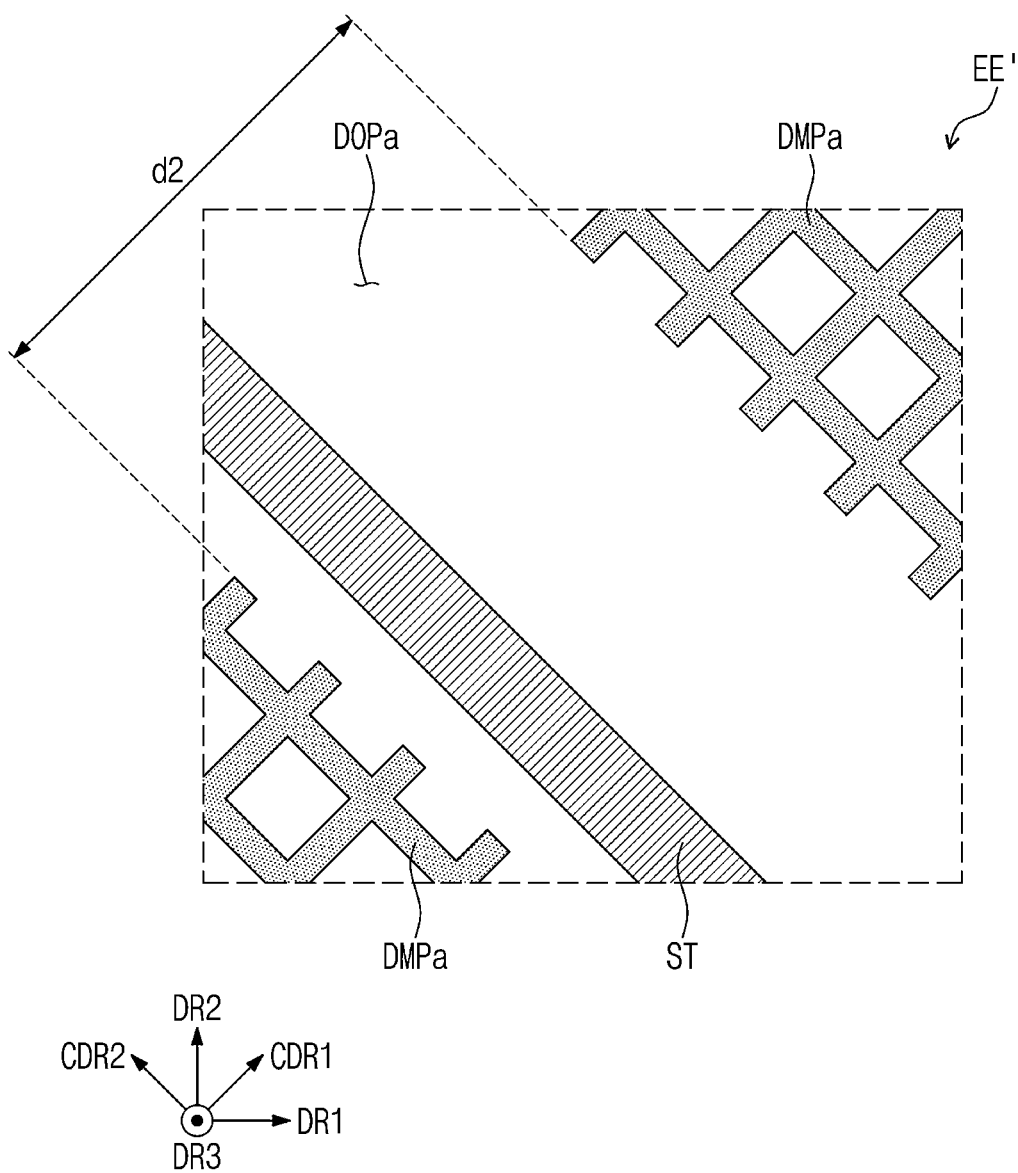
FIG. 18A is an enlarged view of an area EE' of FIG. 15A.
Figure 18B:
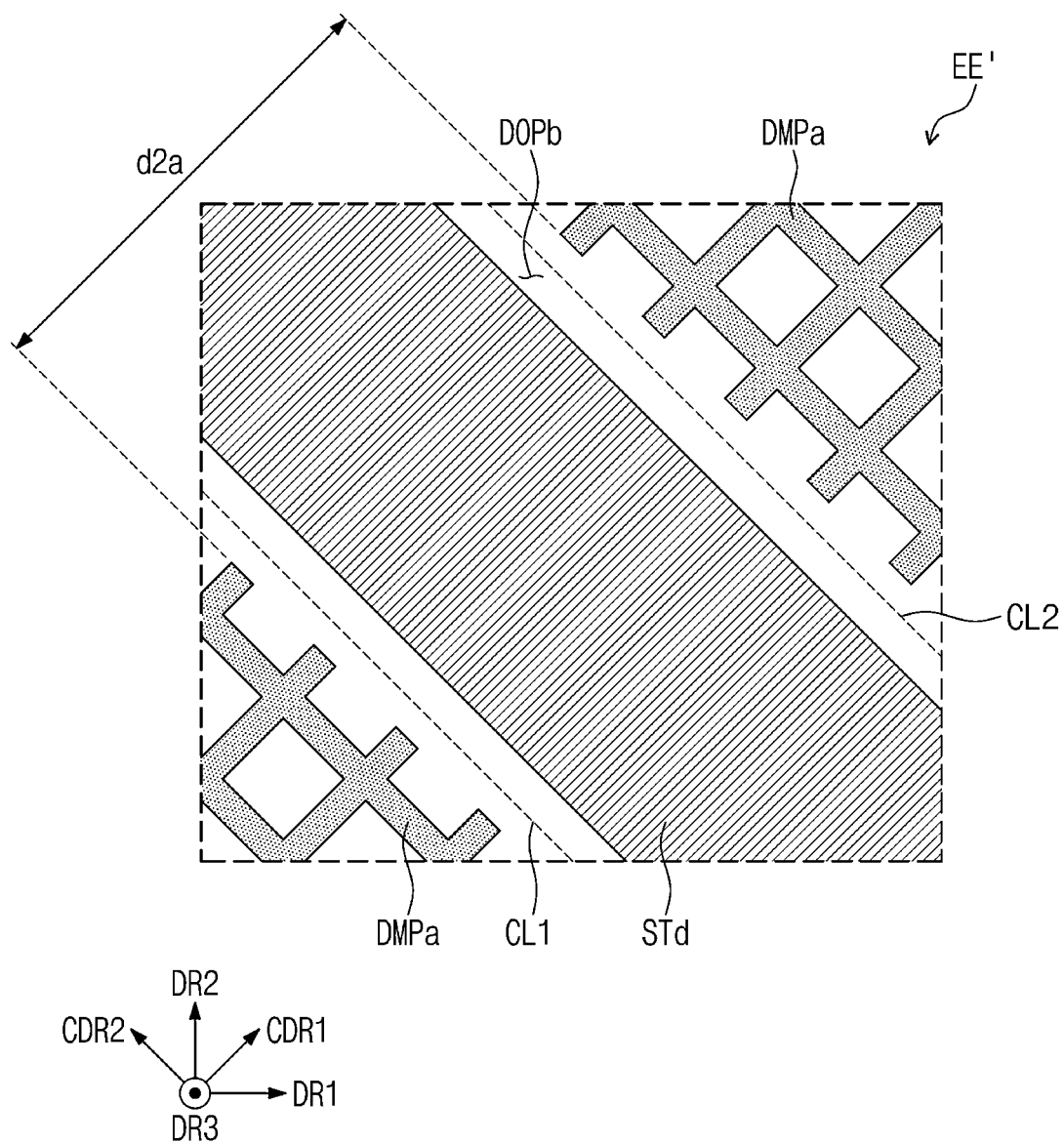
FIG. 18B is an enlarged view of an area EE' of FIG. 15A according to another embodiment of the inventive concept.

FIG. 14 is an enlarged view of an area BB' of FIG. 9. FIG. 14 is an enlarged plan view of a sensing unit SUa according to an embodiment of the inventive concept. FIG. 15A is a plan view illustrating a first conductive layer 202SUa of the sensing unit according to an embodiment of the inventive concept. FIG. 15B is a plan view illustrating a second conductive layer of the sensing unit according to an embodiment of the inventive concept. FIG. 16A is a plan view illustrating a first conductive layer according to another embodiment of the inventive concept. FIG. 16B is an enlarged plan view of one sensing unit according to another embodiment of the inventive concept. FIG. 17A is a cross-sectional view of a sensor layer, taken along line II-II' in each of FIGS. 15A and 15B according to an embodiment of the inventive concept. FIG. 17B is a cross-sectional view of a sensor layer, taken along line II-II' in each of FIGS. 15A and 15B according to another embodiment of the inventive concept. FIG. 18A is an enlarged view of an area EE' of FIG. 15A. FIG. 18B is an enlarged view of an area EE' of FIG. 15A according to another embodiment of the inventive concept. The first conductive layer 202SUa may be substantially the same as the first conductive layer 202SU of FIG. 11A, and the second conductive layer 204SUa may be substantially the same as the second conductive layer 204SU of FIG. 11B. Hereinafter, contents duplicated with those described above will be omitted.

Referring to FIGS. 9, 14, 15A, and 15B, the sub trace line ST may be disposed on the sensing area 200A on the plane. For example, a first portion of the sub trace line ST may be disposed on the sensing area 200A, and a second portion may be disposed on the peripheral area 200NA. According to an embodiment of the inventive concept, the sub trace line ST may overlap the first electrode 210 on the plane. For example, the sub trace line ST may overlap the sensing pattern 211 of the first electrode 210 on the plane. The present disclosure is not limited thereto, and the sub trace line ST may not overlap the sensing pattern 211 and may overlap the second division electrode 220dv1 on the plane. In addition, the sub trace line ST may overlap the (3-1)th pattern 231 of the third electrode 230 on the plane and may not overlap the (3-2)th pattern 232 on the plane. In an embodiment, when the (3-1)th pattern 231 is omitted, the sub trace line ST may not overlap the (3-1)th pattern 231 and the (3-2)th pattern 232 on the plane.

Referring to FIGS. 15A, 15B, and 17A, the sub trace line ST may be disposed on the sensor base layer 201. The sub trace line ST may be disposed on the same layer as the bridge pattern 212 and the (4-1)th pattern 241. The sub trace line ST, the bridge pattern 212, and the (4-1)th pattern 241 may be disposed on the sensor base layer 201. The sub trace line ST, the bridge pattern 212, and the (4-1)th pattern 241 may be covered by the sensor insulating layer 203. However, the present disclosure is not limited thereto, and the sub trace line ST may be disposed on the same layer as the (3-2)th pattern 232 and the dummy patterns DMPa. Thus, the sub trace line ST may not overlap the bridge pattern 212, the (4-1)th pattern 241, the (3-2)th pattern 232, and the dummy patterns DMPa on the plane.

The sub trace line ST may include a first portion Pl disposed between the dummy patterns DMPa and a second portion P2 disposed between the (4-1)th pattern 241 and the (3-2)th pattern 232. The first potion P1 may be slanted and the second portion P2 may be straight. In FIG. 15A, a width of the sub trace line ST is shown to be constant, but widths of the first portion Pl and the second portion P2 may be different. For example, a width of the first portion P1 disposed between the dummy patterns DMPa can be adjusted freely based on an area from which the dummy patterns DMPa are removed. However, the second portion P2 may maintain a certain width or more because sizes of the (4-1)th pattern 241 and the (3-2)th pattern 232 are not subject to free adjustment. Thus, the width of the first portion P1 may be greater than that of the second portion P2. Referring to FIG. 17B, the sensor layer 200a may further include a sub insulating layer (or third insulating layer) 206. The sub insulating layer 206 may be disposed between the sensor insulating layer 203 and the sensor base layer 201. According to an embodiment of the inventive concept, the sub trace line STc may be disposed on the sensor base layer 201 and covered by the sub insulating layer 206. The present disclosure is not limited thereto, and the sensor layer 200a may further include a plurality of insulating layers between the sensor insulating layer 203 and the sensor base layer 201. The sub trace line STc may be disposed on one insulating layer of the plurality of insulating layers.

Referring to FIGS. 9 and 17B together, the sub trace line STc may overlap at least one of the first electrodes 210, the plurality of second electrodes 220, the plurality of third electrodes 230, or the plurality of fourth electrodes 240 on the plane. For example, the sub trace line STc may overlap the bridge pattern 212 of the first electrodes 210, the second division electrodes 220dv1 and 220dv2 of the second electrodes 220, and the (4-2)th pattern 242 of the fourth electrode 240 on the plan. However, since the sub trace line STc is disposed on a layer that is different from that on which each of the first electrodes 210, the plurality of second electrodes 220, the plurality of third electrodes 230, and the plurality of fourth electrodes 240 is disposed, the sub trace line STc may overlap all of the first electrodes 210, the plurality of second electrodes 220, the plurality of third electrodes 230, and the plurality of fourth electrodes 240 on the plane.

Referring to FIGS. 15A and 18A, the sub trace line ST may be disposed between the dummy patterns DMPa. The dummy patterns DMPa may be spaced a predetermined distance from each other. The sub trace line ST may be arranged in a space where the dummy patterns DMPa are spaced apart from each other. The space in which the dummy patterns DMPa are spaced apart from each other may be a dummy opening DOPa. A distance between the dummy patterns DMPa in the first crossing direction CDR1 may be a second distance d2. The second distance d2 may be greater than the first distance d1 (see FIG. 10) of the dummy opening DOP in the other sensing unit SU (see FIG. 10). In other words, the dummy opening DOPa may be formed by removing a portion of the dummy patterns DMP (see FIG. 10).

The sub trace line ST may be disposed between the first auxiliary electrodes 230s1, 230s2, or 230s3 (see FIG. 9) and the second auxiliary electrodes 240s (see FIG. 9). For example, the sub trace line ST may be disposed between the (3-2)th pattern 232 of the first auxiliary electrodes 230s1, 230s2, or 230s3 and the (4-1)th pattern 241 of the second auxiliary electrodes 240s. The position at which the sub trace line ST is disposed is not limited to that illustrated in FIG. 15A. For example, the sub trace line ST may be disposed between the dummy patterns DMPa and the (3-2)th pattern 232. In other words, the sub trace line ST may be disposed in a space that does not overlap other components in the first conductive layer 202Sua.

Referring to FIG. 18B, a width of the sub trace line STd may be greater than that of the sub trace line ST illustrated in FIG. 18A. For example, the sub trace line STd may be disposed adjacent to the dummy patterns DMPa. As the dummy opening DOPb is minimized, a portion of the dummy opening DOPb that is visible from the outside may be reduced. In addition, increasing the width of the sub trace line STd can lead to a decrease in its resistance, thereby enhancing power efficiency and improve sensing sensitivity.

A first cutting line CL1 and a second cutting line CL2 may be provided in the dummy opening DOPb. After the sub trace line STd and the dummy patterns DMPa are provided as one body, the sub trace line STd and the dummy patterns DMPa may be separated from each other by the first cutting line CL1 and the second cutting line CL2. The width of the sub trace line STd may be freely changed by the first cutting line CL1 and the second cutting line CL2. Therefore, the second distance d2a where the dummy patterns DMPa are spaced apart from each other may be less than the second distance d2 illustrated in FIG. 18A.

Referring to FIG. 16A, the (4-1)th pattern 241a of the second auxiliary electrodes 240s (see FIG. 9) may be spaced apart from each other in the second direction DR2. For example, the (4-1)th patterns 241a may be separated from and spaced apart from each other. The sub trace line STa may be disposed where the (4-1)th pattern 241a is separated from each other. The area where the sub trace line STa is disposed is not limited to that illustrated in FIG. 16A. The sub trace line STa may be disposed in a space that passes through other elements disposed on the first conductive layer 202SUa.

Figure 19A:
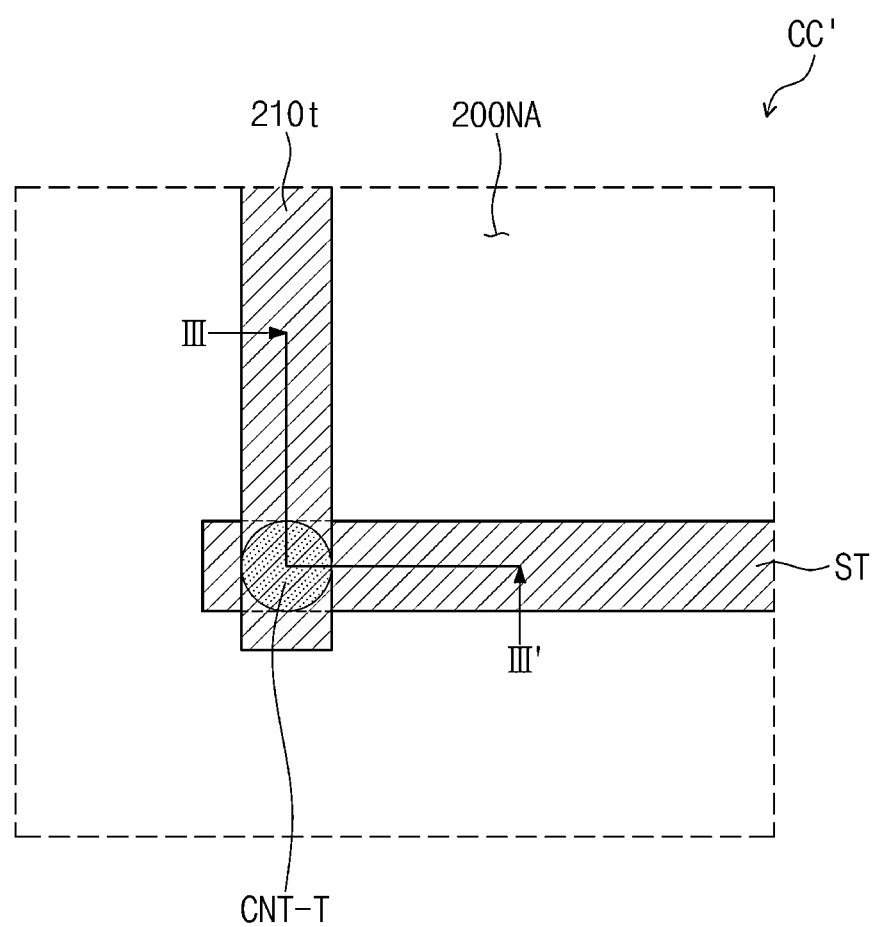
FIG. 19A is an enlarged view of an area CC' of FIG. 9.
Figure 19B:
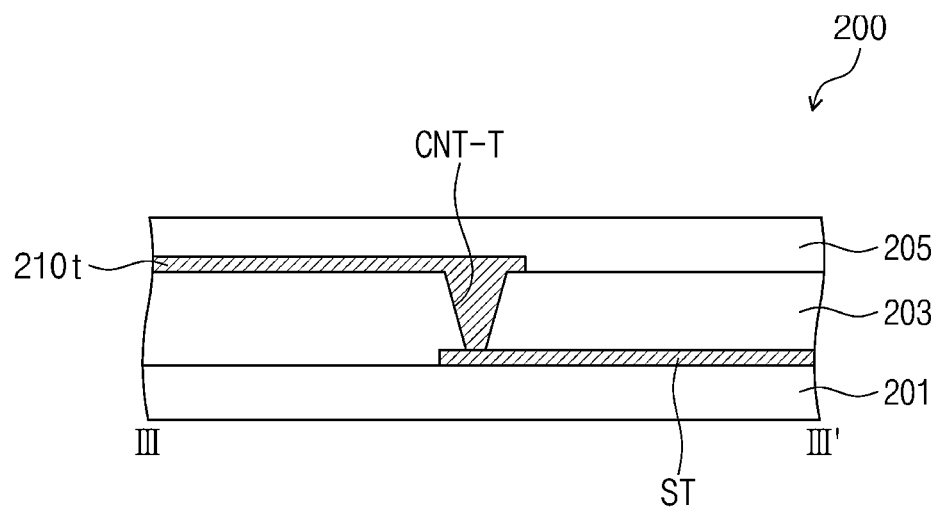
FIG. 19B is a cross-sectional view of a sensor layer, taken along line III-III' of FIG. 19A according to an embodiment of the present invention.
Figure 19C:
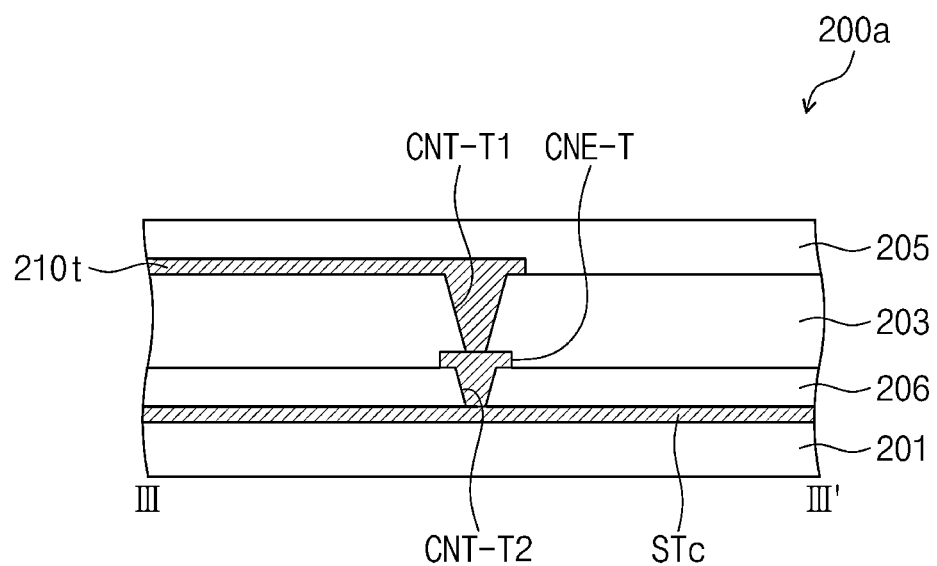
FIG. 19C is a cross-sectional view of a sensor layer, taken along line III-III' of FIG. 19A according to another embodiment of the inventive concept.
Figure 19D:
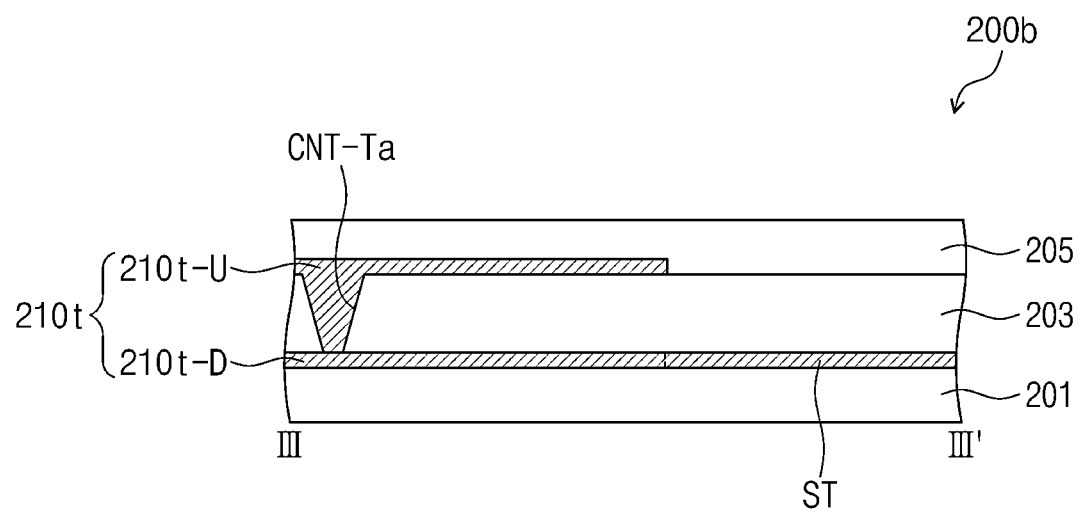
FIG. 19D is a cross-sectional view of a sensor layer, taken along line III-III' of FIG. 19A according to another embodiment of the inventive concept.

Referring to FIG. 16B, the sub trace line STb may not overlap the first and second electrodes 210 and 220. For example, the sub trace line STb may be disposed between the sensing pattern 211 and the second division electrode 220dv2 on the plane. Since the sub trace line STb is disposed to avoid overlapping the first and second electrodes 210 and 220, it helps in minimizing signal noise due to the sub trace line STb during the sensing of the first and second electrodes 210 and 220. In addition, since the dummy patterns DMPa are disposed between the sub trace line STb and the (3-2)th pattern 232, a coupling gap that occurs between the sub trace line STb and the (3-2)th pattern 232 may be reduced. FIG. 19A is an enlarged view of an area CC' of FIG. 9. For example, FIG. 19A is an enlarged plan view of the first trace line 210t and the sub trace line ST according to an embodiment of the inventive concept. FIG. 19B is a cross-sectional view of a sensor layer 200, taken along line III-III' of FIG. 19A according to an embodiment of the present invention. FIG. 19C is a cross-sectional view of a sensor layer 200a, taken along line III-III' of FIG. 19A according to another embodiment of the inventive concept. FIG. 19D is a cross-sectional view of a sensor layer 200b, taken along line III-III' of FIG. 19A according to another embodiment of the inventive concept.

Referring to FIGS. 19A and 19B, the first trace line 210t and the sub trace line ST may be disposed on different layers. The first trace line 210t may be disposed on the sensor insulating layer 203, and the sub trace line ST may be disposed on the sensor base layer 201. A contact hole CNT-T may be formed in the sensor layer 200 according to an embodiment of the inventive concept. The sub trace line ST may be connected to the first trace line 210t through the contact hole CNT-T passing through the sensor insulating layer 203. The contact hole CNT-T may be formed in the peripheral area 200NA. However, the present disclosure is not limited thereto, and the first trace line 210t and the sub trace line ST may be disposed on the same layer and connected to each other without the contact hole CNT-T.

Referring to FIG. 19C, the sensor layer 200a may further include a sub insulating layer (or third insulating layer) 206. The sub insulating layer 206 may be disposed between the sensor insulating layer 203 and the sensor base layer 201. According to an embodiment of the inventive concept, the sub trace line STc may be disposed on the sensor base layer 201 and covered by the sub insulating layer 206. In this case, the sub trace line STc is sandwiched between the sensor base layer 201 and the sub insulating layer 206. The present disclosure is not limited thereto, and the sensor layer 200a may further include a plurality of insulating layers between the sensor insulating layer 203 and the sensor base layer 201. The sub trace line STc may be disposed on one insulating layer of the plurality of insulating layers.

The sub trace line STc may be connected to the first trace line 210t through a first contact hole CNT-TI passing through the sensor insulating layer 203 and a second contact hole CNT-T2 passing through the sub insulating layer 206. For example, a connection electrode CNE-T disposed on the sub insulating layer 206 may be connected to the first trace line 210t through the first contact hole CNT-TI and may be connected to the first trace line 210t through the second contact hole CNT-T1. In other words, the sub trace line STc may be connected to the first trace line 210t through the first contact hole CNT-T1, the connection electrode CNE-T, and the second contact hole CNT-T2.

Referring to FIGS. 9 to 19C, the sensor layer 200 may include sub trace lines ST connected to some of the first trace lines 210t. The sub trace lines ST may be arranged to overlap the sensing area 200A. The first trace lines 210t connected to the sub trace lines ST may not be disposed on the peripheral area 200NA adjacent to the sensing area 200A in a direction opposite to the first direction DR1. Thus, a surface area of the peripheral area 200NA may be reduced, and a surface area occupied by the non-display area NDA (see FIG. 1A) on the display surface IS (see FIG. 1A) of the electronic device 1000 (see FIG. 1A) may be reduced. In other words, the electronic device 1000 incorporating a narrow bezel can be provided.

Referring to FIG. 19D, the first trace line 210t may include a multi-layer structure. For example, the first trace line 210t may include an upper trace line 210t-U and a lower trace line 210t-D. The lower trace line 210t-D may be disposed on the sensor base layer 201, and the upper trace line 210t-U may be disposed on the sensor insulating layer 203. The upper trace line 210t-U may be electrically connected to the lower trace line 210t-D through the contact hole CNT-T passing through the sensor insulating layer 203. Since the first trace line 210t has the double-layer structure, the resistance of the first trace line 210t may be reduced, power efficiency may be improved, and sensing sensitivity may be improved.

The sub trace line ST may extend from the lower trace line 210t-D. For example, the sub trace line ST may be integrated with the lower trace line 210t-D. The upper trace line 210t-U may not be provided on an area overlapping the sub trace line ST. The sub trace line ST may be integrated with the lower trace line 210t-D, and thus, a separate contact hole may not be needed. As a result, simplification of the sub trace line ST formation process is achieved, and the need for a separate contact hole is eliminated, thereby preventing an increase in the resistance of the sub trace line ST.

Figure 20A:
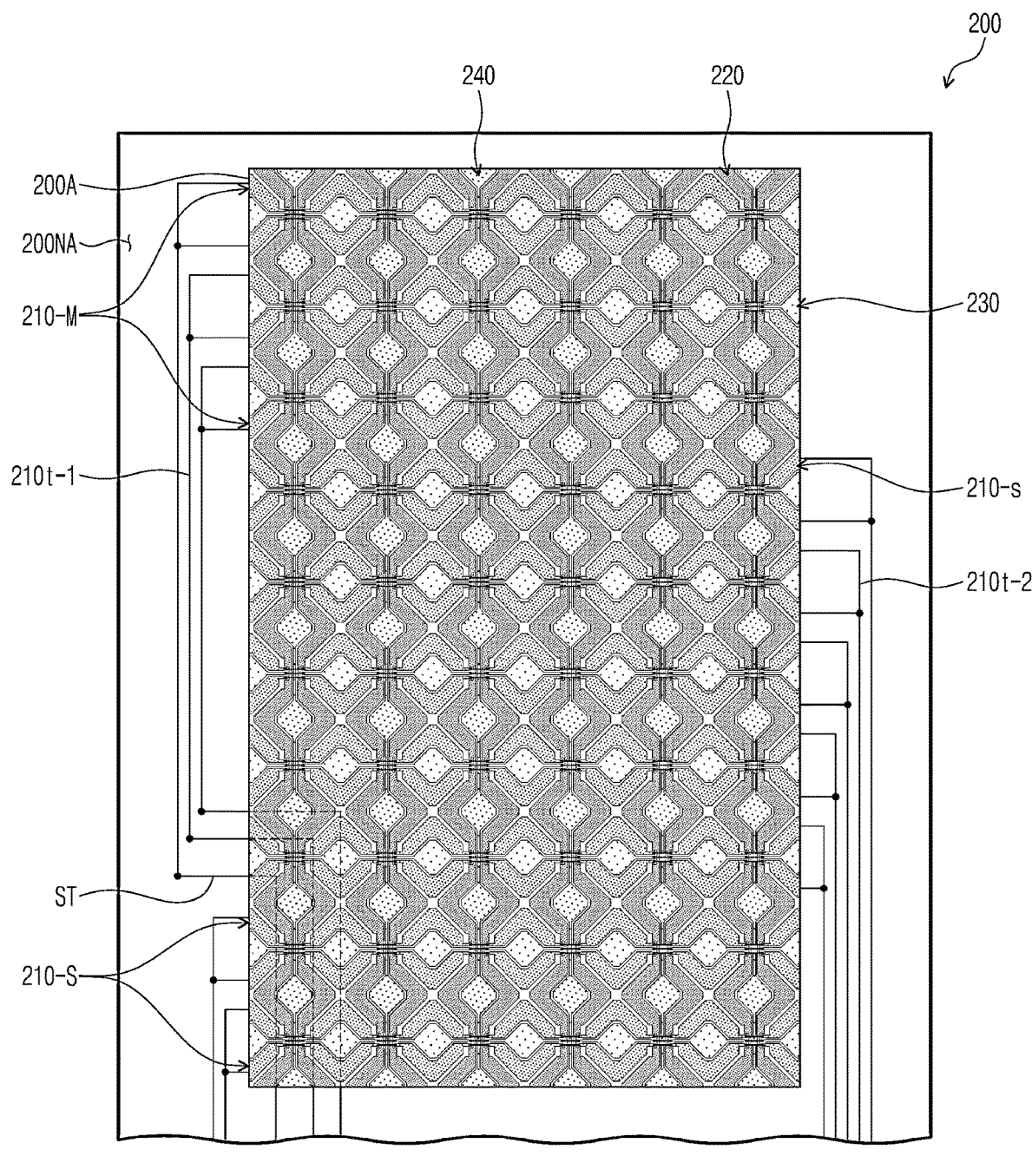
FIG. 20A is a plan view illustrating a portion of the sensor layer according to an embodiment of the inventive concept.

FIG. 20A is a plan view illustrating a portion of the sensor layer according to an embodiment of the inventive concept. FIG. 20A illustrates only the first to fourth electrodes 210, 220, 230, and 240, the first trace lines 210t, and the sub trace line ST. FIGS. 20A and 20C are plan views illustrating a portion of a sensor layer according to another embodiment of the inventive concept. Descriptions that are duplicates to those given above will be omitted.

Referring to FIG. 20A, first electrodes 210 may include a first main electrode 210-M electrically connected to the sub trace line ST and a first sub electrode 210-S electrically insulated from the sub trace line ST. The first main electrode 210-M may be connected to the sensor driver 200C (see FIG. 7) through the first trace lines 210t and the sub trace line ST, and the first sub electrode 210-S may be connected to the sensor driver 200C (see FIG. 7) through the first trace lines 210t.

The sub trace line ST may overlap the sensing area 200A. For example, the sub trace line ST may overlap the first sub electrode 210-S of the first electrode 210 disposed on the sensing area 200A. A plurality of first sub electrodes 210-S may be provided. The sub trace line ST may overlap two or more first sub electrodes 210-S.

The first trace lines 210t may include a plurality of (1-1)th trace lines 210t-1 connected to one end (e.g., first ends) of the first electrodes 210 and a plurality of (1-2)th trace lines 210t-2 connected to the other end (e.g., second ends) of the first electrodes 210. In this embodiment, one end of the first electrodes 210 may be a portion corresponding to an end in a direction opposite to the first direction DR1 with respect to the first electrodes 210, and the other end of the first electrodes 210 may be a portion corresponding to an end in the first direction DT1 with respect to the first electrodes 210. The (1-1)th trace lines 210t-1 and (1-2)th trace lines 210t-2 may be spaced apart from each other in the first direction DR1. In FIG. 20A, the number of each of the (1-1)th trace lines 210t-1 and (1-2)th trace lines 210t-2 is shown as 5, but the number of each of (1-1)th trace lines 210t-1 and (1-2)th trace lines 210t-2 is not limited thereto.

The sub trace lines ST may be provided in plural, and the first main electrodes 210-M may be provided in plural to correspond to the number of sub trace lines ST. According to an embodiment of the inventive concept, the first main electrodes 210-M may be disposed at the uppermost end of the first electrodes 210 in the second direction DR2. However, the inventive concept is not limited thereto, and the first main electrodes 210-M may be disposed near a central portion of the first electrodes 210.

According to an embodiment of the inventive concept, at least one first sub electrode 210-S may be disposed between the first main electrodes 210-M and the first sub-electrodes 210-S overlapping the sub trace lines ST. At least one first sub electrode 210-S may be disposed between the first main electrode 210-M disposed at the lowermost end of the first main electrodes 210-M in the second direction DR2 and the first sub electrode 210-S disposed at the uppermost end of the first sub electrodes 210-S in the second direction DR2. When the at least one first sub-electrode 210-S is a first center sub electrode 210-S, the first center sub electrodes 210-S may be provided in four. However, the present disclosure is not limited to this, and the number of first center sub electrodes 210-S may be provided in five or more.

Figure 20B:
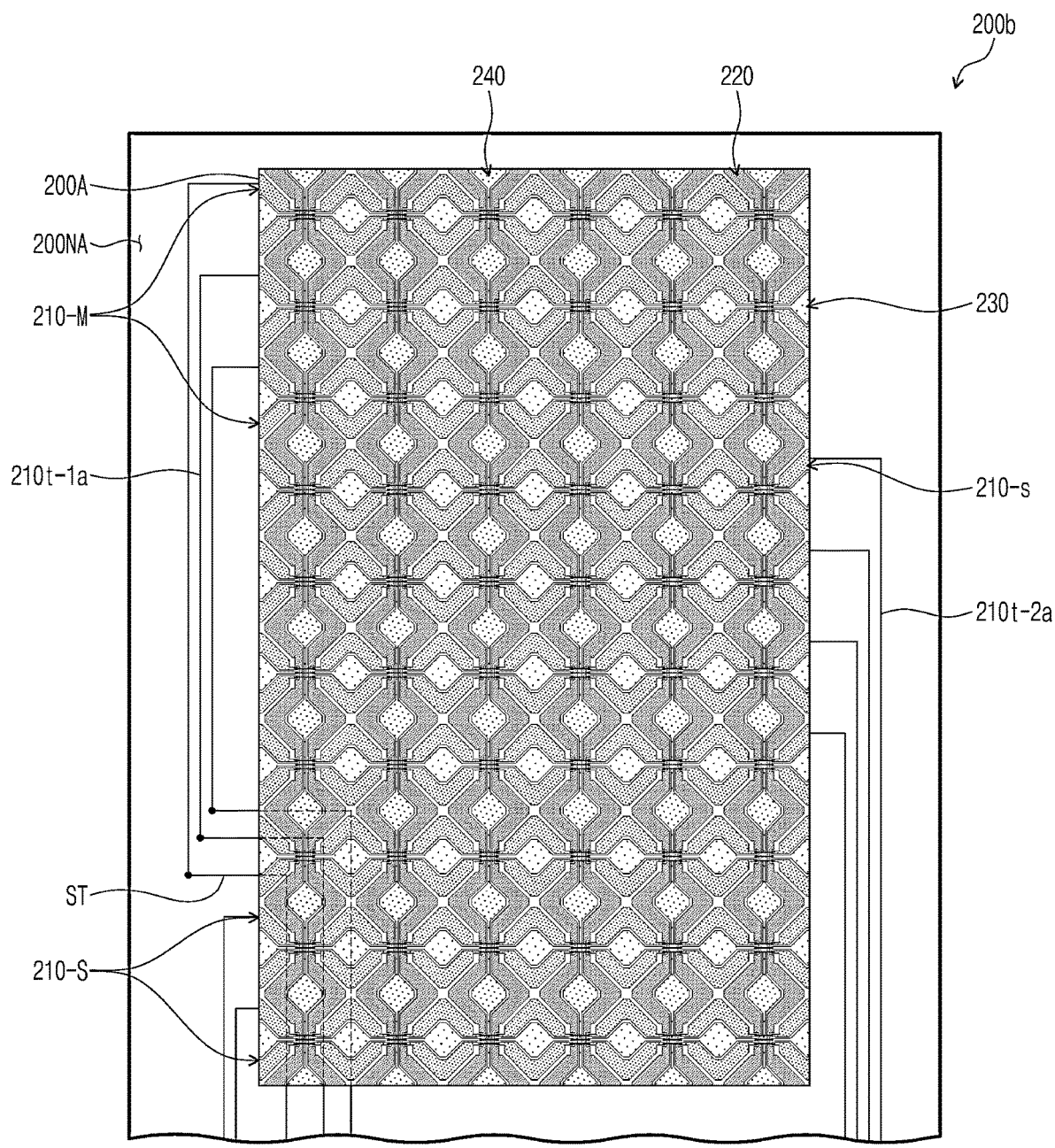
FIG. 20B is a plan view illustrating a portion of the sensor layer according to another embodiment of the present invention.
Figure 20C:
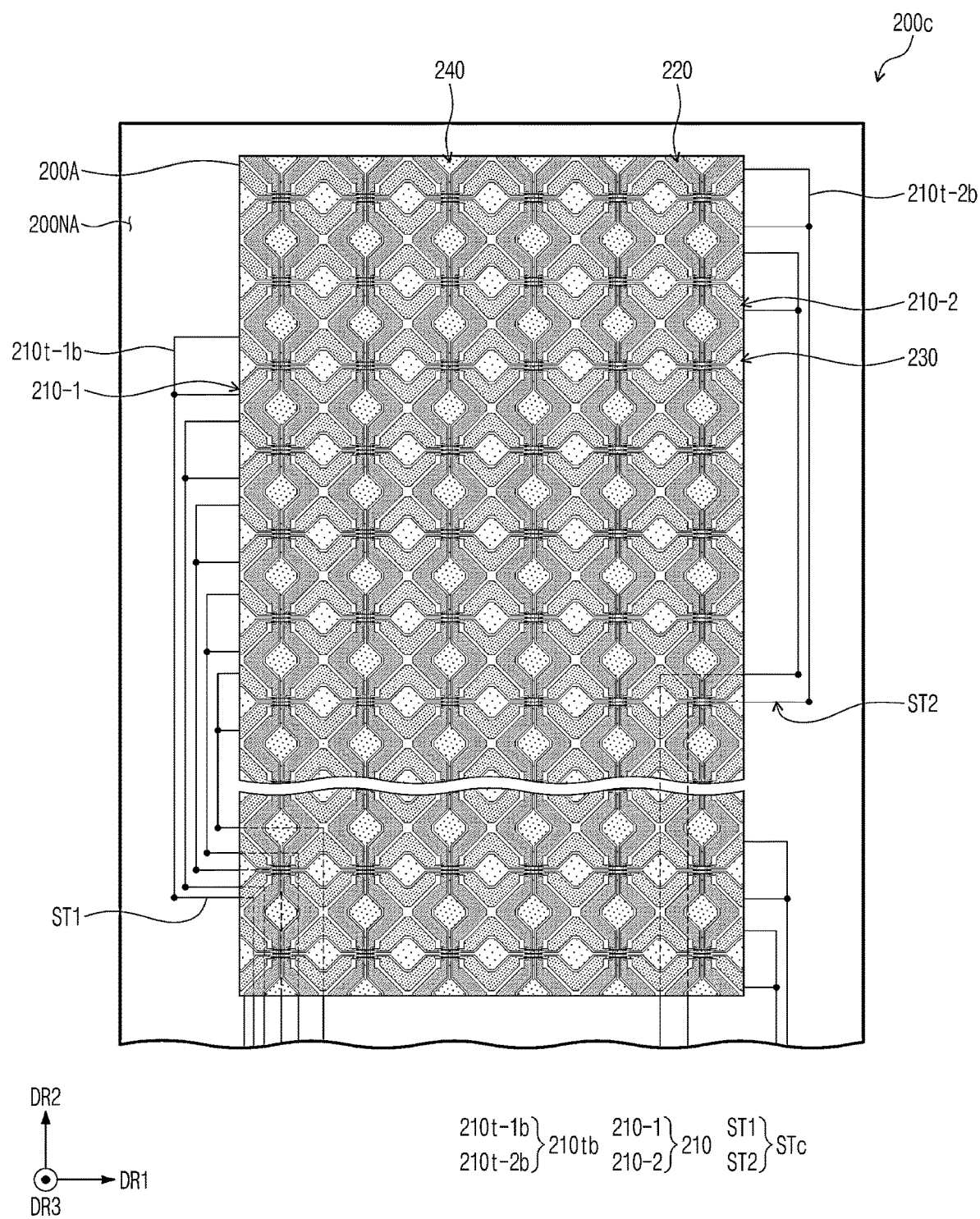
FIG. 20C is a plan view illustrating a portion of the sensor layer according to another embodiment of the present invention.

FIG. 20B is a plan view illustrating a portion of the sensor layer 200b according to another embodiment of the present invention.

Referring to FIG. 20B, the first trace lines 210ta may include a plurality of (1-1)th trace lines 210t-1a connected to one end (e.g., first ends) of the first electrodes 210 and a plurality of (1-2)th trace lines 210t-2a connected to the other end (e.g., second ends) of the first electrodes 210. The (1-1)th trace lines 210t-1a and (1-2)th trace lines 210t-2a may be electrically connected to the first electrodes 210, respectively. In an embodiment of the inventive concept, one first electrode 210 may be connected to the (1-1)th trace lines 210t-1a or the (1-2)th trace lines 210t-2a through one connection point. In this case, the first electrode 210 may further include an additional bridge pattern for electrically connecting the two first division electrodes 210dv1 and 210dv2 (see FIG. 10) included in the first electrode 210.

FIG. 20C is a plan view illustrating a portion of the sensor layer 200c according to another embodiment of the present invention.

Referring to FIG. 20C, the first trace lines 210tb may include a plurality of (1-1)th trace lines 210t-1b connected to one end (e.g., first ends) of the first electrodes 210 and a plurality of (1-2)th trace lines 210t-2b connected to the other end (e.g., second ends) of the first electrodes 210. The (1-1)th trace lines 210t-1b and (1-2)th trace lines 210t-2b may be spaced apart from each other in the first direction DR1. In FIG. 20C, the number of (1-1)th trace lines 210t-1b is 5, and the number of (1-2)th trace lines 210t-2b is 4, but the number of each of (1-1)th trace lines 210t-1b and the (1-2)th trace lines 210t-2b is not limited thereto.

The first electrodes 210 may include (1-1)th electrodes 210-1 connected to the (1-1)th trace lines 210t-1b and (1-2)th electrodes 210-2 connected to the (1-2)th trace lines 210t-2b. The (1-1)th electrodes 210-1 may be connected to the sensor driver 200C (see FIG. 7) through the (1-1)th trace lines 210t-1b, and the (1-2)th electrodes 210-2 may be connected to the sensor driver 200C (see FIG. 7) through the (1-2)th trace lines 210t-2b. The number of each of the (1-1)th electrodes 210-1 and the (1-2)th electrodes 210-2 may be the same as the number of each of the (1-1)th trace lines 210t-1b and the (1-2)th trace lines 210t-2b. The arrangement of the (1-1)th electrodes 210-1 and (1-2)th electrodes 210-2 is not limited to that shown.

The sub trace line STc may include a first sub trace line ST1 and a second sub trace line ST2. The first sub trace line ST1 may be electrically connected to at least a portion of the (1-1)th trace lines 210t-1b, and the second sub trace line ST2 may be electrically connected to at least a portion of the (1-2)th trace lines 210t-1b. In FIG. 20C, the first sub trace line ST1 may be electrically connected to all five (1-1)th trace lines 210t-1b, and the second sub trace line ST2 may be electrically connected to two (1-2)th trace lines 210t-2b of the four (1-2)th trace lines 210t-2b. However, the present disclosure is not limited thereto, and the first sub trace line ST1 may be electrically connected to a portion of the five (1-1)th trace lines 210t-1b, and the second sub trace line ST2 may be electrically connected to all four (1-2)th trace lines 210t-2b.

The (1-1)th electrodes 210-1 may be connected to the sensor driver 200C (see FIG. 7) through the (1-1)th trace lines 210t-1b and the first sub trace line ST1, and the (1-2)th electrodes 210-2 may be connected to the sensor driver 200C (see FIG. 7) through the (1-2)th trace lines 210t-2b or the sensor driver 200C (see FIG. 7) through the (1-2)th trace lines 210t-2b and the second sub trace line ST2.

The first sub trace line ST1 and the second sub trace line ST2 may be disposed on the sensing area 200A. The first sub trace line ST1 and the second sub trace line ST2 may overlap the first electrodes 210 on the plane. The initial portion of the first sub trace line ST1, where it begins to overlap the sensing area 200A, may overlap the (1-2)th electrodes 210-2. Furthermore, the portion of the first sub trace line ST1 that extends in a direction opposite to the second direction DR2 may overlap the (1-1)th electrodes 210-1. The initial portion of the second sub trace line ST2, where it begins to overlap the sensing area 200A, may overlap the (1-1)th electrodes 210-1. Furthermore, the portion of the second sub trace line ST2 that extends in a direction opposite to the second direction DR2 may overlap the (1-2)th electrodes 210-2.

The first electrodes 210 may be disposed between the first electrodes 210, to which the first sub trace line ST1 is connected, and the (1-2)th electrodes 210-2 overlapping the first sub trace line ST1. In addition, the first electrodes 210 may be disposed between the second electrodes 220, to which the second sub trace line ST2 is connected, and the (1-1)th electrodes 210-1 overlapping the second sub trace line ST2. For example, a plurality of (1-2)th electrodes 210-2 may be disposed between the (1-1)th electrode 210-1 disposed at the lowermost end of the (1-1)th electrodes 210-1, to which the first sub trace line ST1 is connected, in the second direction DR2 and the (1-2)th electrode 210-2 disposed at the uppermost end of the (1-2)th electrodes 210-2 overlapping the first sub trace line ST1 in the second direction DR2. In addition, a plurality of (1-1)th electrodes 210-1 (e.g., four (1-1)th electrodes) may be disposed between the (1-2)th electrode 210-2 disposed at the lowermost end of the (1-2)th electrodes 210-2, to which the second sub trace line ST2 is connected, in the second direction DR2 and the (1-1)th electrode 210-1 disposed at the uppermost end of the (1-1)th electrodes 210-1 overlapping the second sub trace line ST2 in the second direction DR2. The first sub trace line ST1 and the second sub trace line ST2 may be spaced apart from each other in the first direction DR1.

The first sub trace line ST1 may overlap the (1-2)th electrodes 210-2 disposed on the sensing area 200A. The (1-1)th trace lines 210t-1b connected to the first sub trace line ST1 may not be disposed on the peripheral area 200NA adjacent in the opposite direction to the first direction DR1 with respect to the peripheral area 200NA adjacent to the first sub trace line ST1 overlapping the (1-2)th electrodes 210-2. A portion of the (1-1)th trace lines 210t-1b may not be disposed at a left lower end of the peripheral area 200NA where a plurality of lines are disposed, and as a result, an occurrence of a bottleneck phenomenon that occurs due to the plurality of lines may be reduced.

Figure 21A:
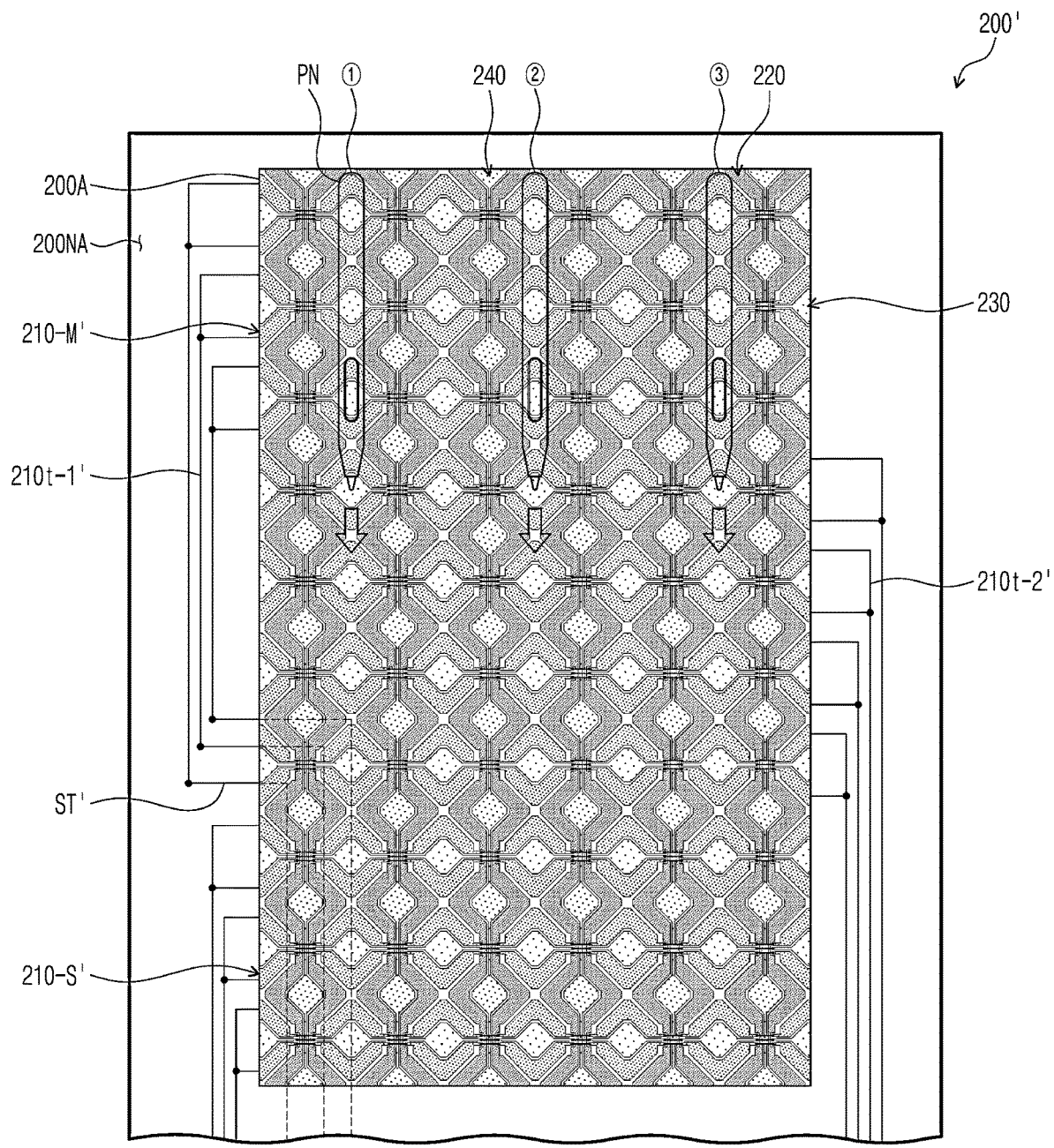
FIGS. 21A and 21B are views for explaining a second mode according to an embodiment of the inventive concept.
Figure 21B:
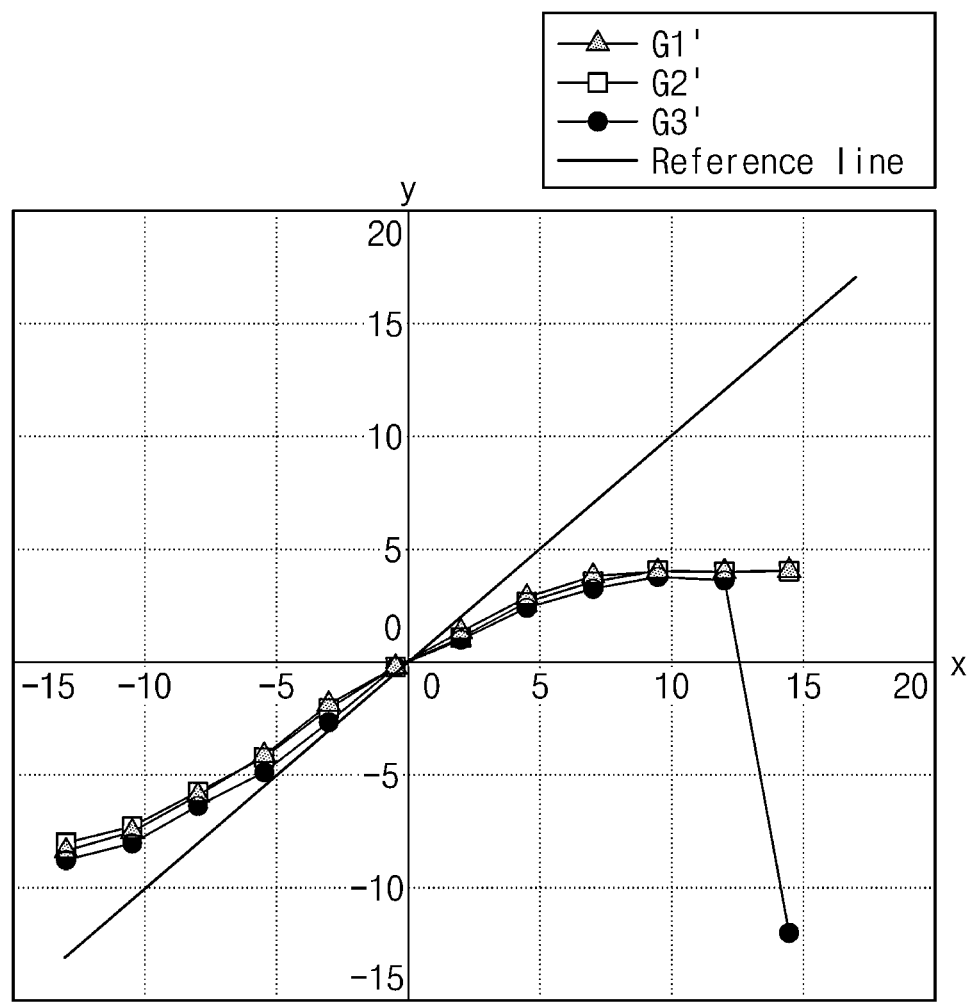

FIGS. 21A and 21B are views for explaining a second mode according to an embodiment of the inventive concept.

FIG. 21A a view illustrating a state in which a pen PN moves in a direction ①, direction ②, and direction ③ on the sensor layer 200' according to an embodiment of the inventive concept, and FIG. 21B illustrates a graph obtained by calculating coordinate information of an input based on a signal received from the sensor layer 200' by the sensor driver 200c (see FIG. 7) when sensing the input by pen P.

FIG. 21A illustrates a portion of the sensor layer 200' according to an embodiment of the inventive concept. FIG. 21A illustrates only first to fourth electrodes 210', 220, 230, and 240, first trace lines 210t', and sub trace line ST'.

The first trace lines 210t' may include a plurality of (1-1)th trace lines 210t-1' connected to one end (e.g., first ends) of the first electrodes 210' and a plurality of (1-2)th trace lines 210t-2' connected to the other end (e.g., second ends) of the first electrodes 210'. The first electrodes 210' may include a first main electrode 210-M' electrically connected to the sub trace line ST' and a first sub electrode 210-S' electrically insulated from the sub trace line ST'.

At least one first sub electrode 210-S' may be disposed between the first main electrode 210-M' disposed at the lowermost end of the first main electrodes 210-M' in the second direction DR2 and the first sub electrode 210-S' disposed at the uppermost end of the first sub electrodes 210-S' in the second direction DR2. When the at least one first sub-electrode 210-S' is a first center sub electrode 210-S', the number of first center sub-electrodes 210-S' may be provided in three or less. In addition, the number of first sub-electrodes 210-S' connected to the (1-2)th trace line 210t-2' may be greater than the number of first center sub-electrodes 210-S'. For example, the number of first sub-electrodes 210-S' connected to the (1-2)th trace line 210t-2' may be at least one more than the number of first center sub-electrodes 210-S'.

The pen PN may move in a direction opposite to the second direction DR2 on the sensor layer 200'. For example, the pen PN may move in the direction ①, direction ②, and direction ③ on the sensor layer 200'. When the sensor layer 200' senses an input from the pen PN moving in the directions ①, ②, and ③, the sensor driver 200C (see FIG. 7) may calculate the coordinate information based on the signal received from the sensor layer 200'.

Referring to FIG. 21B, when the pen PN moves in the direction ①, direction ②, and direction ③, the sensor driver 200C (see FIG. 7) may adjust the coordinate information based on the signal received from the sensor layer 200' according to an embodiment. A reference line may be a coordinate value that has to be calculated when the pen PN moves in each of the direction ①, direction ②, and direction ③. For example, when the pen PN moves in each of the direction ①, direction ②, and direction ③, it is observed that the accuracy of the calculated coordinate value increases as the graph based on this value approaches the reference line.

A first comparison graph G1' is a graph according to the coordinate value when the pen PN moves in the direction ①. A second comparison graph G2' is a graph according to the coordinate value when the pen PN moves in the direction ②. A third comparison graph G3' is a graph according to the coordinate value when the pen PN moves in the direction ③. It can be observed that the coordinate values of the first comparison graph G1' and the second comparison graph G2' gradually become distorted when the pen PN moves in the directions ① and ②. In particular, in the third comparison graph G3', it is observed that when moving in the direction ③, when an x value is between about 10 and about 15, a y coordinate value rapidly moves away from the reference line.

Figure 22A:
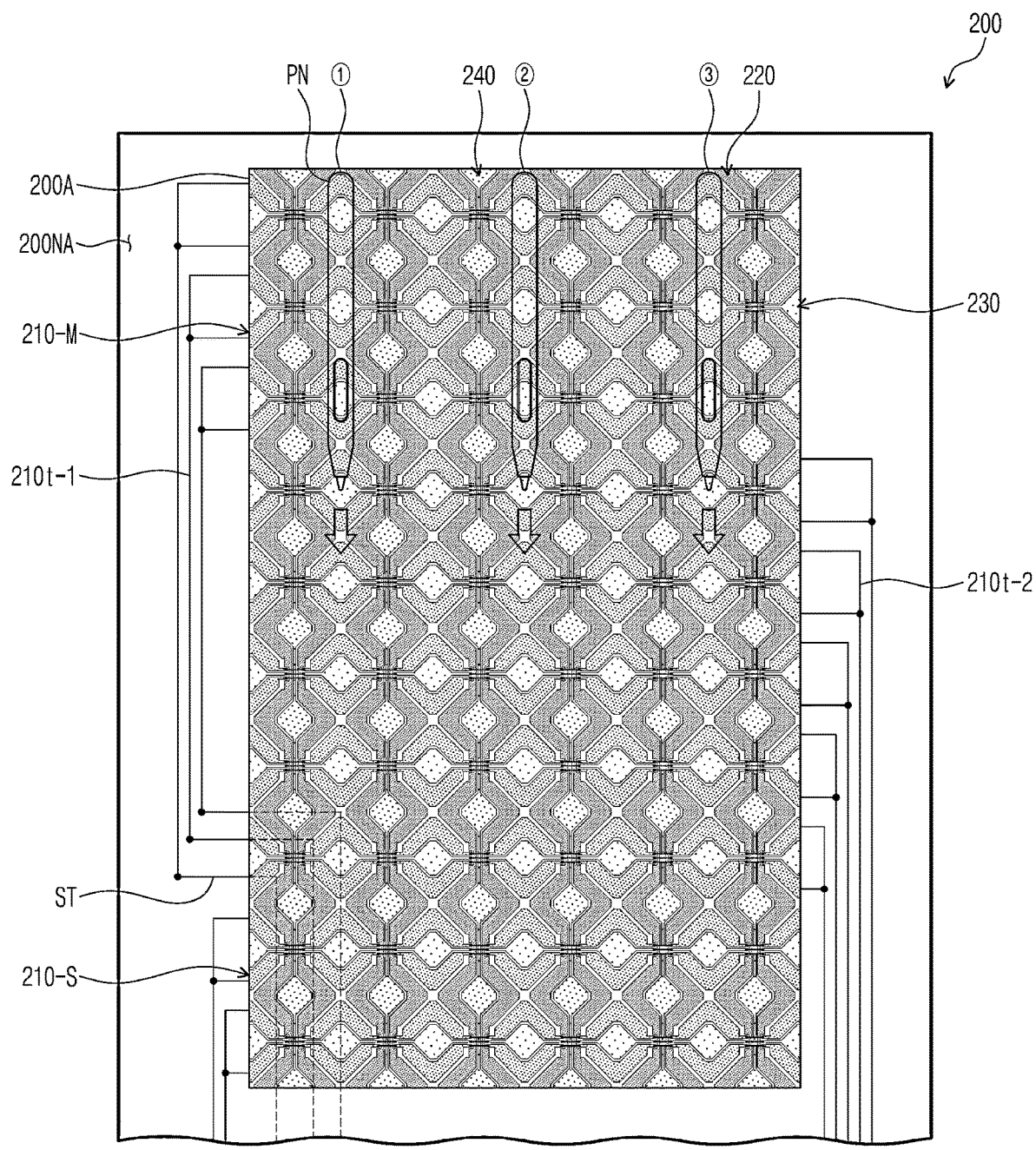
FIGS. 22A and 22B are views for explaining the second mode according to an embodiment of the inventive concept.
Figure 22B:
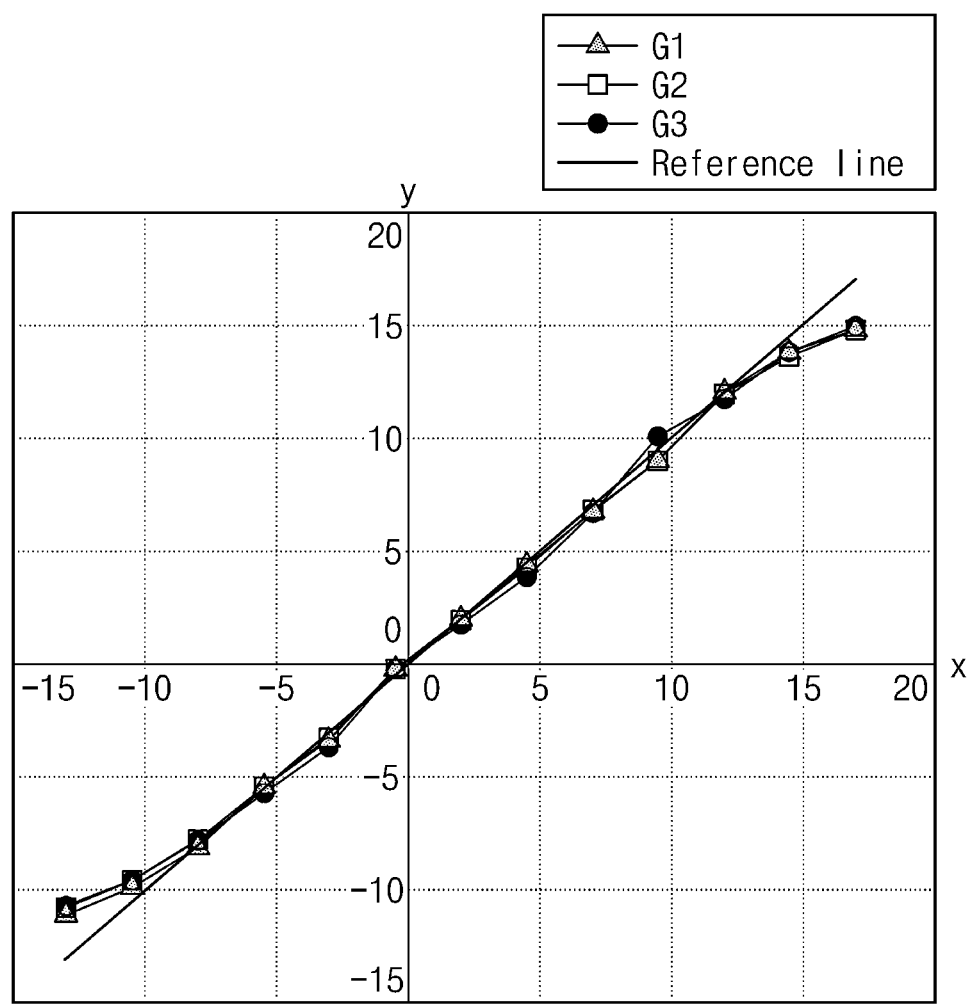

FIGS. 22A and 22B are views for explaining the second mode according to an embodiment of the inventive concept.

FIG. 22A a view illustrating a state in which a pen PN moves in a direction ①, direction ②, and direction ③ on the sensor layer 200 according to an embodiment of the inventive concept, and FIG. 22B illustrates a graph obtained by calculating coordinate information of an input based on a signal received from the sensor layer 200 by the sensor driver 200c (see FIG. 7) when sensing the input by pen P.

FIG. 22A illustrates a portion of the sensor layer 200 according to an embodiment of the inventive concept. The sensor layer 200 illustrated in FIG. 22A may be the same as the sensor layer 200 illustrated in FIG. 20A.

Referring to FIG. 22A, at least one first sub electrode 210-S may be disposed between the first main electrode 210-M disposed at the lowermost end of the first main electrodes 210-M in the second direction DR2 and the first sub electrode 210-S disposed at the uppermost end of the first sub electrodes 210-S in the second direction DR2. Alternatively, there may be five or more first center sub-electrodes 210-S. In addition, the number of first sub-electrodes 210-S connected to the (1-2)th trace line 210t-2 may be greater than the number of first center sub-electrodes 210-S. For example, the number of first sub-electrodes 210-S connected to the (1-2)th trace line 210t-2 may be at least one more than the number of first center sub-electrodes 210-S.

The pen PN may move in the direction ①, direction ②, and direction ③ on the sensor layer 200. Referring to FIG. 22B, when the pen PN moves in the direction ①, direction ②, and direction ③ on the sensor layer 200, the sensor driver 200C (see FIG. 7) may adjust the coordinate information calculated based on the signal received from the sensor layer 200' according to an embodiment.

A first graph G1 is a graph according to the coordinate value when the pen PN moves in the direction ①. A second graph G2 is a graph according to the coordinate value when the pen PN moves in the direction ②. A third graph G3 is a graph according to the coordinate value when the pen PN moves in the direction ③. It can be observed that the coordinate values of the first graph G1, the second graph G2, and the third graph G3 are calculated almost identically to the reference line when the pen PN moves in the direction ①, direction ②, and direction ②.

For example, referring to FIGS. 21A to 22B, it can be observed that when the number of first center sub electrodes 210-S is set to about 4 or more, accurate coordinates are calculated when the sensor layer 200 senses the input by the pen PN.

According to embodiments of the inventive concept, the sensor layer may include the sub trace lines that are electrically connected to the first trace lines and that overlap the sensing area. The first trace lines connected to the sub trace lines may not be disposed on the peripheral area adjacent to the sensing area overlapping the sub trace lines. Therefore, the surface area of the peripheral area may be reduced, and the surface area occupied by the non-display area on the display screen of the electronic device may be reduced. In other words, the electronic device implementing the narrow bezel may be provided.

It will be evident to those skilled in the art that various modifications and deviations can be made to the inventive concept. Thus, it is intended that the inventive concept covers any modifications and deviations that fall within the scope of the appended claims and their equivalents.

What is claimed is:

1. An electronic device comprising:
   a display layer configured to display an image; and
   a sensor layer disposed on the display layer and including a sensing area and a peripheral area that is adjacent to the sensing area,
   wherein the sensor layer comprises:
   a plurality of first electrodes extending in a first direction and arranged in a second direction crossing the first direction;
   a plurality of second electrodes extending in the second direction and arranged in the first direction;
   a third electrode extending in the first direction and electrically insulated from the first electrodes;
   a fourth electrode extending in the second direction and electrically insulated from the second electrodes;
   a plurality of first trace lines electrically connected to the first electrodes, respectively, wherein the plurality of first trace lines overlap the peripheral area; and
   a sub trace line electrically connected to a portion of the first trace lines and overlapping at least one electrode of the plurality of first electrodes, the plurality of second electrodes, the plurality of third electrodes, or the plurality of fourth electrodes, in the sensing area, while being electrically insulated from at least a portion of the at least one electrode.

2. The electronic device of claim 1, wherein the first trace lines and the sub trace line are disposed on layers different from each other.

3. The electronic device of claim 2, wherein each of the first electrodes and the second electrodes and each of the third electrode and the fourth electrode are disposed on layers different from each other.

4. The electronic device of claim 3, wherein the sensor layer further comprises:
a first insulating layer covering the third electrode and the fourth electrode; and
a second insulating layer disposed on the first insulating layer, wherein the second insulating layer covers the first electrodes and the second electrodes.

5. The electronic device of claim 4, wherein the sensor layer further comprises a base layer disposed below the first insulating layer,
each of the first trace lines is disposed on the first insulating layer, and
the sub trace line is disposed on the base layer.

6. The electronic device of claim 5, wherein the sub trace line overlaps the first electrodes.

7. The electronic device of claim 4, wherein the sensor layer further comprises:
a base layer disposed below the first insulating layer; and
a third insulating layer disposed between the base layer and the first insulating layer,
wherein each of the first trace lines is disposed on the first insulating layer, and
the sub trace line is disposed on the third insulating layer.

8. The electronic device of claim 1, wherein the sensor layer further comprises a plurality of dummy patterns overlapping the first electrodes and the second electrodes.

9. The electronic device of claim 8, wherein the sub trace line is disposed between the dummy patterns on a plane.

10. The electronic device of claim 1, wherein the third electrode comprises a plurality of first auxiliary electrodes extending in the first direction and arranged in the second direction, and
the fourth electrode comprises a plurality of second auxiliary electrodes extending in the second direction and arranged in the first direction,
wherein a first coupling capacitor is provided between one first electrode of the first electrodes and one first auxiliary electrode of the first auxiliary electrodes, and
a second coupling capacitor is provided between one second electrode of the second electrodes and one second auxiliary electrode of the second auxiliary electrodes.

11. The electronic device of claim 10, wherein the sub trace line is disposed between the first auxiliary electrodes and the second auxiliary electrodes on a plane.

12. The electronic device of claim 10, wherein each of the second auxiliary electrodes comprises a $(2-1)^{th}$ auxiliary electrode and a $(2-2)^{th}$ auxiliary electrode, which are spaced apart from each other in the second direction, and
the sub trace line is disposed between the $(2-1)^{th}$ auxiliary electrode and the $(2-2)^{th}$ auxiliary electrode on a plane.

13. The electronic device of claim 1, wherein the first trace lines comprise:
a plurality of $(1-1)^{th}$ trace lines connected to a first end of each of the first electrodes; and
a plurality of $(1-2)^{th}$ trace lines connected to a second end of each of the first electrodes, which is spaced apart from the first end in the first direction.

14. The electronic device of claim 13, wherein the first electrodes comprise:
$(1-1)^{th}$ th electrodes connected to the $(1-1)^{th}$ trace lines; and
$(1-2)^{th}$ electrodes connected to the $(1-2)^{th}$ trace lines.

15. The electronic device of claim 13, wherein the sub trace line comprises:

a first sub trace line electrically connected to a portion of the $(1-1)^{th}$ trace lines; and
a second sub trace line electrically connected to a portion of the $(1-2)^{th}$ trace lines.

16. The electronic device of claim 15, wherein the first sub trace line and the second sub trace line are spaced apart from each other in the first direction.

17. The electronic device of claim 1, further comprising:
a plurality of second trace lines electrically connected to the second electrodes;
a third trace line electrically connected to the third electrode; and
a fourth trace line electrically connected to the fourth electrode.

18. The electronic device of claim 17, wherein the first trace lines and the third trace line are spaced apart from each other with the first electrodes and the third electrode therebetween, and
the second trace lines and the fourth trace line are spaced apart from each other with the second electrodes and the fourth electrode therebetween.

19. The electronic device of claim 17, wherein the third trace line overlaps the sub trace line.

20. The electronic device of claim 1, wherein a contact hole through which the first trace lines and the sub trace line are connected to each other is provided in the sensor layer.

21. The electronic device of claim 20, wherein the contact hole overlaps the peripheral area.

22. The electronic device of claim 1, further comprising a sensor driver configured to drive the sensor layer and operate in a first mode in which a touch input is sensed and a second mode in which a pen input is sensed.

23. An electronic device comprising:
a display layer configured to display an image; and
a sensor layer disposed on the display layer and including a sensing area and a peripheral area that is adjacent to the sensing area,
wherein the sensor layer comprises:
a plurality of first electrodes extending in a first direction and arranged in a second direction crossing the first direction;
a plurality of second electrodes extending in the second direction and arranged in the first direction;
a third electrode extending in the first direction and electrically insulated from the first electrodes;
a fourth electrode extending in the second direction and electrically insulated from the second electrodes;
a plurality of first trace lines electrically connected to the first electrodes, respectively, wherein the plurality of first trace lines overlap the peripheral area; and
a sub trace line electrically connected to a portion of the first trace lines and overlapping the sensing area,
wherein each of the first electrodes comprises:
a first main electrode electrically connected to the sub trace line; and
first sub electrodes electrically insulated from the sub trace line.

24. The electronic device of claim 23, wherein the sub trace line overlaps at least one first sub electrode of the first sub electrodes.

25. The electronic device of claim 24, wherein at least one first sub electrode of the first sub electrodes is disposed between the first main electrode and the one first sub electrode overlapped by the sub trace line.

26. The electronic device of claim 23, wherein each of the sub trace line and the first main electrode is provided in plural, and the first main electrodes are disposed at an uppermost end of the first electrodes in the second direction.

27. An electronic device comprising:
a sensor layer comprising a plurality of first electrodes, a plurality of second electrodes, a plurality of first auxiliary electrodes, a plurality of second auxiliary electrodes, and a plurality of trace lines; and
a sensor driver configured to drive the sensor layer and operate in a first mode in which a touch input is sensed and a second mode in which a pen input is sensed,
wherein a first coupling capacitor is provided between one first electrode of the plurality of first electrodes and one first auxiliary electrode of the first auxiliary electrodes, and
a second coupling capacitor is provided between one second electrode of the plurality of second electrodes and one second auxiliary electrode of the second auxiliary electrodes,
wherein the trace lines comprise:
a plurality of first trace lines electrically connected to the first electrodes, respectively; and
a sub trace line overlapping a portion of the plurality of first electrodes, while being electrically insulated from at least the portion of the plurality of first electrodes, and configured to electrically connect a portion of the first trace lines to the sensor driver.

28. The electronic device of claim 27, wherein the first trace lines and the sub trace line are disposed on layers different from each other.

29. The electronic device of claim 28, wherein the sensor layer further comprises:
a first insulating layer covering the first auxiliary electrodes and the second auxiliary electrodes; and
a second insulating layer disposed on the first insulating layer and covering the first electrodes and the second electrodes.

30. The electronic device of claim 29, wherein the sensor layer further comprises a base layer disposed below the first insulating layer,
each of the first trace lines is disposed on the first insulating layer, and
the sub trace line is disposed on the base layer.

31. The electronic device of claim 27, wherein the sensor layer includes a sensing area and a peripheral area adjacent to the sensing area, and
the first electrodes, the second electrodes, the first auxiliary electrodes, and the second auxiliary electrodes overlap the sensing area, and the first trace lines overlap the peripheral area.

32. The electronic device of claim 31, wherein a first portion of the sub trace line overlaps the sensing area, and a second portion of the sub trace line overlaps the peripheral area.

33. The electronic device of claim 32, wherein a contact hole through which the first trace lines and the sub trace line are connected to each other is provided in the sensor layer, and
the contact hole overlaps the peripheral area.

* * * * *